US010914382B2

(12) United States Patent
Komatsu et al.

(10) Patent No.: US 10,914,382 B2
(45) Date of Patent: Feb. 9, 2021

(54) SHAFT SEALING STRUCTURE AND PRIMARY COOLANT CIRCULATION PUMP

(71) Applicant: MITSUBISHI HEAVY INDUSTRIES, LTD., Tokyo (JP)

(72) Inventors: Naotaka Komatsu, Tokyo (JP); Takumi Hori, Tokyo (JP); Yuichi Otani, Tokyo (JP); Hidetaka Kafuku, Tokyo (JP); Hiromu Okamoto, Tokyo (JP); Shunsuke Tanaka, Tokyo (JP); Yasushi Takayama, Tokyo (JP); Tomoki Hanada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 121 days.

(21) Appl. No.: 16/110,654

(22) Filed: Aug. 23, 2018

(65) Prior Publication Data

US 2019/0063610 A1 Feb. 28, 2019

(30) Foreign Application Priority Data

Aug. 24, 2017 (JP) ................................ 2017-161614

(51) Int. Cl.
*F16J 15/16* (2006.01)
*F04D 29/12* (2006.01)
(Continued)

(52) U.S. Cl.
CPC .......... F16J 15/164 (2013.01); F04D 29/126 (2013.01); F04D 29/146 (2013.01); F04D 29/5893 (2013.01); F16J 15/3484 (2013.01)

(58) Field of Classification Search
CPC .......... F16J 15/441; F16J 9/20; F16J 15/3272; F16J 15/008; F16J 15/164; F16J 15/3404;
(Continued)

(56) References Cited

U.S. PATENT DOCUMENTS 2,756,017 A * 7/1956 Silverman ............... F16K 15/03
251/148
3,250,539 A * 5/1966 Kurz ....................... F16J 15/38
277/373
(Continued)

FOREIGN PATENT DOCUMENTS

CN 104169618 11/2014
CN 104455442 3/2015
(Continued)

OTHER PUBLICATIONS

Office Action dated Jan. 21, 2020 in corresponding Japanese Patent Application No. 2017-161614 with English-language translation.
(Continued)

*Primary Examiner* — Eugene G Byrd
(74) *Attorney, Agent, or Firm* — Wenderoth, Lind & Ponack, L.L.P.

(57) ABSTRACT

A shaft sealing structure for a rotation shaft, includes a sealing ring having ends formed by removal of its part. The ends abutting each other are continuous in the circumferential direction when the sealing ring is reduced in diameter to a radially inner side. The sealing ring is provided along the circumferential direction of the rotation shaft so as to be contactable with an outer peripheral surface of the rotation shaft. The structure also includes a pressing member configured to be movable between a pressing position and a retracted position; an elastic member configured to bias the pressing member toward the pressing position by elastic force; and a support member configured to support the pressing member at the retracted position against the elastic force, and to allow the pressing member to move to the pressing position at a predetermined temperature.

15 Claims, 32 Drawing Sheets

(51) Int. Cl.
*F04D 29/58* (2006.01)
*F16J 15/34* (2006.01)
*F04D 29/14* (2006.01)

(58) Field of Classification Search
CPC ...... F16J 15/54; F16J 15/3484; F04D 29/146; F04D 29/126; F04D 29/5893
See application file for complete search history.

(56) References Cited

U.S. PATENT DOCUMENTS

| | | | | |
|---|---|---|---|---|
| RE27,188 E | * | 10/1971 | Pustelnik | F16J 15/38 277/374 |
| 3,926,443 A | * | 12/1975 | Fenerty | F16J 15/3496 277/405 |
| 3,937,477 A | * | 2/1976 | Gyory | F16J 15/008 277/426 |
| 4,105,040 A | * | 8/1978 | Chester | F16K 1/2263 137/72 |
| 4,175,755 A | * | 11/1979 | Geary | F16J 15/441 277/422 |
| 4,475,736 A | * | 10/1984 | Lesiecki | F16J 15/40 277/422 |
| 4,641,842 A | * | 2/1987 | Kataoka | F16J 15/3404 277/348 |
| 4,660,838 A | * | 4/1987 | Katayama | F01D 25/186 277/422 |
| 5,014,999 A | * | 5/1991 | Makhobey | F01D 11/003 277/422 |
| 5,292,138 A | * | 3/1994 | Glynn | F16J 15/164 277/422 |
| 5,409,240 A | * | 4/1995 | Ballard | F16J 15/344 277/366 |
| 5,445,394 A | * | 8/1995 | Dusserre-Telmon | F01D 11/003 277/422 |
| 5,562,294 A | * | 10/1996 | Marsi | F16J 15/008 277/500 |
| 5,571,268 A | * | 11/1996 | Azibert | F16J 15/3488 277/370 |
| 6,412,784 B1 | * | 7/2002 | Cohen | F16J 15/184 277/385 |
| 8,690,534 B1 | * | 4/2014 | Janocko | F16J 15/164 415/231 |
| 8,939,710 B2 | * | 1/2015 | Webb | F16J 15/164 415/111 |
| 2003/0011135 A1 | * | 1/2003 | Meacham | F16J 15/3404 277/408 |
| 2003/0057655 A1 | * | 3/2003 | Chehab | F16J 15/008 277/500 |
| 2003/0189296 A1 | * | 10/2003 | Jarchau | F16J 15/164 277/500 |
| 2007/0009350 A1 | * | 1/2007 | Tothill | F01D 11/005 415/170.1 |
| 2007/0172367 A1 | * | 7/2007 | Janocko | F04D 15/00 417/423.11 |
| 2015/0108721 A1 | * | 4/2015 | Thuillier | F16J 15/188 277/522 |
| 2015/0192142 A1 | * | 7/2015 | Philippart | F04D 7/08 415/47 |
| 2016/0312893 A1 | | 10/2016 | Thuillier | |

FOREIGN PATENT DOCUMENTS

| | | |
|---|---|---|
| CN | 104696267 | 6/2015 |
| EP | 0 297 381 | 1/1989 |
| EP | 2 757 295 | 7/2014 |
| JP | 3-89275 | 9/1991 |
| JP | 2015-507195 | 3/2015 |
| JP | 2017-507319 | 3/2017 |

OTHER PUBLICATIONS

Office Action dated Dec. 3, 2019 in Chinese Patent Application No. 201810966186.4, with English-language translation.

* cited by examiner

SHAFT SEALING STRUCTURE AND PRIMARY COOLANT CIRCULATION PUMP

CROSS-REFERENCE TO RELATED APPLICATIONS

The present application claims priority to and incorporates by reference the entire contents of Japanese Patent Application No. 2017-161614 filed in Japan on Aug. 24, 2017.

FIELD

The present invention relates to a shaft sealing structure for preventing, in a nuclear power plant, leakage of a primary coolant from a pump configured to circulate the primary coolant through a nuclear reactor, and a primary coolant circulation pump to which the shaft sealing structure is applied. The primary coolant circulation pump is a so-called reactor coolant pump.

BACKGROUND

In nuclear power plants, a nuclear reactor and a steam generator are housed in a containment. The nuclear reactor and the steam generator are coupled through a coolant pipe, and the coolant pipe is provided with a primary coolant circulation pump. In the primary coolant circulation pump, a plurality of sets of sealings are provided on the periphery of a main shaft along the axial direction. During operation of the primary coolant circulation pump, the sets of sealings seal between the inside of a pump housing and the outside of a sealing housing while the main shaft rotates in the sealing housing.

In nuclear power plants, in case of station blackout (SBO), it is supposed that the temperature of a primary coolant, which is about 70° C. during normal operation, increases up to about 300° C. In this case, the primary coolant of about 300° C. and about 16 MPa reaches the sealings. The sealings have sufficient durability against these levels of temperature and pressure for a long time, but further improvement on safety has been requested.

Examples of the shaft sealing structure for the primary coolant circulation pump include a passive shutdown sealing device described in Patent Literature 1. This device includes a sealing ring, a piston, locking/unlocking means, and elastic means. The sealing ring is divided to have an inactivated position at which a leakage flow is permitted between the sealing ring and the outer peripheral surface of a main shaft and an activated position at which the sealing ring stops the leakage flow. The piston is configured to locate the sealing ring at the positions. The locking/unlocking means is a ring made of a fusible material and configured to lock the piston at a position at which the sealing ring is at the inactivated position when the temperature of the locking/unlocking means is lower than a threshold temperature, and to release the position of the piston when the temperature of the locking/unlocking means exceeds the threshold temperature. The elastic means moves the piston when the piston is released, such that the sealing ring is located at the activated position.

CITATION LIST

Patent Literature

Patent Literature 1: Japanese Unexamined Patent Application Publication No. 2015-507195

SUMMARY

Technical Problem

In the device described in Patent Literature 1, heat transferred from a high-temperature primary coolant to the locking/unlocking means is not always uniformly transferred in the circumferential direction of the ring. Thus, mechanical strength with which the locking/unlocking means locks the piston does not decrease uniformly in the circumferential direction, and a part of the pistons is not released, so that the sealing ring is not always brought into intimate contact with the outer peripheral surface of the main shaft uniformly in the circumferential direction. As a result, a leakage path may remain. In the device described in Patent Literature 1, the piston and the sealing ring contact with each other on chamfered walls to press the sealing ring to the outer peripheral surface of the main shaft. It is necessary that when the mechanical strength of the locking/unlocking means becomes too low to bear the elastic force of the elastic means, reliable and smooth relative change be generated at the contact of the chamfered walls.

In the device described in Patent Literature 1, the sealing ring is polyether ether ketone (PEEK) resin, and is softened at high temperature. Thus, in order to push the sealing ring inward in the radial direction, the locking/unlocking means needs to remain at the installed location without being eluted at high temperature. If the locking/unlocking means does not remain at the installed position but is eluted therefrom, the sealing ring pressed by the piston may be deformed to enter the place where the locking/unlocking means is installed in a direction away from the outer peripheral surface of the main shaft, and the force in the radial inward direction is not always transferred to the sealing ring. In the device described in Patent Literature 1, it is expected that the locking/unlocking means uses material for increasing flowability in order to reduce the mechanical strength when the temperature exceeds a threshold temperature. However, high flowability leads to the above-mentioned risk of flowing out, and hence it is expected to prevent a clearance from being provided between the sealing ring, the piston, and the pump casing as much as possible. Thus, heat transferred from the primary coolant to the locking/unlocking means during station blackout is not always uniformly transferred in the circumferential direction of the ring of the locking/unlocking means, and a temperature difference occurs in the locking/unlocking means in the circumferential direction. As a result, the mechanical strength with which the piston is locked does not decrease uniformly in the circumferential direction, and a part of the pistons is not released, so that the sealing ring is not always brought into intimate contact with the outer peripheral surface of the main shaft uniformly in the circumferential direction.

The present invention has been made in order to solve the above-mentioned problems, and it is an object thereof to provide a shaft sealing structure and a primary coolant circulation pump that are capable of operating reliably and smoothly.

Solution to Problem

A shaft sealing structure according to one aspect of the present invention is for a rotation shaft, and includes a sealing ring having a ring shape in which a part is removed in a circumferential direction so that the sealing ring has ends formed by removal of the part. The ends abutting each other are continuous in the circumferential direction when the sealing ring is reduced in diameter to a radially inner side. The sealing ring is provided along the circumferential direction of the rotation shaft so as to be contactable with an outer peripheral surface of the rotation shaft. The shaft sealing structure also includes a pressing member configured to be movable between a pressing position at which the pressing member presses the sealing ring to the radially inner side and a retracted position at which the pressing member is retracted from the pressing position; an elastic member configured to bias the pressing member toward the pressing position by elastic force; a support member configured to support the pressing member at the retracted position against the elastic force of the elastic member, and to allow the pressing member to move to the pressing position at a predetermined temperature or higher; and a communicating portion configured to communicate between an outer circumferential portion of the rotation shaft and an outer circumferential portion of the support member.

In the shaft sealing structure according to the aspect, the communicating portion is preferably provided to pass through the pressing member.

In the shaft sealing structure according to the aspect, the communicating portion is preferably provided to pass through the sealing ring in a radial direction.

In the shaft sealing structure according to the aspect, the support member preferably has recesses and protrusions formed on a surface thereof.

In the shaft sealing structure according to the aspect, it is preferable that the support member has recesses and protrusions formed on a surface thereof, and at least one of the sealing ring and the support member has recesses and protrusions formed on a surface thereof and engaged with the recesses and protrusions formed on the support member.

In the shaft sealing structure according to the aspect, the support member is preferably formed by mixing a resin material that is softened at a predetermined temperature or higher and a heat conductive material having heat conductivity.

In the shaft sealing structure according to the aspect, it is preferable that the support member is formed by being divided into a softened portion to be softened at a predetermined temperature or higher and a heat transfer portion having heat conductivity, and the softened portion and the heat transfer portion are provided along a movement direction of the pressing member.

In the shaft sealing structure according to the aspect, it is preferable that the support member is formed by being divided into a softened portion to be softened at a predetermined temperature or higher and a heat transfer portion having heat conductivity, and the softened portion and the heat transfer portion are provided in a row in a direction intersecting with a movement direction of the pressing member.

In the shaft sealing structure according to the aspect, it is preferable that the support member includes a plate-shaped member configured to support the pressing member located at the retracted position against a movement direction and to be softened at a predetermined temperature or higher, and the plate-shaped member is formed by being divided in the circumferential direction by a plurality of cutting grooves extending in the movement direction of the pressing member.

In the shaft sealing structure according to the aspect, the support member is preferably provided with an initial irregularity configured to cause each plate piece of the plate-shaped member to buckle so as to allow the pressing member to move to the pressing position.

In the shaft sealing structure according to the aspect, the support member preferably has a through hole formed therein.

In the shaft sealing structure according to the aspect, the support member is preferably configured to support the pressing member at the retracted position by tensile force against the elastic force of the elastic member in a manner that a fusible portion that fuses at a predetermined temperature or higher is interposed.

In the shaft sealing structure according to the aspect, the support member preferably includes a buckling member provided so as to allow the pressing member to move to the pressing position by relative movement of the support member and the pressing member in the circumferential direction, the buckling member being configured to restrict the relative movement of the support member and the pressing member in the circumferential direction at the retracted position of the pressing member and to buckle at a predetermined temperature or higher to allow the relative movement of the support member and the pressing member in the circumferential direction.

In the shaft sealing structure according to the aspect, the support member preferably includes a claw-shaped member configured to support the pressing member located at the retracted position and to be softened at a predetermined temperature or higher; and an initial irregularity configured to cause the claw-shaped member to buckle so as to allow the pressing member to move to the pressing position.

The shaft sealing structure according to the aspect preferably further includes a pushout portion configured to assist buckling of the claw-shaped member along with movement of the pressing member.

In the shaft sealing structure according to the aspect, the support member preferably includes a claw-shaped member configured to support the pressing member located at the retracted position and to be softened at a predetermined temperature or higher; and an expanding member configured to thermally expand at a predetermined temperature or higher to deform the claw-shaped member and allow the pressing member to move to the pressing position.

A shaft sealing structure according to another aspect is for a rotation shaft, and includes a sealing ring having a ring shape in which a part is removed in a circumferential direction so that the sealing ring has ends formed by removal of the part. The ends abutting each other are continuous in the circumferential direction when the sealing ring is reduced in diameter to a radially inner side. The sealing ring is provided along the circumferential direction of the rotation shaft so as to be contactable with an outer peripheral surface of the rotation shaft. The shaft sealing structure also includes a pressing member configured to be movable between a pressing position at which the pressing member presses the sealing ring to the radially inner side and a retracted position at which the pressing member is retracted from the pressing position; an elastic member configured to bias the pressing member toward the pressing position by elastic force; a support member configured to support the pressing member at the retracted position against the elastic force of the elastic member, and to allow the pressing member to move to the pressing position at a predetermined pressure or higher; and a communicating portion configured to communicate between an outer circumferential portion of the rotation shaft and an outer circumferential portion of the support member.

In the shaft sealing structure according to the other aspect, the support member preferably has a hollow formed therein.

In the shaft sealing structure, the sealing ring and the pressing member preferably have sliding-contact surfaces that contact and slide on each other when the pressing member moving to the pressing position presses the sealing ring, and each of the sliding-contact surfaces is subjected to surface treatment for reducing friction resistance.

A shaft sealing structure according to still another aspect is for a rotation shaft, and includes a sealing ring having a ring shape in which a part is removed in a circumferential direction so that the sealing ring has ends formed by removal of the part. The ends abutting each other are continuous in the circumferential direction when the sealing ring is reduced in diameter to a radially inner side. The sealing ring is provided along the circumferential direction of the rotation shaft so as to be contactable with an outer peripheral surface of the rotation shaft. The shaft sealing structure also includes a heat-shrinkable ring provided along the circumferential direction on a radially outer side of the sealing ring and configured to shrink to the radially inner side at a predetermined temperature or higher.

The shaft sealing structure according to the other aspect preferably further includes a communicating portion between an outer circumferential portion of the rotation shaft and an outer circumferential portion of the heat-shrinkable ring.

The shaft sealing structure according to the other aspect preferably further includes a sealing housing provided on a periphery of the rotation shaft, the sealing housing being provided with a ring-shaped recess in which the sealing ring and the heat-shrinkable ring are housed. The communicating portion is preferably formed in the sealing housing.

In the shaft sealing structure according to the other aspect, the communicating portion is preferably provided to pass through the sealing ring in a radial direction.

In the shaft sealing structure according to the other aspect, the sealing ring preferably further includes a fitting portion that maintains a state of being separated away from the rotation shaft and a state of contacting the rotation shaft.

The shaft sealing structure according to the other aspect preferably further includes a heat transfer ring in a circumferential direction on a radially outer side of the heat-shrinkable ring.

In the shaft sealing structure according to the other aspect, the sealing ring preferably contains heat conductive material having heat conductivity.

A primary coolant circulation pump according to still another aspect includes the shaft sealing structure.

Advantageous Effects of Invention

According to the present invention, a primary coolant having a predetermined temperature or higher can be caused to flow to an outer circumferential portion of a support member through a communicating portion, and temperature can be uniformly transferred to the entire support member in the circumferential direction. As a result, the support member can be uniformly buckled in the circumferential direction such that the pressing member can be moved to the pressing position uniformly in the circumferential direction and the sealing ring can be brought into contact with the rotation shaft uniformly in the circumferential direction.

DESCRIPTION OF EMBODIMENTS

Embodiments of the present invention are described in detail below with reference to the drawings. The present invention is not limited by the embodiments. Components in the following embodiments include components that can easily be replaced by a person skilled in the art or substantially the same components.

Figure 1:
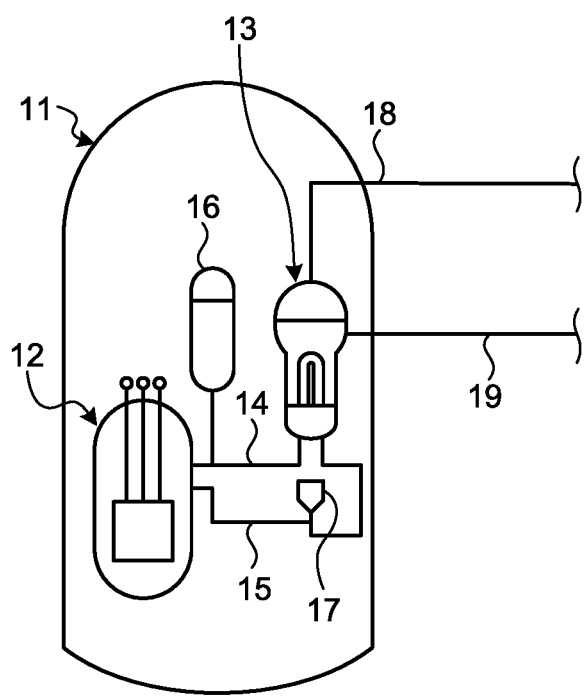
FIG. 1 is a schematic configuration diagram of a nuclear power plant to which a primary coolant circulation pump according to embodiments of the present invention is applied.

FIG. 1 is a schematic configuration diagram of a nuclear power plant to which a primary coolant circulation pump according to the present embodiment is applied.

In the nuclear power plant illustrated in FIG. 1, a nuclear reactor is a pressurized water reactor (PWR) configured to use light water as a nuclear reactor coolant and a neutron moderator, produce high-temperature and high-pressure water that does not boil in the entire reactor core, send the high-temperature and high-pressure water to a steam generator to produce steam by heat exchange, and send the steam to a turbine generator for power generation.

In the nuclear power plant, as illustrated in FIG. 1, a containment 11 contains a pressurized water reactor 12 and a steam generator 13 therein. The pressurized water reactor 12 and the steam generator 13 are coupled through pipes 14 and 15. The pipe 14 is provided with a pressurizer 16. The pipe 15 is provided with a primary coolant circulation pump 17. Thus, in the pressurized water reactor 12, light water as a primary coolant is heated by fuel constituting a reactor core, and the high-temperature light water is sent to the steam generator 13 through the pipe 14 while the light water is maintained to a predetermined high pressure by the pressurizer 16. In the steam generator 13, heat is exchanged between the high-temperature and high-pressure light water (primary coolant) and a secondary coolant, and the cooled light water is returned to the pressurized water reactor 12 through the pipe 15 by the primary coolant circulation pump 17.

The steam generator 13 is coupled to a steam turbine (not illustrated) through a steam pipe 18. The steam generator 13 is coupled to a condensate pipe 19 to which condensate water of the secondary coolant cooled after the steam turbine is driven returns. Thus, steam of the secondary coolant produced by heat exchange with the high-temperature and high-pressure primary coolant in the steam generator 13 is sent to the steam turbine through the steam pipe 18, and the steam turbine is driven by the steam to generate power. The steam that has driven the steam turbine is cooled by a condenser to be condensate water, and is returned to the steam generator 13 through the condensate pipe 19.

Figure 2:
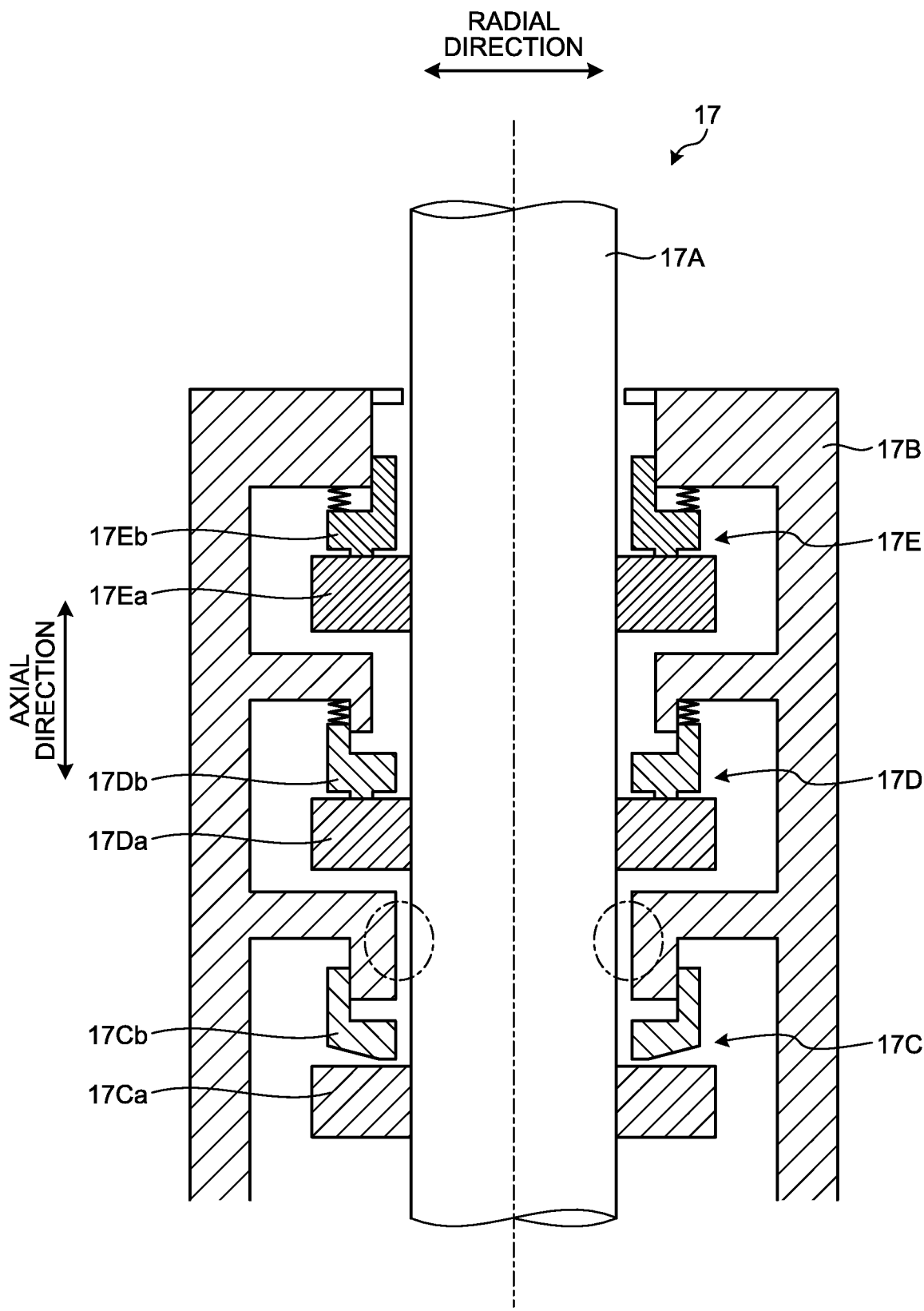
FIG. 2 is a schematic configuration diagram of a shaft sealing portion in the primary coolant circulation pump according to the embodiments of the present invention.
Figure 3:
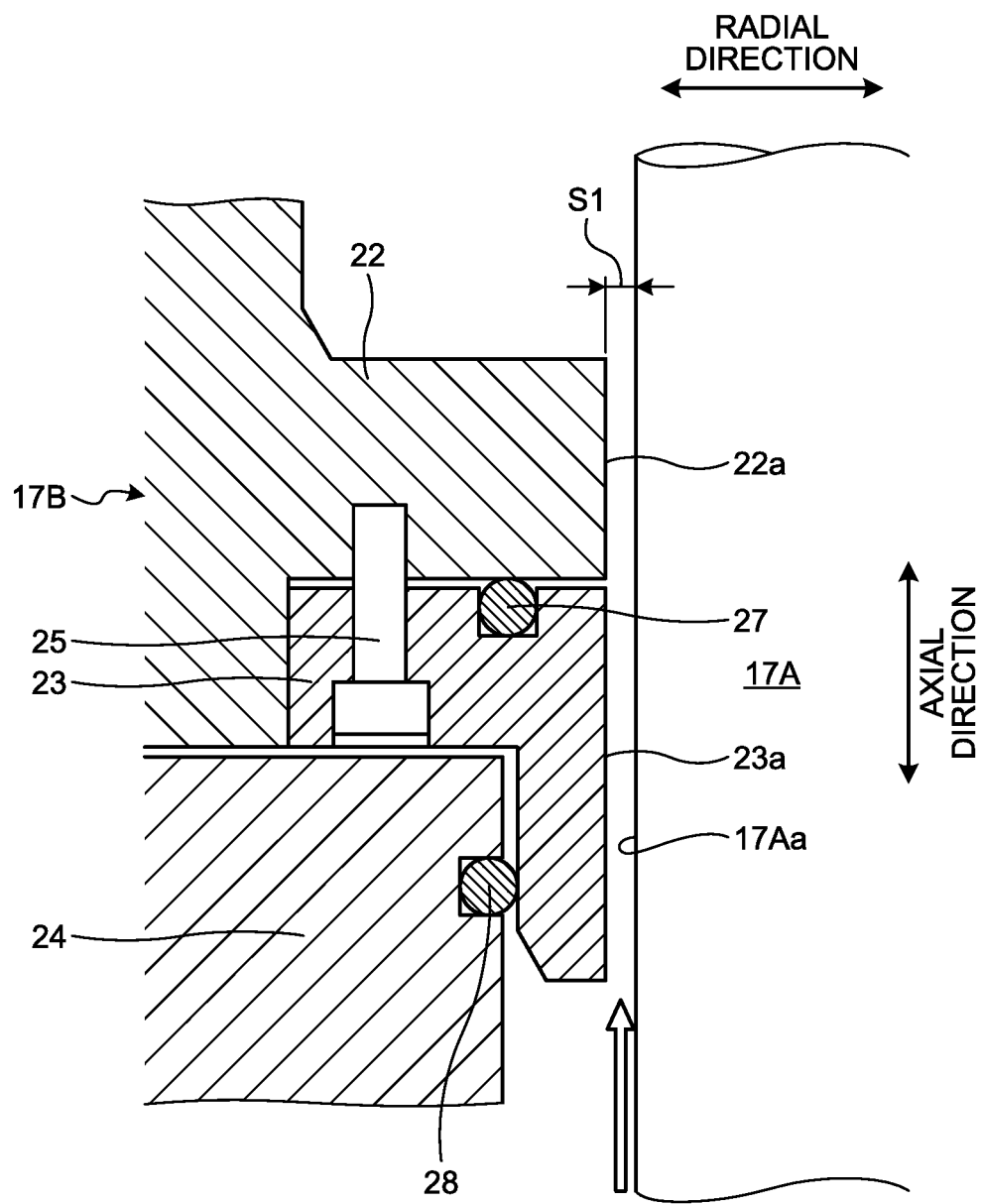
FIG. 3 is a partial cross-sectional view of the shaft sealing portion in the primary coolant circulation pump according to the embodiments of the present invention.

FIG. 2 is a schematic configuration diagram of a shaft sealing portion of the primary coolant circulation pump according to the present embodiment. FIG. 3 is a partial cross-sectional view of the shaft sealing portion of the primary coolant circulation pump according to the present embodiment.

In the primary coolant circulation pump 17, as illustrated in FIG. 2, a rotation shaft 17A is provided to extend in the vertical direction, and although not specified in FIG. 2, an impeller is provided at a lower end of the rotation shaft (main shaft) 17A and a pump unit is disposed at the bottom, and a motor is connected to an upper end of the rotation shaft 17A and a driver is disposed at the top. The shaft sealing portion of the primary coolant circulation pump 17 is formed by disposing a first sealing 17C, a second sealing 17D, and a third sealing 17E in the stated order between the pump unit and the driver from the lower side to the upper side along the extending direction of the rotation shaft 17A between the rotation shaft 17A and a sealing housing 17B covering the outer circumference of the rotation shaft 17A. The first sealing 17C, the second sealing 17D, and the third sealing 17E respectively have rotating rings 17Ca, 17Da, and 17Ea that rotate with the rotation of the rotation shaft 17A by the driving of the motor and stationary rings 17Cb, 17Db, and 17Eb that are provided on the sealing housing 17B side, and function by the rotation of the rotating rings 17Ca, 17Da, and 17Ea. The shaft sealing structure in the present embodiment is provided in a region surrounded by chain lines in FIG. 2, specifically, the sealing housing 17B between the first sealing 17C and the second sealing 17D, and during station blackout (SBO), prevents leakage of a primary coolant (fluid) on the outer circumferential portion of the rotation shaft 17A between the first sealing 17C and the second sealing 17D, thereby improving safety and reliability of each of the sealings.

As illustrated in FIG. 3, the sealing housing 17B provided with the shaft sealing structure in the present embodiment is installed on the inner side of a pump housing (not illustrated), and formed by integrally assembling a plurality of constituent members 22, 23, and 24 with a coupling member 25 and O-rings 27 and 28. The constituent members 22, 23, and 24 have a cylindrical shape and are disposed around the rotation shaft 17A along the axial direction, and the O-rings 27 and 28 are disposed therebetween. The O-rings 27 and 28 suppress the leakage of the primary coolant between the constituent members 22, 23, and 24. In the sealing housing 17B (constituent members 22 and 23), a predetermined clearance S1 along the radial direction is set between inner circumferential surfaces 22a and 23a thereof and the outer peripheral surface 17Aa of the rotation shaft 17A. The predetermined clearance S1 is used to maintain the functions of the first sealing 17C, the second sealing 17D, and the third sealing 17E during pump normal operation.

The axial direction is a direction in which the rotation shaft 17A extends. The radial direction is a direction orthogonal to the axial direction of the rotation shaft 17A. A direction approaching the rotation shaft 17A refers to a radially inner side, and a direction away from the rotation shaft 17A and the rotation shaft refers to a radially outer side. The circumferential direction is a direction around the rotation shaft 17A.

First Embodiment

Figure 4:
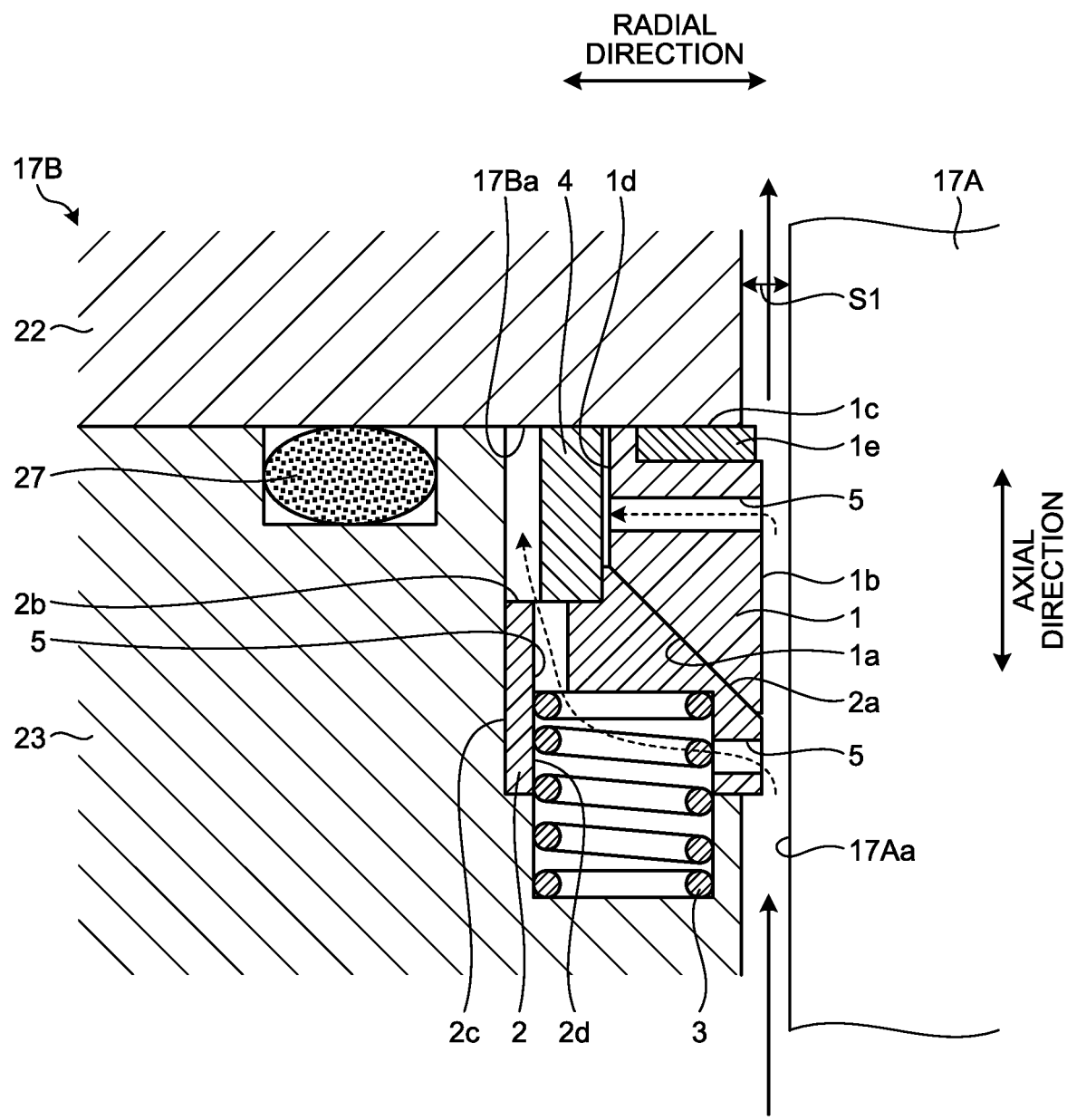
FIG. 4 is a partial enlarged cross-sectional view of a shaft sealing structure for a primary coolant circulation pump according to a first embodiment of the present invention.
Figure 5:
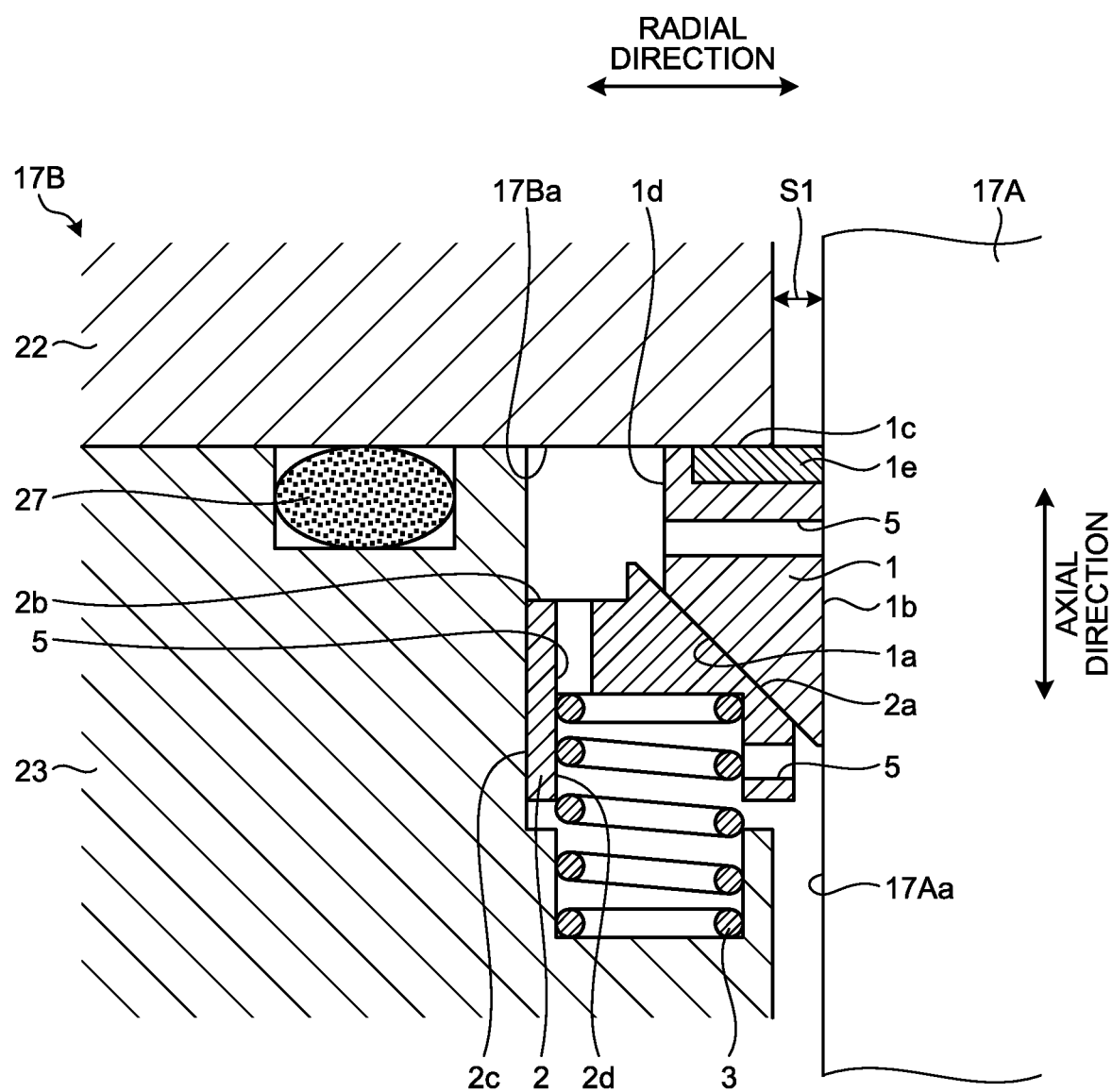
FIG. 5 is a partial enlarged cross-sectional view illustrating the operation of the shaft sealing structure for the primary coolant circulation pump according to the first embodiment of the present invention.

FIG. 4 is a partial enlarged cross-sectional view of a shaft sealing structure for a primary coolant circulation pump according to a first embodiment. FIG. 5 is a partial enlarged cross-sectional view illustrating operation of the shaft sealing structure for the primary coolant circulation pump according to the first embodiment.

As illustrated in FIG. 4, the shaft sealing structure in the first embodiment is disposed so as to be opposed to an outer peripheral surface 17Aa of a rotation shaft 17A on the radially inner side of a constituent member 23 in a sealing housing 17B. Although not specified in FIG. 4, the shaft sealing structure in the first embodiment may be disposed so as to be opposed to the outer peripheral surface 17Aa of the rotation shaft 17A on the radially inner side of a constituent member 22 in the sealing housing 17B.

The shaft sealing structure in the first embodiment includes a sealing ring 1, a pressing member 2, an elastic member 3, a support member 4, and a communicating portion 5. The shaft sealing structure having these configurations is disposed in a recess 17Ba that is formed in an inner circumferential surface 23a of the constituent member 23 (or inner circumferential surface 22a of constituent member 22) of the sealing housing 17B so as to be recessed to the radially outer side and that is formed continuously in the circumferential direction.

The sealing ring 1 has a ring shape along the circumferential direction so as to surround the outer peripheral surface 17Aa of the rotation shaft 17A. A part of the sealing ring 1 in the circumferential direction is removed so that the sealing ring 1 has a C-shape when viewed from the axial direction and has ends formed by removal of the part. The sealing ring 1 is configured such that the ends abut each other to be continuous in the circumferential direction when the sealing ring 1 is reduced in diameter to the radially inner side and that the sealing ring 1 can contact the outer peripheral surface 17Aa along the circumferential direction of the rotation shaft 17A.

As illustrated in FIG. 4, the sealing ring 1 is formed to have a trapezoidal cross-sectional shape in which one side of a rectangular shape is inclined and the remaining three sides are disposed at right angle. In the sealing ring 1, an inclined surface 1a is disposed from the radially inner side to the radially outer side so as to be inclined to the axially upper side to have an arc shape along the circumferential direction toward the radially outer side and the axially lower side. A surface of the sealing ring 1 that is adjacent to the inclined surface 1a and faces the radially inner side constitutes a contact surface 1b that is formed to have an arc shape along the axial direction and the circumferential direction and that is opposed to and can contact the outer peripheral surface 17Aa of the rotation shaft 17A. A surface of the sealing ring 1 that is opposite to the inclined surface 1a and faces the axially upper side constitutes a top surface 1c that is formed to have a flat shape along the radial direction and that can contact the top surface of the recess 17Ba in the sealing housing 17B (in this case, bottom surface of constituent member 22). A surface of the sealing ring 1 that is opposite to the contact surface 1b and faces the radially outer side constitutes an outer surface 1d that is formed to have an arc shape along the axial direction and the circumferential direction and that faces inward of the recess 17Ba in the sealing housing 17B.

It is desired that the sealing ring 1 have corrosion resistance, sealing performance on an intimate contact surface when contacting the rotation shaft 17A, heat resistance when temperature increases, pressure resistance when pressure increases, and strength. The sealing ring 1 can contact the outer peripheral surface 17Aa of the rotating rotation shaft 17A, and hence it is desired that the sealing ring 1 have a low friction coefficient. For example, the sealing ring 1 is formed from PEEK resin, PEEK composite material filled with glass or carbon fiber, or polymer material. For example, the sealing ring 1 is formed from metal material, such as stainless steel. The sealing ring 1 may have a coating of soft material (for example, silver plating, synthetic resin coating, or rubber vulcanization) on the surface of metal material. Instead of the coating, the sealing ring 1 may be formed by inserting similar soft material into metal material. In this manner, the adhesion of the sealing ring 1 when contacting the rotation shaft 17A or the sealing housing 17B can be improved.

It is desired that the sealing ring 1 have elastic force by itself and be configured such that when the sealing ring 1 is biased in a direction in which the its ends are away from each other, that is, so as to be increased in diameter to the radially outer side, the contact surface 1b is separated away from the outer peripheral surface 17Aa of the rotation shaft 17A.

The pressing member 2 is provided so as to be movable in the axial direction (vertical direction) in the recess 17Ba in the sealing housing 17B. The pressing member 2 may be formed into a ring shape along the circumferential direction so as to surround the outer peripheral surface 17Aa of the rotation shaft 17A, and pressing members 2 may be disposed at a plurality of locations along the circumferential direction. When the pressing members 2 are disposed at a plurality of locations, it is desired that the pressing members 2 be equiangularly disposed in the circumferential direction at at least three locations, and the individual pressing members 2 be supported so as to be movable in the axial direction (vertical direction) in the recess 17Ba in the sealing housing 17B.

As illustrated in FIG. 4, the pressing member 2 is formed to have a trapezoidal cross-sectional shape in which one side of a rectangular shape is inclined and the remaining three sides are disposed at right angle. In the pressing member 2, an inclined surface 2a is disposed from the radially inner side to the radially outer side so as to be inclined to the axially upper side toward the radially inner side and the axially upper side. A surface of the pressing member 2 that is adjacent to the inclined surface 1a and faces the axially upper side constitutes a top surface 2b formed to have a flat shape along the radial direction. A surface of the pressing member 2 that is adjacent to the top surface 2b and faces the radially outer side constitutes an outer surface 2c that is formed to have an arc shape along the axial direction and the circumferential direction and that contacts the interior surface of the recess 17Ba in the sealing housing 17B. The interior surface of the recess 17Ba in the sealing housing 17B is formed to have an arc shape along the axial direction and the circumferential direction similarly to the shape of the outer surface 2c of the pressing member 2. Thus, the pressing member 2 is guided so as to be movable in the axial direction (vertical direction) while the outer surface 2c contacts the interior surface of the recess 17Ba in the sealing housing 17B. A hole 2d opened inward is formed in a surface of the pressing member 2 that is opposite to the top surface 2b and faces the axially lower side.

It is desired that the pressing member 2 have corrosion resistance, heat resistance when temperature increases, pressure resistance when pressure increases, and strength. For example, the pressing member 2 is formed from metal material, such as stainless steel.

The elastic member 3 is formed as a compression spring. Specifically, the elastic member 3 is formed as a compression coil spring or a leaf spring. The elastic member 3 is housed in the hole 2d in the pressing member 2, and biases the pressing member 2 between the bottom surface of the recess 17Ba in the sealing housing 17B and the pressing member 2 such that the pressing member 2 moves to the axially upper side due to elastic force. The elastic member 3 may be formed as a tension spring.

The inclined surface 2a of the pressing member 2 is formed into the same shape as the inclined surface 1a of the sealing ring 1. Thus, when the pressing member 2 moves to the axially upper side due to the elastic force of the elastic member 3, as illustrated in FIG. 5, the sealing ring 1 is pressed to the axially upper side and the radially inner side. The sealing ring 1 moves to the radially inner side because the top surface 1c of the sealing ring 1 is in contact with the top surface of the recess 17Ba in the sealing housing 17B. Thus, the sealing ring 1 is reduced in diameter to the radially inner side. In the sealing ring 1 whose diameter is reduced to the radially inner side, its ends abut each other to be continuous in the circumferential direction. Then, the contact surface 1b of the sealing ring 1 contacts the outer peripheral surface 17Aa along the circumferential direction of the rotation shaft 17A. The sealing ring 1 in this state closes a predetermined clearance S1 between the inner circumferential surface 23a of the sealing housing 17B (constituent member 23) and the outer peripheral surface 17Aa of the rotation shaft 17A, and vertically partitions the axial direction of the rotation shaft 17A between the rotation shaft 17A and the sealing housing 17B. As a result, the flow of the primary coolant in the clearance S1 is suppressed to prevent the leakage of the primary coolant. The movement position of the pressing member 2 at which the sealing ring 1 is reduced in diameter such that the contact surface 1b contacts the outer peripheral surface 17Aa of the rotation shaft 17A as illustrated in FIG. 5 is referred to as "pressing position". On the other hand, the movement position of the pressing member 2 at which the diameter of the sealing ring 1 increases to retract the pressing member 2 from the pressing position such that the contact surface 1b is separated away from the outer peripheral surface 17Aa of the rotation shaft 17A as illustrated in FIG. 4 is referred to as "retracted position". When the contact surface 1b of the sealing ring 1 is provided so as to be separated away from the outer peripheral surface 17Aa of the rotation shaft 17A, the predetermined clearance S1 is secured between the inner circumferential surface 23a of the sealing housing 17B (constituent member 23) and the outer peripheral surface 17Aa of the rotation shaft 17A.

The support member 4 supports the pressing member 2 at the retracted position against the elastic force of the elastic member 3. The support member 4 allows the pressing member 2 to move to the pressing position at the predetermined temperature or higher. At lower than the predetermined temperature set in advance, the support member 4 can maintain its shape and secure the mechanical strength. The support member 4 is disposed in the recess 17Ba in the sealing housing 17B in a space defined by the top surface 2b of the pressing member 2 and the outer surface 1d of the sealing ring 1. The support member 4 may have a ring shape along the circumferential direction so as to surround the outer peripheral surface 17Aa of the rotation shaft 17A, and a part of the ring shape may be removed. In FIG. 4, the support member 4 has a rectangular cross-sectional shape, but the cross-sectional shape is not limited to this shape. When the mechanical strength of the support member 4 is secured at lower than the predetermined temperature, the support member 4 is interposed between the top surface 2b of the pressing member 2 and the top surface of the recess 17Ba, thereby preventing the pressing member 2 from moving to the axially upper side against the elastic force of the elastic member 3. Thus, the pressing member 2 is supported at the retracted position. Thus, the sealing ring 1 is disposed such that the contact surface 1b is separated away from the outer peripheral surface 17Aa of the rotation shaft 17A.

The support member 4 buckles to lose mechanical strength at the predetermined temperature or higher. The predetermined temperature is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. The material of the support member 4 that buckles at about 150° C. or higher as the predetermined temperature is resin material, and, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.). The buckling as used herein refers to an operation that the support member 4 is softened and deformed because the support member 4 cannot bear the elastic force of the elastic member 3. The whole of the support member 4 may be deformed or a part of the support member 4 may be deformed. It is desired that the support member 4 be deformed but does not fuse at the predetermined temperature or higher. When losing the mechanical strength by buckling, the support member 4 cannot bear the elastic force of the elastic member 3 and allows the movement of the pressing member 2 to the pressing position. Thus, the sealing ring 1 is disposed such that the contact surface 1b contacts the outer peripheral surface 17Aa of the rotation shaft 17A.

The communicating portion 5 communicates between the outer peripheral surface 17Aa of the rotation shaft 17A and the outer circumferential portion of the support member 4. As illustrated in FIG. 4, the communicating portion 5 is provided so as to pass through the pressing member 2 in the radial direction and the axial direction to communicate between the outer peripheral surface 17Aa of the rotation shaft 17A and the inside of the recess 17Ba in the sealing housing 17B. As illustrated in FIG. 4, the communicating portion 5 is provided so as to pass through the contact surface 1b and the outer surface 1d of the sealing ring 1 in the radial direction to communicate between the outer peripheral surface 17Aa of the rotation shaft 17A and the inside of the recess 17Ba in the sealing housing 17B. The communicating portion 5 is provided in at least one of the pressing member 2 and the sealing ring 1.

In the shaft sealing structure in the first embodiment, during normal operation of the primary coolant circulation pump 17, the temperature of the primary coolant is lower than a predetermined temperature, and hence as illustrated in FIG. 4, the support member 4 secures its mechanical strength and supports the pressing member 2 at the retracted position. The sealing ring 1 is disposed such that the contact surface 1b is separated away from the outer peripheral surface 17Aa of the rotation shaft 17A, and a predetermined clearance S1 is secured between the inner circumferential surface 23a of the sealing housing 17B (constituent member 23) and the outer peripheral surface 17Aa of the rotation shaft 17A. Thus, as illustrated by the solid arrows in FIG. 4, the primary coolant can flow through the predetermined clearance S1 from the axially lower side to the axially upper side, and the first sealing 17C, the second sealing 17D, and the third sealing 17E of the primary coolant circulation pump 17 function such that the rotation shaft 17A can rotate smoothly.

In case of station blackout, on the other hand, the operation of the primary coolant circulation pump 17 is stopped and the primary coolant does not circulate for cooling, and hence the temperature of the primary coolant increases to be equal to or higher than the predetermined temperature. As illustrated by broken-line arrows in FIG. 5, the primary coolant having the predetermined temperature or higher flows from the outer peripheral surface 17Aa of the rotation shaft 17A to reach the outer circumferential portion of the support member 4 through the communicating portion 5. The outer circumferential portion of the support member 4 is exposed to the primary coolant having the predetermined temperature or higher, and the support member 4 is softened and deformed and cannot maintain its shape and buckles. Then, the pressing member 2 moves to the pressing position, and the sealing ring 1 is reduced in diameter such that the contact surface 1b contacts the outer peripheral surface 17Aa of the rotation shaft 17A. Thus, the flow of the primary coolant in a clearance between the sealing ring 1 and the rotation shaft 17A can be suppressed to suppress the leakage of the primary coolant from the first sealing 17C to the second sealing 17D. As a result, the temperature increase in the second sealing 17D and the third sealing 17E in the primary coolant circulation pump 17 can be suppressed to improve safety and reliability. In FIG. 5, the support member 4 is deformed and buckles, but the illustration of the behavior is omitted. In FIG. 5, the support member 4 is present in the recess 17Ba in the sealing housing 17B in a space defined by the top surface 2b of the pressing member 2 and the outer surface 1d of the sealing ring 1.

As described above, the shaft sealing structure in the first embodiment includes the communicating portion 5 that communicates between the outer peripheral surface 17Aa of the rotation shaft 17A and the outer circumferential portion of the support member 4. Thus, the primary coolant having the predetermined temperature or higher can be caused to flow to the outer circumferential portion of the support member 4 through the communicating portion 5, and temperature can be uniformly transferred to the entire support member 4 in the circumferential direction. As a result, the support member 4 can be buckled uniformly in the circumferential direction, and the pressing member 2 can be moved to the pressing position uniformly in the circumferential direction such that the sealing ring 1 can be brought into contact with the rotation shaft 17A uniformly in the circumferential direction. Consequently, the shaft sealing structure in the first embodiment can be reliably and smoothly operated.

In the sealing ring 1, at a shoulder part where the contact surface 1b and the top surface 1c are continuous, a split ring 1e called "ring" that protrudes in the opposite side so as to constitute a part of the contact surface 1b and the top surface 1c is integrally provided. In a situation where the primary coolant has an exceptionally high temperature that deteriorates mechanical properties of the sealing ring 1, the split ring 1e secures the contact with the outer peripheral surface 17Aa of the rotation shaft 17A, and secures the suppression of the flow of the primary coolant.

Second Embodiment

Figure 6:
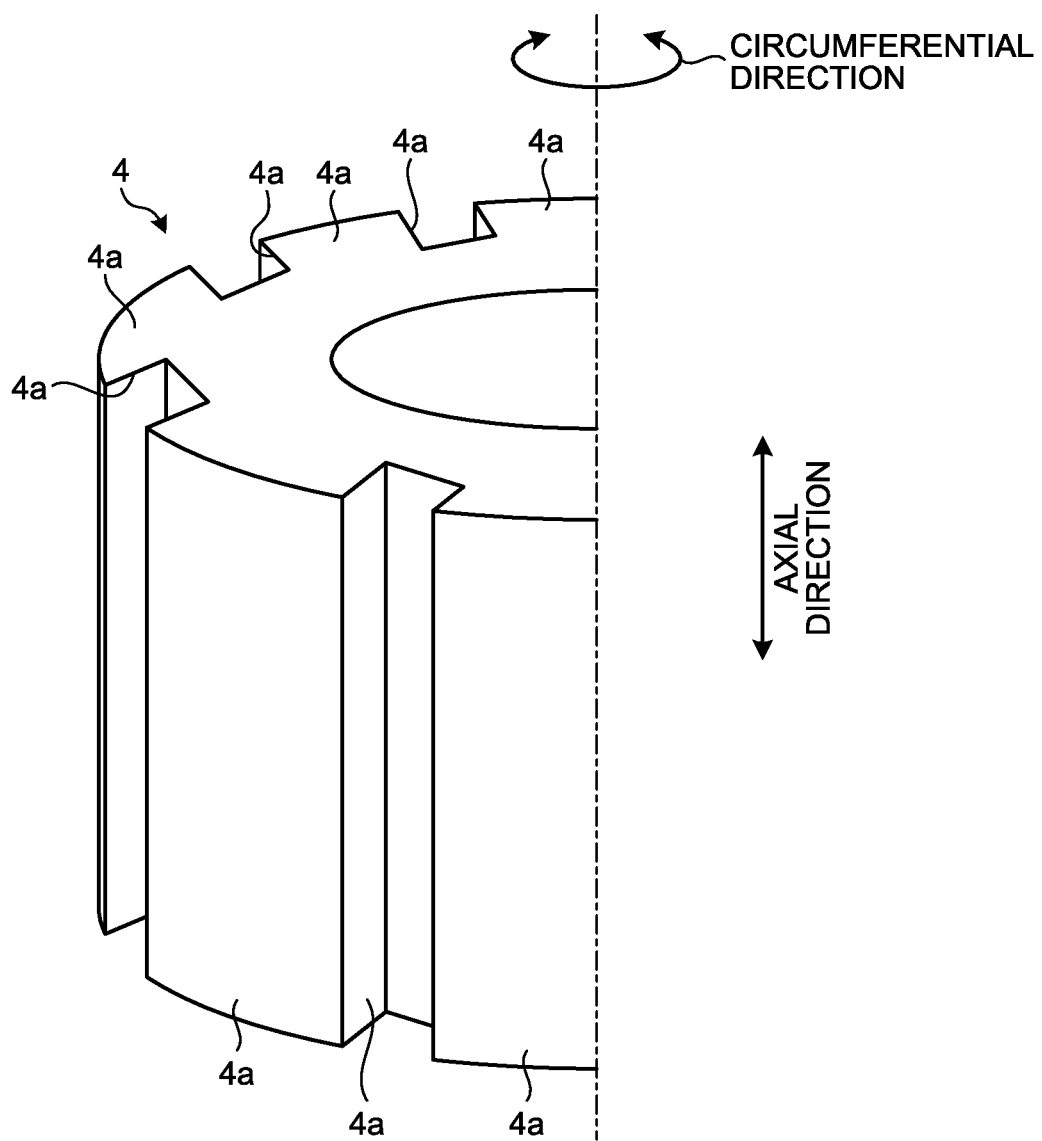
FIG. 6 is a partial enlarged perspective view of a shaft sealing structure for a primary coolant circulation pump according to a second embodiment of the present invention.

FIG. 6 is a partial enlarged perspective view of a shaft sealing structure for a primary coolant circulation pump according to a second embodiment.

The shaft sealing structure in the second embodiment is different from the shaft sealing structure in the above-mentioned first embodiment in the configuration of the support member 4.

As illustrated in FIG. 6, the support member 4 may be formed into a ring shape along the circumferential direction so as to surround the outer peripheral surface 17Aa of the rotation shaft 17A, and a part of the ring shape may be removed. As illustrated in FIG. 6, the support member 4 has recesses and protrusions 4a on its surface. The recesses and protrusions 4a may be formed such that a plurality of recesses (notches) are arranged in a row in the surface of the support member 4 or such that a plurality of protrusions (fins) are arranged in a row on the surface of the support member 4. The recesses and protrusions 4a illustrated in FIG. 6 are formed along the axial direction such that protrusions or recesses are provided continuously in the axial direction. Although not specified in FIG. 6, the recesses and protrusions 4a may be formed along the circumferential direction such that protrusions or recesses are provided continuously in the circumferential direction. Alternatively, although not specified in FIG. 6, the recesses and protrusions 4a may be formed along a spiral direction (direction defined by combining axial direction and circumferential direction) such that protrusions or recesses are provided continuously in the spiral direction. Alternatively, although not specified in FIG. 6, the recesses and protrusions 4a may be formed by combining the above-mentioned forms. The recesses and protrusions 4a illustrated in FIG. 6 are formed such that protrusions or recesses are provided so as to protrude or be recessed in a rectangular shape, but protrusions or recesses may be provided so as to protrude or be recessed in an arc shape. In FIG. 6, the recesses and protrusions 4a are formed such that protrusions or recesses are linearly continuous, but may be protrusions that are partially provided to the surface of the support member 4 as protrusions or may be recesses that are partially provided to the surface of the support member 4 as dimples. In FIG. 6, the recesses and protrusions 4a are provided on the radially outer surface of the ring-shaped support member 4, but may be provided on at least one of the radially outer surface, the radially inner surface, the axially upper surface, and the axially lower surface. The recesses and protrusions 4a are designed such that mechanical strength for supporting the pressing member 2 at the retracted position against the elastic force of the elastic member 3 can be secured during normal operation of the primary coolant circulation pump 17.

In the shaft sealing structure in the second embodiment, as illustrated in FIG. 6, the support member 4 has the recesses and protrusions 4a formed on its surface. Thus, the contact area where the support member 4 contacts the primary coolant can be increased by the recesses and protrusions 4a to promote the transfer of heat in the support member 4. As a result, the support member 4 can be buckled uniformly in the circumferential direction such that the pressing member 2 can be moved to the pressing position uniformly in the circumferential direction and the sealing ring 1 can be brought into contact with the rotation shaft 17A uniformly in the circumferential direction. Consequently, the shaft sealing structure in the second embodiment can be reliably and smoothly operated.

It is desired that the shaft sealing structure in the second embodiment have the communicating portion 5 in the shaft sealing structure in the above-mentioned first embodiment, but the shaft sealing structure in the second embodiment may have the configuration of the support member 4 having the recesses and protrusions 4a described above without the communicating portion 5.

Third Embodiment

Figure 7:
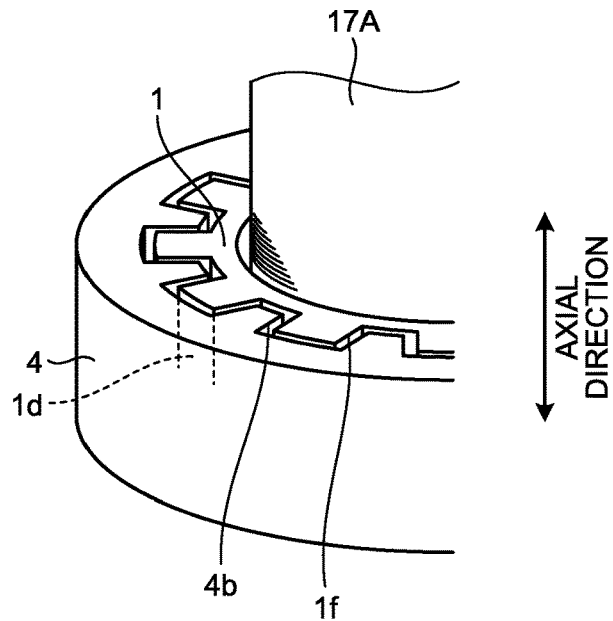
FIG. 7 is a partial enlarged perspective view of a shaft sealing structure for a primary coolant circulation pump according to a third embodiment of the present invention.
Figure 8:
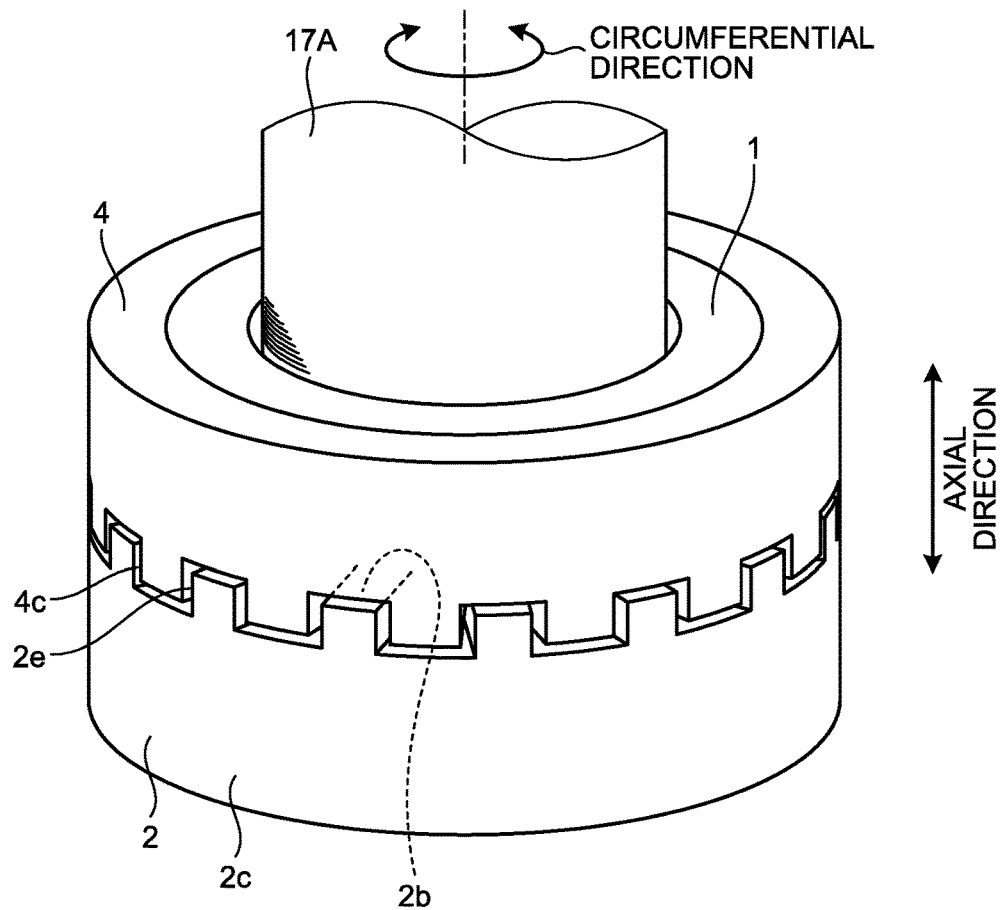
FIG. 8 is a partial enlarged perspective view of a shaft sealing structure for a primary coolant circulation pump according to the third embodiment of the present invention.

FIG. 7 is a partial enlarged perspective view of a shaft sealing structure for a primary coolant circulation pump according to a third embodiment. FIG. 8 is a partial enlarged perspective view of the shaft sealing structure for the primary coolant circulation pump according to the third embodiment.

The shaft sealing structure in the third embodiment is different from the shaft sealing structure in the above-mentioned first embodiment in the configurations of the sealing ring 1 and the support member 4 as illustrated in FIG. 7. The shaft sealing structure in the third embodiment is different from the shaft sealing structure in the above-mentioned first embodiment in the configurations of the pressing member 2 and the support member 4 as illustrated in FIG. 8.

As illustrated in FIG. 7, the support member 4 may be formed into a ring shape along the circumferential direction so as to surround the outer peripheral surface 17Aa of the rotation shaft 17A, and a part of the ring shape may be divided. As illustrated in FIG. 7, the support member 4 has recesses and protrusions 4b formed on its surface on the radially inner side. The recesses and protrusions 4b may be formed such that a plurality of recesses (notches) are arranged in a row in the surface of the support member 4 or such that a plurality of protrusions (fins) are arranged in a row on the surface of the support member 4. The recesses and protrusions 4b illustrated in FIG. 7 are formed along the axial direction such that protrusions or recesses are provided continuously in the axial direction. Although not specified in FIG. 7, the recesses and protrusions 4b may be formed along the circumferential direction such that protrusions or recesses are provided continuously in the circumferential direction. Alternatively, although not specified in FIG. 7, the recesses and protrusions 4b may be formed along a spiral direction (direction defined by combining axial direction and circumferential direction) such that protrusions or recesses are provided continuously in the spiral direction. Alternatively, although not specified in FIG. 7, the recesses and protrusions 4b may be formed by combining the above-mentioned forms. The recesses and protrusions 4b illustrated in FIG. 7 are formed such that protrusions or recesses are provided so as to protrude or be recessed in a rectangular shape, but protrusions or recesses may be provided so as to protrude or be recessed in an arc shape. In FIG. 7, the recesses and protrusions 4b are formed such that protrusions or recesses are linearly continuous, but may be protrusions that are partially provided to the surface of the support member 4 as protrusions or may be recesses that are partially provided to the surface of the support member 4 as dimples. The recesses and protrusions 4a are designed such that mechanical strength for supporting the pressing member 2 at the retracted position against the elastic force of the elastic member 3 can be secured during normal operation of the primary coolant circulation pump 17.

As illustrated in FIG. 7, in the sealing ring 1, recesses and protrusions 1f to be engaged with the recesses and protrusions 4b of the support member 4 are formed on the outer surface 1d opposed to the surface of the support member 4. The shape of the recesses and protrusions 1f of the sealing ring 1 conforms to the shape of the recesses and protrusions 4b of the support member 4.

As illustrated in FIG. 7, in the shaft sealing structure in the third embodiment, the recesses and protrusions 4b are formed on the surface of the support member 4, and the recesses and protrusions 1f to be engaged with the recesses and protrusions 4b of the support member 4 are formed on the surface of the sealing ring 1. Thus, the contact area where the support member 4 contacts the primary coolant can be increased by the recesses and protrusions 4b to promote the transfer of heat in the support member 4. In addition, the engagement of the recesses and protrusions 4b and the recesses and protrusions 1f can promote the transfer of heat to the support member 4 through the sealing ring 1. As a result, the support member 4 can be buckled uniformly in the circumferential direction such that the pressing member 2 can be moved to the pressing position uniformly in the circumferential direction and the sealing ring 1 can be brought into contact with the rotation shaft 17A uniformly in the circumferential direction. Consequently, the shaft sealing structure in the third embodiment can be reliably and smoothly operated.

The sealing ring 1 is pressed when the pressing member 2 reaching the pressing position moves to the axially upper side, and hence as illustrated in FIG. 7, it is desired that the recesses and protrusions 4b of the support member 4 and the recesses and protrusions 1f of the sealing ring 1 be formed continuously along the axial direction in order to make the movement of the sealing ring 1 smooth.

As illustrated in FIG. 8, the support member 4 may be formed into a ring shape along the circumferential direction so as to surround the outer peripheral surface 17Aa of the rotation shaft 17A, and a part of the ring shape may be divided. As illustrated in FIG. 8, the support member 4 has recesses and protrusions 4c formed on its surface on the axially lower side. The recesses and protrusions 4c may be formed such that a plurality of recesses (notches) are arranged in a row in the surface of the support member 4 or such that a plurality of protrusions (fins) are arranged in a row on the surface of the support member 4. The recesses and protrusions 4c illustrated in FIG. 8 are formed along the radial direction such that protrusions or recesses are provided continuously in the radial direction. Although not specified in FIG. 8, the recesses and protrusions 4c may be formed along the circumferential direction such that protrusions or recesses are provided continuously in the circumferential direction. Alternatively, although not specified in FIG. 8, the recesses and protrusions 4c may be formed along a swirling direction (direction defined by combining radial direction and circumferential direction) such that protrusions or recesses are provided continuously in the swirling direction. Alternatively, although not specified in FIG. 8, the recesses and protrusions 4c may be formed by combining the above-mentioned forms. The recesses and protrusions 4c illustrated in FIG. 8 are formed such that protrusions or recesses are provided so as to protrude or be recessed in a rectangular shape, but protrusions or recesses may be provided so as to protrude or be recessed in an arc shape. In FIG. 8, the recesses and protrusions 4c are formed such that protrusions or recesses are linearly continuous, but may be protrusions that are partially provided to the surface of the support member 4 as protrusions or may be recesses that are partially provided to the surface of the support member 4 as dimples. The recesses and protrusions 4c are designed such that mechanical strength for supporting the pressing member 2 at the retracted position against the elastic force of the elastic member 3 can be secured during normal operation of the primary coolant circulation pump 17.

As illustrated in FIG. 8, in the pressing member 2, recesses and protrusions 2e to be engaged with the recesses and protrusions 4c of the support member 4 are formed on the top surface 2b opposed to the axially lower surface of the support member 4. The shape of the recesses and protrusions 2e of the pressing member 2 conforms to the shape of the recesses and protrusions 4c of the support member 4. The pressing member 2 may have a ring shape as illustrated in FIG. 8, but pressing members 2 may be disposed at a plurality of locations along the circumferential direction.

In the shaft sealing structure in the third embodiment, on the other hand, as illustrated in FIG. 8, the recesses and protrusions 4c are formed on the surface of the support member 4, and the recesses and protrusions 2e to be engaged with the recesses and protrusions 4c of the support member 4 are formed on the surface of the pressing member 2. Thus, the contact area where the support member 4 contacts the primary coolant can be increased by the recesses and protrusions 4c to promote the transfer of heat in the support member 4. In addition, the engagement of the recesses and protrusions 4c and the recesses and protrusions 2e can promote the transfer of heat to the support member 4 through the pressing member 2. As a result, the support member 4 can be buckled uniformly in the circumferential direction such that the pressing member 2 can be moved to the pressing position uniformly in the circumferential direction and the sealing ring 1 can be brought into contact with the rotation shaft 17A uniformly in the circumferential direction. Consequently, the shaft sealing structure in the third embodiment can be reliably and smoothly operated.

The shaft sealing structure in the third embodiment may combine the configurations of the support member 4 and the sealing ring 1 illustrated in FIG. 7 and the configurations of the support member 4 and the pressing member 2 illustrated in FIG. 8.

It is desired that the shaft sealing structure in the third embodiment have the communicating portion 5 in the shaft sealing structure in the above-mentioned first embodiment, but the shaft sealing structure in the third embodiment may have the configurations of the support members 4 having the recesses and protrusions 4b and 4c, the configuration of the sealing ring 1 having the recesses and protrusions 1f, and the configuration of the pressing member 2 having the recesses and protrusions 2e described above without the communicating portion 5.

Fourth Embodiment

A shaft sealing structure in a fourth embodiment is different from the shaft sealing structure in the above-mentioned first embodiment in the configuration of the support member 4.

The support member 4 is formed by mixing resin material that is softened at a predetermined temperature or higher and heat conductive material having heat conductivity.

The predetermined temperature at which the resin material is softened is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material that is softened at about 150° C. or higher as the predetermined temperature, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.)

Examples of the heat conductive material include composite material and filler. As composite material, for example, it is desired to apply carbon fiber reinforced plastic (CFRP) or glass fiber reinforced plastic (GFRP). As filler, it is desired to apply aluminum oxide ($Al_2O_3$), aluminum nitride (AlN), or boron nitride (BN).

As the shape of the support member 4, the shape in each of the above-mentioned and following embodiments can be applied.

In the shaft sealing structure in the fourth embodiment, the support member 4 is formed by mixing resin material that is softened at a predetermined temperature or higher and heat conductive material having heat conductivity. Thus, the thermal conductivity of the support member 4, which is about 0.5 W/m·K with the resin material that is softened at the predetermined temperature or higher alone, can be improved to several to several tens of W/m·K to improve the transfer of heat in the support member 4. As a result, the support member 4 can be buckled uniformly in the circumferential direction such that the pressing member 2 can be moved to the pressing position uniformly in the circumferential direction and the sealing ring 1 can be brought into contact with the rotation shaft 17A uniformly in the circumferential direction. Consequently, the shaft sealing structure in the fourth embodiment can be reliably and smoothly operated.

In addition, in the shaft sealing structure in the fourth embodiment, because the support member 4 is formed by mixing resin material that is softened at the predetermined temperature or higher and heat conductive material having heat conductivity, the mechanical strength can be improved by the heat conductive material, and hence the support member 4 can be made thin. Thus, heat transfer performance can be enhanced such that the support member 4 is softened by small heat input.

It is desired that the shaft sealing structure in the fourth embodiment have the communicating portion 5 in the shaft sealing structure in the above-mentioned first embodiment, but the shaft sealing structure in the fourth embodiment may have the configuration of the above-mentioned support member 4 without the communicating portion 5.

Fifth Embodiment

Figure 9:
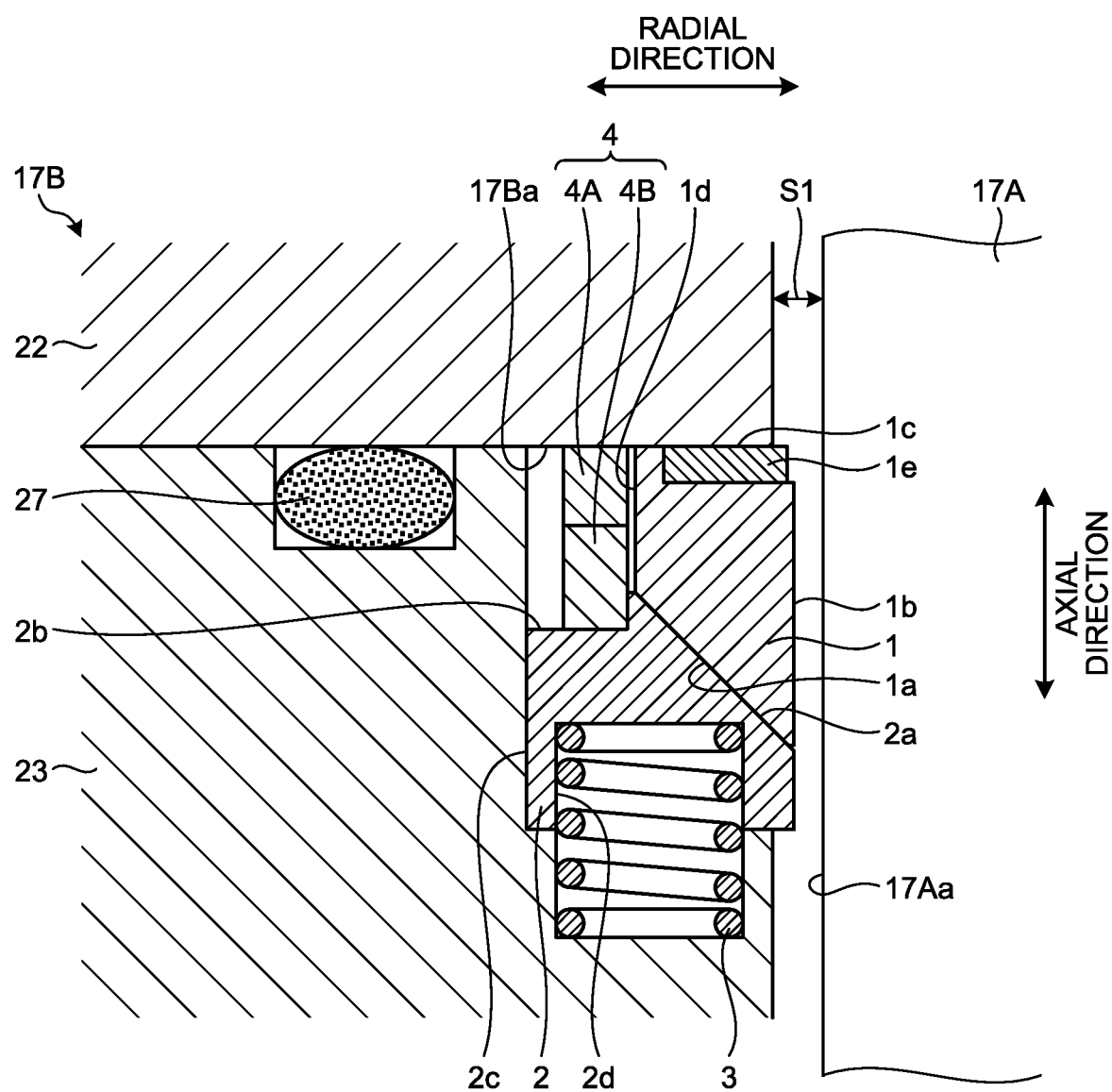
FIG. 9 is a partial enlarged cross-sectional view of a shaft sealing structure for a primary coolant circulation pump according to a fifth embodiment of the present invention.
Figure 10:
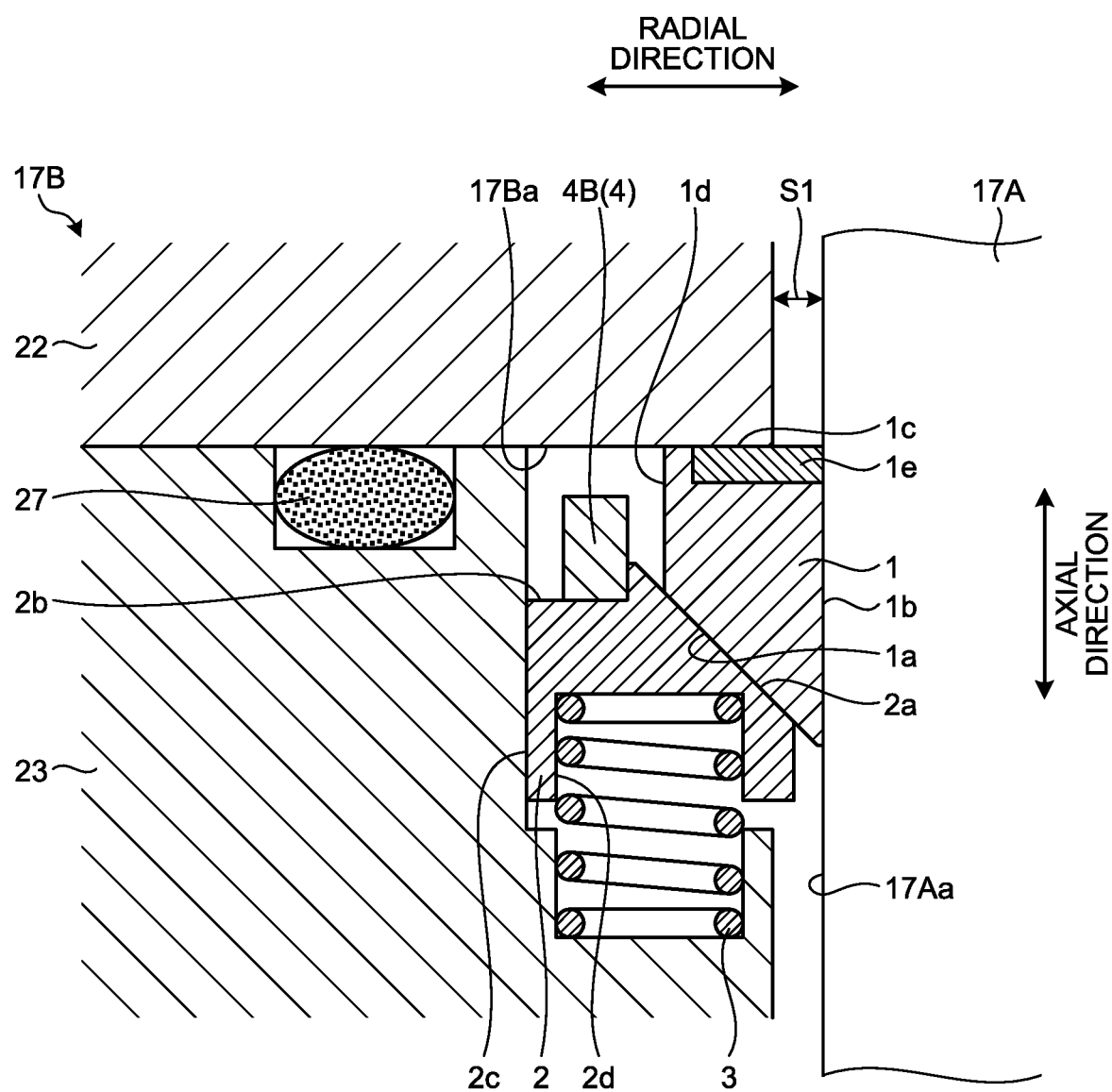
FIG. 10 is a partial enlarged cross-sectional view illustrating the operation of the shaft sealing structure for the primary coolant circulation pump according to the fifth embodiment of the present invention.

FIG. 9 is a partial enlarged cross-sectional view of a shaft sealing structure for a primary coolant circulation pump according to a fifth embodiment. FIG. 10 is a partial enlarged cross-sectional view illustrating operation of the shaft sealing structure for the primary coolant circulation pump according to the fifth embodiment.

The shaft sealing structure in the fifth embodiment is different from the shaft sealing structure in the above-mentioned first embodiment in the configuration of the support member 4.

As illustrated in FIG. 9, the support member 4 is formed by being divided into a softened portion 4A and a heat transfer portion 4B.

The softened portion 4A may be formed into a ring shape along the circumferential direction so as to surround the outer peripheral surface 17Aa of the rotation shaft 17A, and a part of the ring shape may be divided. The softened portion 4A is softened at a predetermined temperature or higher. The softened portion 4A is formed from resin material that is softened at the predetermined temperature or higher. The predetermined temperature at which the softened portion 4A is softened is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material that is softened at about 150° C. or higher as the predetermined temperature, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.)

The heat transfer portion 4B may be formed into a ring shape along the circumferential direction so as to surround the outer peripheral surface 17Aa of the rotation shaft 17A, and a part of the ring shape may be divided. The heat transfer portion 4B is made of metal material, such as copper and an aluminum alloy. The heat transfer portion 4B is made of composite material, such as carbon fiber reinforced plastic (CFRP) or glass fiber reinforced plastic (GFRP).

As illustrated in FIG. 9, in the support member 4, the softened portion 4A and the heat transfer portion 4B described above are provided along the axial direction that is the movement direction of the pressing member 2. In FIG. 9, the softened portion 4A is provided so as to be capable of contacting the top surface of the recess 17Ba in the sealing housing 17B on the axially upper side, and the heat transfer portion 4B is provided so as to be capable of contacting the top surface 2b of the pressing member 2 on the axially lower side. The arrangement of the softened portion 4A and the heat transfer portion 4B is not limited to the above, and the arrangement order in the axial direction may be reversed. The number of the softened portions 4A and the number of the heat transfer portions 4B are not limited to one. At least one of the number of the softened portions 4A and the number of the heat transfer portions 4B may be plural, and the softened portions 4A and the heat transfer portions 4B may be disposed alternately in the axial direction.

In the shaft sealing structure in the fifth embodiment, the support member 4 is formed by being divided into the softened portion 4A that is softened at a predetermined temperature or higher and the heat transfer portion 4B having heat conductivity, and the softened portion 4A and the heat transfer portion 4B are provided along the movement direction of the pressing member 2 (axial direction). Thus, the heat conductivity is increased by the heat transfer portion 4B, and hence the transfer of heat in the support member 4 (softened portion 4A) can be improved. As a result, the support member 4 (softened portion 4A) can be buckled uniformly in the circumferential direction such that the pressing member 2 can be moved to the pressing position uniformly in the circumferential direction and the sealing ring 1 can be brought into contact with the rotation shaft 17A uniformly in the circumferential direction. Consequently, the shaft sealing structure in the fifth embodiment can be reliably and smoothly operated.

In the shaft sealing structure in the fifth embodiment, the heat transfer portion 4B of the support member 4 is less likely to be softened even at the predetermined temperature or higher. Thus, as illustrated in FIG. 10, in case of station blackout, the heat transfer portion 4B is present in the recess 17Ba in the sealing housing 17B in a space defined by the top surface 2b of the pressing member 2 and the outer surface 1d of the sealing ring 1 in a manner that the pressing member 2 moves to the pressing position and the sealing ring 1 is reduced in diameter such that the contact surface 1b contacts the outer peripheral surface 17Aa of the rotation shaft 17A. The size and shape of the heat transfer portion 4B are determined so as not to interfere the operation of the pressing member 2 to press the sealing ring 1 in this state.

The softened portion 4A and the heat transfer portion 4B of the support member 4 may be formed so as to be fitted together by protrusions and recesses. Thus, when the pressing member 2 is supported at the retracted position, the supporting force can be secured by the mutual fitting of the softened portion 4A and the heat transfer portion 4B.

It is desired that the shaft sealing structure in the fifth embodiment have the communicating portion 5 in the shaft sealing structure in the above-mentioned first embodiment, but the shaft sealing structure in the fifth embodiment may have the configuration of the above-mentioned support member 4 without the communicating portion 5.

Sixth Embodiment

Figure 11:
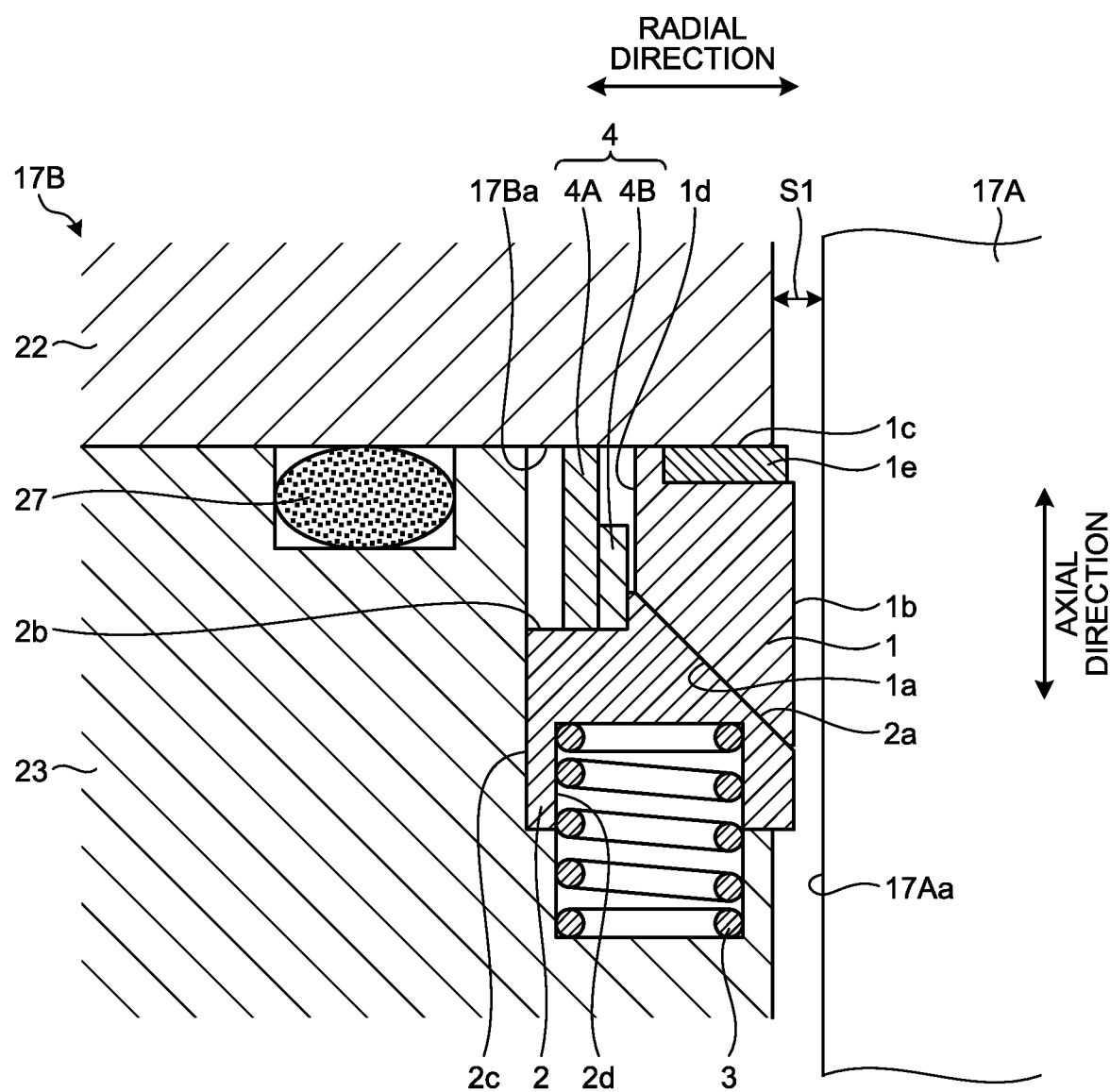
FIG. 11 is a partial enlarged cross-sectional view of a shaft sealing structure for a primary coolant circulation pump according to a sixth embodiment of the present invention.
Figure 12:
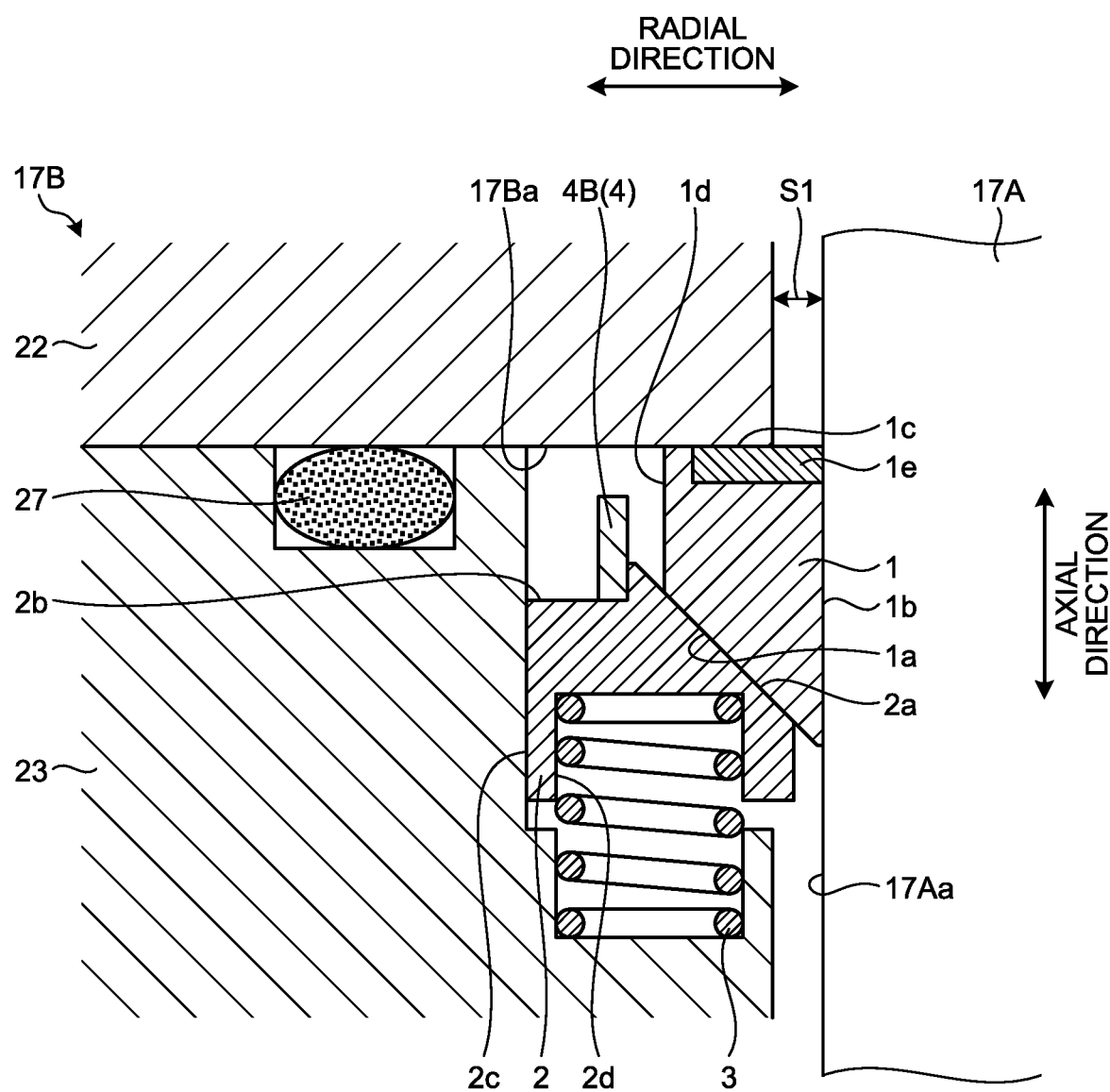
FIG. 12 is a partial enlarged cross-sectional view illustrating the operation of the shaft sealing structure for the primary coolant circulation pump according to the sixth embodiment of the present invention.

FIG. 11 is a partial enlarged cross-sectional view of a shaft sealing structure for a primary coolant circulation pump according to a sixth embodiment. FIG. 12 is a partial enlarged cross-sectional view illustrating operation of the shaft sealing structure for the primary coolant circulation pump according to the sixth embodiment.

The shaft sealing structure in the sixth embodiment is different from the shaft sealing structure in the above-mentioned first embodiment in the configuration of the support member 4.

As illustrated in FIG. 11, the support member 4 is formed by being divided into a softened portion 4A and a heat transfer portion 4B.

The softened portion 4A may be formed into a ring shape along the circumferential direction so as to surround the outer peripheral surface 17Aa of the rotation shaft 17A, and a part of the ring shape may be divided. The softened portion 4A is softened at a predetermined temperature or higher. The softened portion 4A is formed from resin material that is softened at the predetermined temperature or higher. The predetermined temperature at which the softened portion 4A is softened is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material that is softened at about 150° C. or higher as the predetermined temperature, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.)

The heat transfer portion 4B may be formed into a ring shape along the circumferential direction so as to surround the outer peripheral surface 17Aa of the rotation shaft 17A, and a part of the ring shape may be divided. The heat transfer portion 4B is made of metal material, such as copper and an aluminum alloy. The heat transfer portion 4B is made of composite material, such as carbon fiber reinforced plastic (CFRP) or glass fiber reinforced plastic (GFRP).

As illustrated in FIG. 11, in the support member 4, the softened portion 4A and the heat transfer portion 4B described above are provided along the radial direction intersecting the movement direction of the pressing member 2. In FIG. 11, the softened portion 4A is provided on the radially outer side, and the heat transfer portion 4B is provided on the radially inner side. The arrangement of the softened portion 4A and the heat transfer portion 4B is not limited to the above, and the arrangement order in the radial direction may be reversed. When the mechanical strength of the softened portion 4A is secured at lower than the predetermined temperature, the softened portion 4A is interposed between the top surface 2b of the pressing member 2 and the top surface of the recess 17Ba, thereby preventing the pressing member 2 from moving to the axially upper side against the elastic force of the elastic member 3. Thus, the pressing member 2 is supported at the retracted position. Thus, the sealing ring 1 is disposed such that the contact surface 1b is separated away from the outer peripheral surface 17Aa of the rotation shaft 17A. The heat transfer portion 4B is provided adjacent to the softened portion 4A in the radial direction, and does not involve the support of the pressing member 2.

In the shaft sealing structure in the fifth embodiment, the support member 4 is formed by being divided into the softened portion 4A that is softened at a predetermined temperature or higher and the heat transfer portion 4B having heat conductivity, and the softened portion 4A and the heat transfer portion 4B are provided along the radial direction intersecting the movement direction of the pressing member 2. Thus, the heat conductivity is increased by the heat transfer portion 4B, and hence the transfer of heat in the support member 4 (softened portion 4A) can be improved. In addition, the primary coolant having the predetermined temperature or higher can enter the region between the softened portion 4A and the heat transfer portion 4B, and hence the transfer of heat in the softened portion 4A can be improved. As a result, the support member 4 (softened portion 4A) can be buckled uniformly in the circumferential direction such that the pressing member 2 can be moved to the pressing position uniformly in the circumferential direction and the sealing ring 1 can be brought into contact with the rotation shaft 17A uniformly in the circumferential direction. Consequently, the shaft sealing structure in the sixth embodiment can be reliably and smoothly operated.

In the shaft sealing structure in the sixth embodiment, the heat transfer portion 4B in the support member 4 is less likely to be softened even at the predetermined temperature or higher. Thus, as illustrated in FIG. 12, in case of station blackout, the heat transfer portion 4B is present in the recess 17Ba in the sealing housing 17B in a space defined by the top surface 2b of the pressing member 2 and the outer surface 1d of the sealing ring 1 in a manner that the pressing member 2 moves to the pressing position and the sealing ring 1 is reduced in diameter such that the contact surface 1b contacts the outer peripheral surface 17Aa of the rotation shaft 17A. The size and shape of the heat transfer portion 4B are determined so as not to interfere the operation of the pressing member 2 to press the sealing ring 1 in this state.

It is desired that the shaft sealing structure in the sixth embodiment have the communicating portion 5 in the shaft sealing structure in the above-mentioned first embodiment, but the shaft sealing structure in the sixth embodiment may have the configuration of the above-mentioned support member 4 without the communicating portion 5.

Seventh Embodiment

Figure 13:
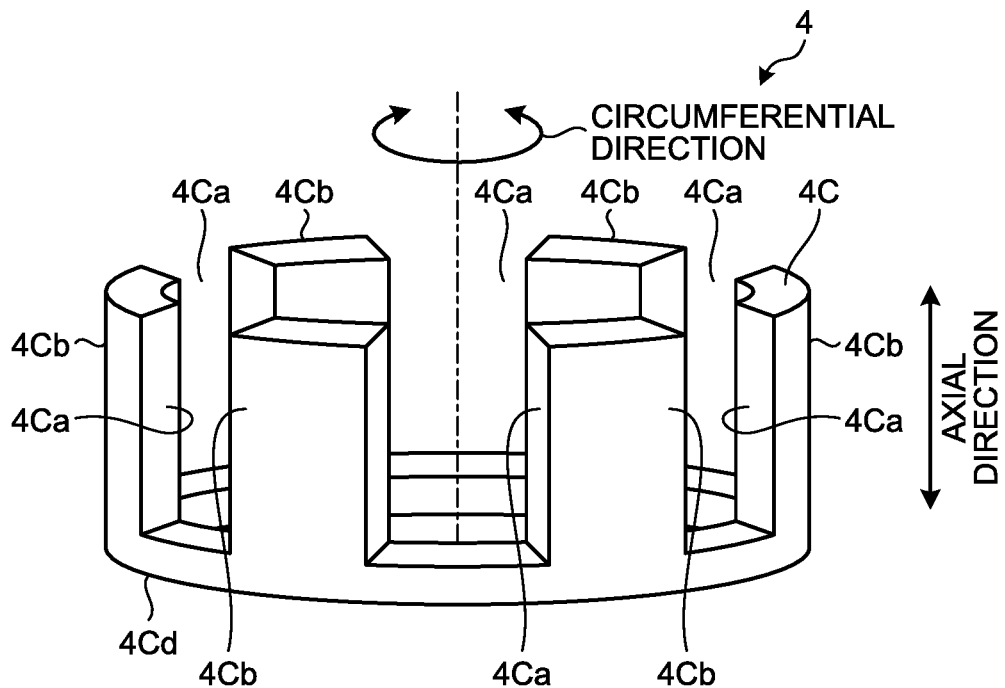
FIG. 13 is a partial enlarged perspective view of a shaft sealing structure for a primary coolant circulation pump according to a seventh embodiment of the present invention.
Figure 14:
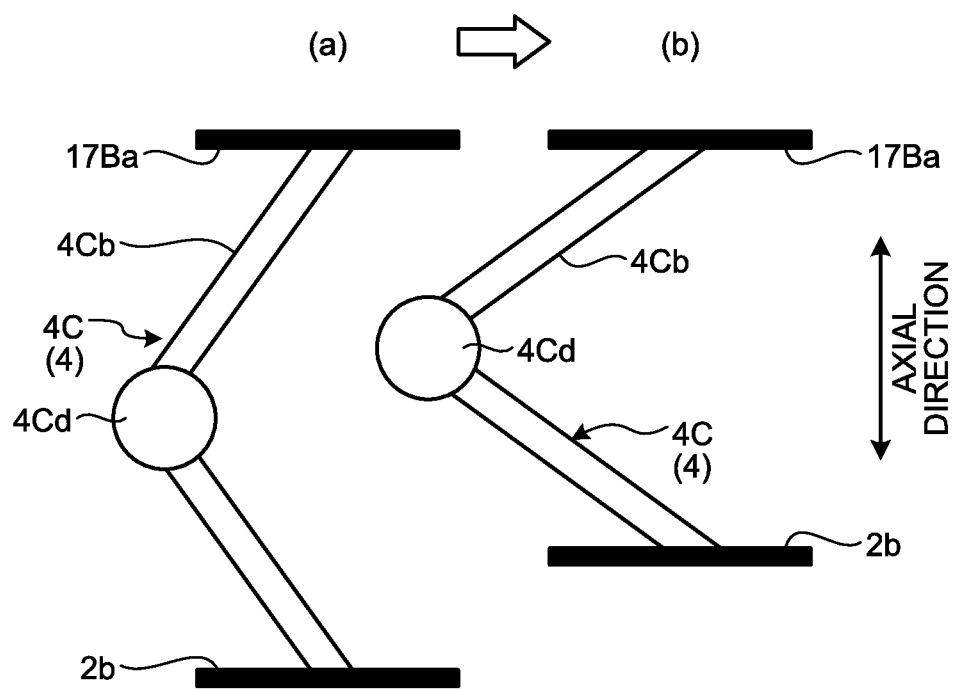
FIG. 14 is a schematic view illustrating operation of the shaft sealing structure for the primary coolant circulation pump according to the seventh embodiment of the present invention.

FIG. 13 is a partial enlarged cross-sectional view of a shaft sealing structure for a primary coolant circulation pump according to a seventh embodiment. FIG. 14 is a schematic view illustrating operation of the shaft sealing structure for the primary coolant circulation pump according to the seventh embodiment.

The shaft sealing structure in the seventh embodiment is different from the shaft sealing structure in the above-mentioned first embodiment in the configuration of the support member 4.

As illustrated in FIG. 13, the support member 4 is formed into a ring shape along the circumferential direction so as to surround the outer peripheral surface 17Aa of the rotation shaft 17A. As illustrated in FIG. 13, the support member 4 is formed as a cylindrical plate-shaped member 4C extending in the axial direction that is the movement direction of the pressing member 2, and a plurality of cutting grooves 4Ca extending in the axial direction are formed in the plate-shaped member 4C in the circumferential direction, so that the plate-shaped member 4C is divided into a plurality of thin columnar plate pieces 4Cb. The cutting groove 4Ca is formed up to the middle of each of the divided plate pieces 4Cb in the axial direction, and hence the divided plate pieces 4Cb are coupled together in the circumferential direction by a ring-shaped ring piece 4Cc. The support member 4 secures its mechanical strength at lower than a predetermined temperature, but is softened at the predetermined temperature or higher. The support member 4 is formed from resin material that is softened at the predetermined temperature or higher. The predetermined temperature at which the support member 4 is softened is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material that is softened at about 150° C. or higher as the predetermined temperature, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.)

In the shaft sealing structure in the seventh embodiment, during normal operation of the primary coolant circulation pump 17, the temperature of the primary coolant is lower than the predetermined temperature, and hence the support member 4 secures its mechanical strength at lower than the predetermined temperature. In this case, each plate piece 4Cb is interposed between the top surface 2b of the pressing member 2 and the top surface of the recess 17Ba, and thus prevents the pressing member 2 from moving to the axially upper side against the elastic force of the elastic member 3 by stretching. Thus, the support member 4 supports the pressing member 2 at the retracted position by each plate piece 4Cb. The sealing ring 1 is disposed such that the contact surface 1b is separated away from the outer peripheral surface 17Aa of the rotation shaft 17A, and a predetermined clearance S1 is secured between the inner circumferential surface 23a of the sealing housing 17B (constituent member 23) and the outer peripheral surface 17Aa of the rotation shaft 17A. Thus, as illustrated by solid arrows in FIG. 4, the primary coolant can flow through the predetermined clearance S1 from the axially lower side to the axially upper side, and the first sealing 17C, the second sealing 17D, and the third sealing 17E of the primary coolant circulation pump 17 function such that the rotation shaft 17A can rotate smoothly.

In case of station blackout, on the other hand, the operation of the primary coolant circulation pump 17 is stopped and the primary coolant does not circulate for cooling, and hence the temperature of the primary coolant increases to be equal to or higher than the predetermined temperature. The outer circumferential portion of the support member 4 is exposed to the primary coolant having the predetermined temperature or higher, and each plate piece 4Cb is softened and deformed and cannot maintain its shape and buckles. Then, as illustrated in FIG. 5, the pressing member 2 moves to the pressing position, and the sealing ring 1 is reduced in diameter such that the contact surface 1b contacts the outer peripheral surface 17Aa of the rotation shaft 17A. Thus, the flow of the primary coolant in the clearance between the sealing ring 1 and the rotation shaft 17A can be suppressed to suppress the leakage of the primary coolant from the first sealing 17C to the second sealing 17D. As a result, the temperature increase in the second sealing 17D and the third sealing 17E in the primary coolant circulation pump 17 can be suppressed to improve safety and reliability.

As described above, in the shaft sealing structure in the seventh embodiment, the support member 4 has the plate-shaped member 4C that supports the pressing member 2 located at the retracted position against the movement direction and is softened at the predetermined temperature or higher, and the plate-shaped member 4C is formed by being divided in the circumferential direction by the cutting grooves 4Ca extending in the movement direction of the pressing member 2. In this manner, the plate-shaped member 4C that is softened at the predetermined temperature or higher is divided into the plate pieces 4Cb by the cutting grooves 4Ca, and hence the softening is promoted at the predetermined temperature or higher. As a result, the support member 4 (each plate piece 4Cb) can be buckled uniformly in the circumferential direction such that the pressing member 2 can be moved to the pressing position uniformly in the circumferential direction and the sealing ring 1 can be brought into contact with the rotation shaft 17A uniformly in the circumferential direction. Consequently, the shaft sealing structure in the seventh embodiment can be reliably and smoothly operated.

In addition, because the support member 4 is divided into the plate pieces 4Cb, when one plate piece 4Cb buckles, the other plate pieces 4Cb buckle like dominoes, and hence the support member 4 can be buckled uniformly in the circumferential direction.

Each plate piece 4Cb is obtained by dividing the cylindrical plate-shaped member 4C by the cutting groove 4Ca, but without being limited thereto, a flat plate piece 4Cb obtained by being divided by the cutting groove 4Ca may be employed. The flat plate piece 4Cb can more easily buckle as compared with the arc-shaped plate piece 4Cb obtained by dividing the cylindrical plate-shaped member 4C.

In the shaft sealing structure in the seventh embodiment, the support member 4 is provided with an initial irregularity 4Cd that causes each plate piece 4Cb to buckle so as to allow the pressing member 2 to move to the pressing position. Specifically, as illustrated in (a) in FIG. 14, during normal operation of the primary coolant circulation pump 17, a bending portion is formed in advance at a portion to be buckled (in FIG. 14, center part in axial direction) as the initial irregularity 4Cd. Alternatively, a portion to be buckled (in FIG. 14, center part in axial direction) is formed in advance as the initial irregularity 4Cd so as to be thin. By providing the initial irregularity 4Cd as described above, the support member 4 can be more reliably buckled from the initial irregularity 4Cd as a start point at the predetermined temperature or higher. Consequently, the shaft sealing structure in the seventh embodiment can be reliably and smoothly operated.

It is desired that the shaft sealing structure in the seventh embodiment have the communicating portion 5 in the shaft sealing structure in the above-mentioned first embodiment, but the shaft sealing structure in the seventh embodiment may have the configuration of the above-mentioned support member 4 without the communicating portion 5.

Eighth Embodiment

Figure 15:
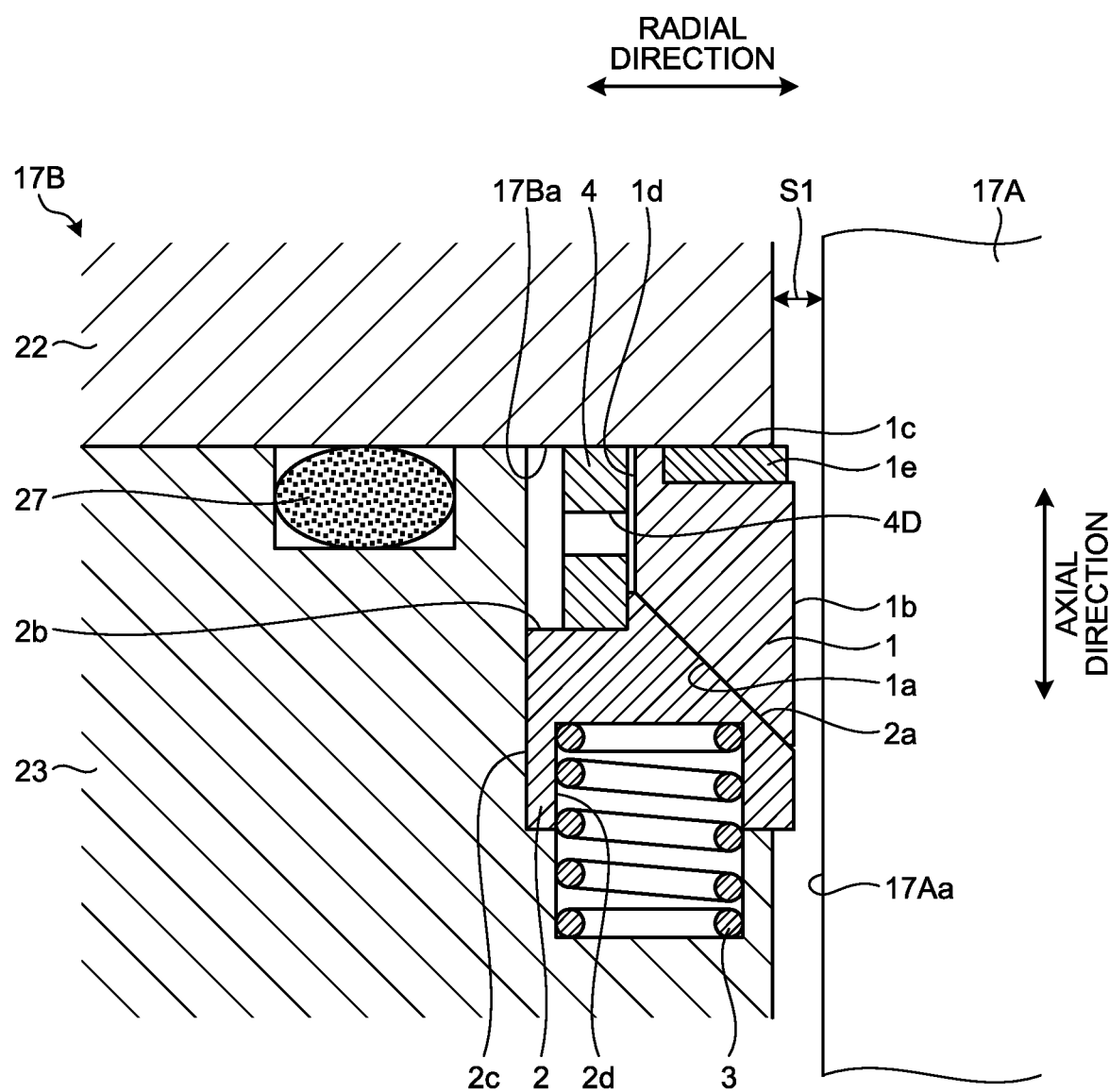
FIG. 15 is a partial enlarged cross-sectional view of a shaft sealing structure for a primary coolant circulation pump according to an eighth embodiment of the present invention.
Figure 16:
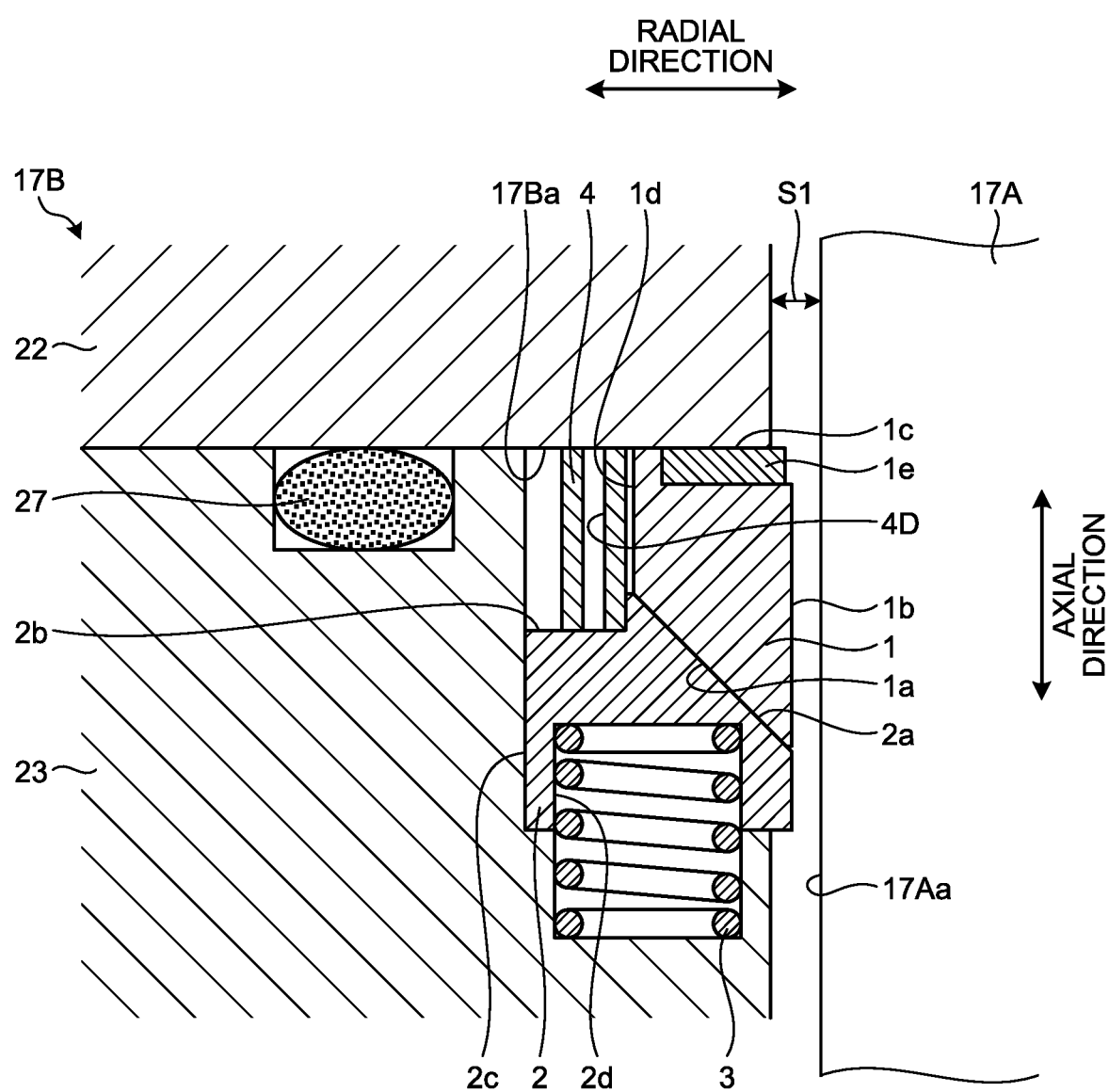
FIG. 16 is a partial enlarged cross-sectional view of the shaft sealing structure for the primary coolant circulation pump according to the eighth embodiment of the present invention.

FIG. 15 is a partial enlarged cross-sectional view of a shaft sealing structure for a primary coolant circulation pump according to an eighth embodiment. FIG. 16 is a partial enlarged cross-sectional view of the shaft sealing structure for the primary coolant circulation pump according to the eighth embodiment.

The shaft sealing structure in the eighth embodiment is different from the shaft sealing structure in the above-mentioned first embodiment in the configuration of the support member 4.

As illustrated in FIG. 15 and FIG. 16, the support member 4 may be formed into a ring shape along the circumferential direction so as to surround the outer peripheral surface 17Aa of the rotation shaft 17A, and a part of the ring shape may be divided. As illustrated in FIG. 15 and FIG. 16, a through hole 4D is formed in the support member 4. The through hole 4D is formed to pass through the support member 4 in the radial direction in FIG. 15, and formed to pass through the support member 4 in the axial direction in FIG. 16.

In the shaft sealing structure in the eighth embodiment, the through hole 4D is formed in the support member 4. Thus, the heat conductivity is increased by the through hole 4D, and hence the transfer of heat in the support member 4 can be improved. As a result, the support member 4 can be uniformly buckled in the circumferential direction such that the pressing member 2 can be uniformly moved to the pressing position in the circumferential direction and the sealing ring 1 can be uniformly brought into contact with the rotation shaft 17A in the circumferential direction. Consequently, the shaft sealing structure in the eighth embodiment can be reliably and smoothly operated.

As illustrated in FIG. 15, when the through hole 4D passes through the support member 4 in the radial direction, it is desired that the communicating portion 5 that communicates in the radial direction of the sealing ring 1 in the first embodiment be formed so as to mutually communicate with the through hole 4D. Thus, the primary coolant having the predetermined temperature or higher can be caused to flow to the outer circumferential portion of the support member 4 and the inside thereof through the communicating portion 5 and the through hole 4D, and temperature can be transferred to the entire support member 4 uniformly in the circumferential direction.

It is desired that the shaft sealing structure in the eighth embodiment have the communicating portion 5 in the shaft sealing structure in the above-mentioned first embodiment, but the shaft sealing structure in the eighth embodiment may have the configuration of the above-mentioned support member 4 without having the communicating portion 5.

Ninth Embodiment

Figure 17:
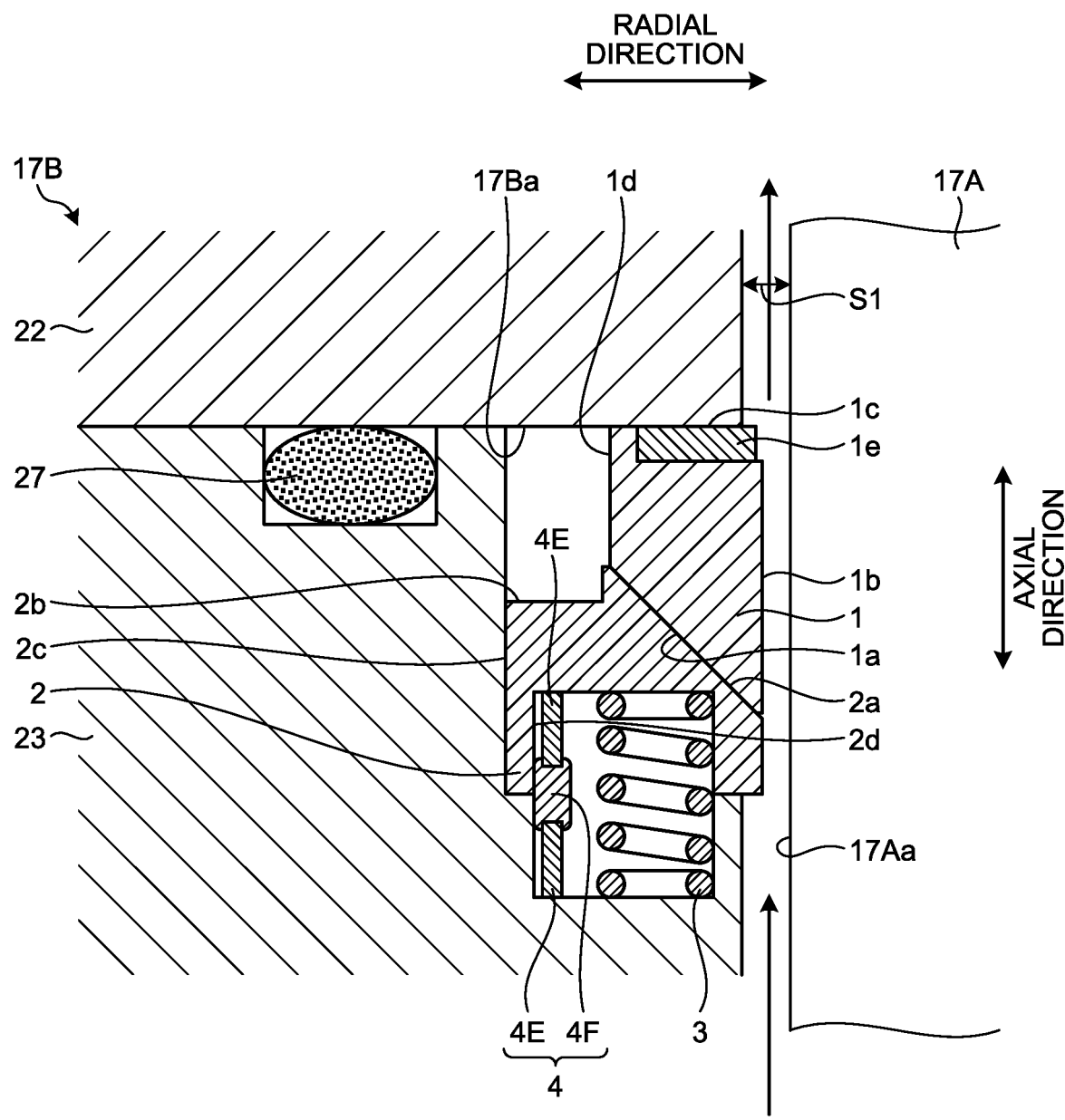
FIG. 17 is a partial enlarged cross-sectional view of a shaft sealing structure for a primary coolant circulation pump according to a ninth embodiment of the present invention.
Figure 18:
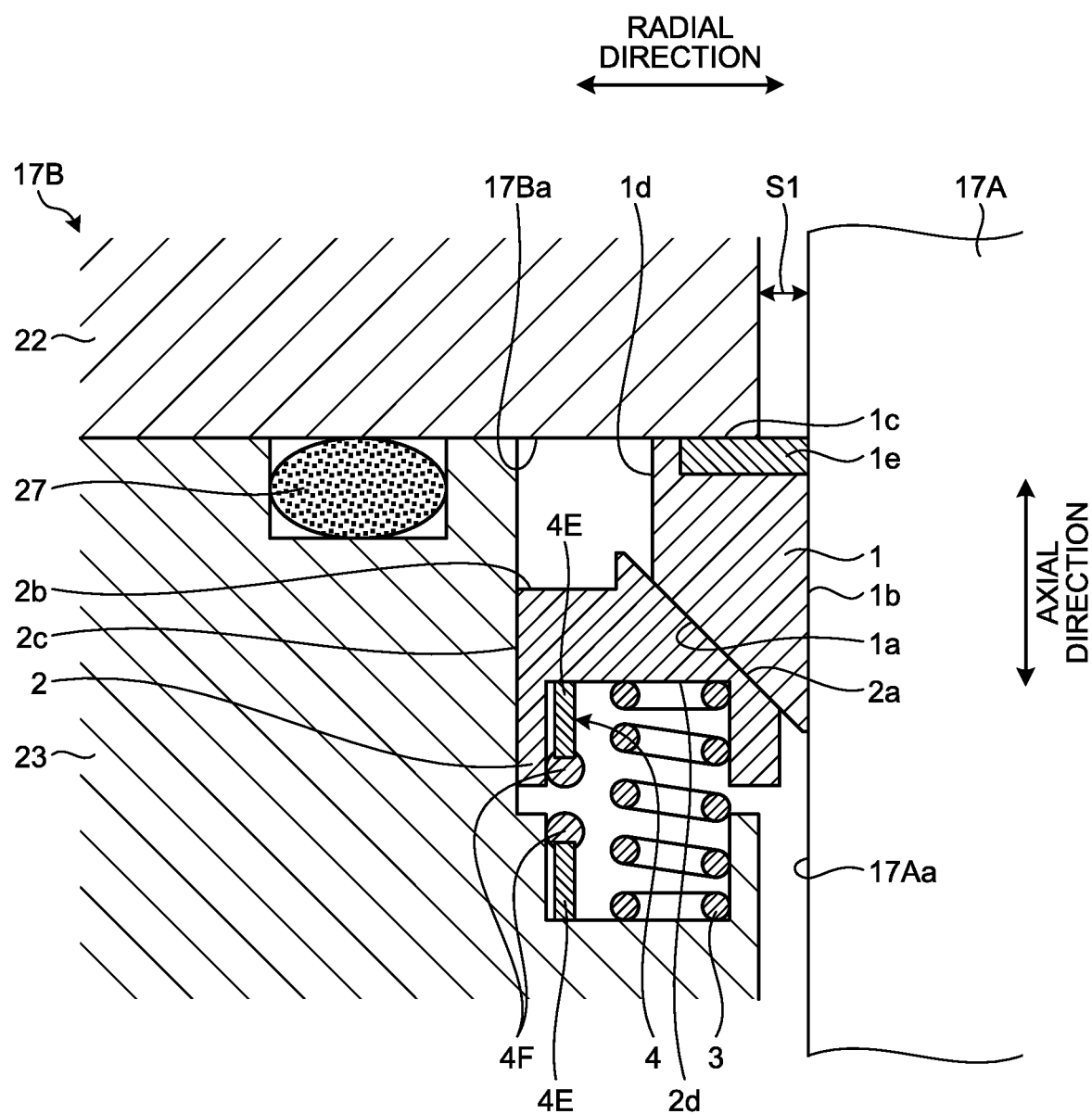
FIG. 18 is a partial enlarged cross-sectional view illustrating operation of the shaft sealing structure for the primary coolant circulation pump according to the ninth embodiment of the present invention.

FIG. 17 is a partial enlarged cross-sectional view of a shaft sealing structure for a primary coolant circulation pump according to a ninth embodiment. FIG. 18 is a partial enlarged cross-sectional view illustrating operation of the shaft sealing structure for the primary coolant circulation pump according to the ninth embodiment.

The shaft sealing structure in the ninth embodiment is different from the shaft sealing structure in the above-mentioned first embodiment in the configuration of the support member 4.

As illustrated in FIG. 17, the support member 4 supports the pressing member 2 at the retracted position by tensile force against the elastic force of the elastic member 3. The elastic member 3 is formed as a compression spring, and is housed in the hole 2d in the pressing member 2 on the lower side of the pressing member 2 in the axial direction to bias the pressing member 2 to the upper side in the axial direction by elastic force between the bottom surface of the recess 17Ba in the sealing housing 17B and the pressing member 2.

Similarly to the elastic member 3, the support member 4 is disposed on the lower side in the axial direction of the pressing member 2. The support member 4 has a wire 4E and a fusible portion 4F.

The wire 4E is divided into two pieces. One end of one piece is fixed to the top surface of the hole 2d on the lower side of the pressing member 2 in the axial direction, and one end of the other piece is fixed to the bottom surface of the recess 17Ba in the sealing housing 17B. The other ends of the pieces are disposed so as to be opposed in the axial direction.

The fusible portion 4F connects the other ends of the divided wires 4E. The fusible portion 4F is formed from resin material that fuses at a predetermined temperature or higher. The predetermined temperature at which the fusible portion 4F fuses is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material that is softened at about 150° C. or higher as the predetermined temperature, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.). Thus, the fusible portion 4F connects the other ends of the divided wires 4E at lower than the predetermined temperature, and fuses at the predetermined temperature or higher to disconnect the other ends of the wire 4E.

Similarly to the elastic member 3 formed as a compression spring, the support member 4 is housed in the hole 2d in the pressing member 2 on the lower side of the pressing member 2 in the axial direction, and supports the pressing member 2 at the retracted position by tensile force against elastic force between the bottom surface of the recess 17Ba in the sealing housing 17B and the pressing member 2. The support members 4 are provided at a plurality of positions in the circumferential direction, and support the pressing member 2 by the support members 4.

In the shaft sealing structure in the ninth embodiment, during normal operation of the primary coolant circulation pump 17, the temperature of the primary coolant is lower than the predetermined temperature, and hence the mechanical strength of the support member 4 is secured because the other ends of the divided wires 4E are connected by the fusible portion 4F at lower than the predetermined temperature. In this case, the support member 4 supports the pressing member 2 at the retracted position by tensile force against elastic force of the elastic member 3. The sealing ring 1 is disposed such that the contact surface 1b is separated away from the outer peripheral surface 17Aa of the rotation shaft 17A, and a predetermined clearance S1 is secured between the inner circumferential surface 23a of the sealing housing 17B (constituent member 23) and the outer peripheral surface 17Aa of the rotation shaft 17A. Thus, as illustrated by the solid arrows in FIG. 17, the primary coolant can flow through the predetermined clearance S1 from the lower side in the axial direction to the upper side in the axial direction, and the first sealing 17C, the second sealing 17D, and the third sealing 17E of the primary coolant circulation pump 17 function such that the rotation shaft 17A can rotate smoothly.

In case of station blackout, on the other hand, the operation of the primary coolant circulation pump 17 is stopped and the primary coolant does not circulate for cooling, and hence the temperature of the primary coolant increases to be equal to or higher than the predetermined temperature. The support member 4 is exposed to the primary coolant having the predetermined temperature or higher, and the fusible portion 4F fuses and the mechanical strength decreases. Thus, the fusible portion 4F is broken by the elastic force of the elastic member 3, and the other ends of the wires 4E are disconnected. Then, as illustrated in FIG. 18, the pressing member 2 moves to the pressing position, and the sealing ring 1 is reduced in diameter such that the contact surface 1b contacts the outer peripheral surface 17Aa of the rotation shaft 17A. Thus, the flow of the primary coolant in a clearance between the sealing ring 1 and the rotation shaft 17A can be suppressed to suppress the leakage of the primary coolant from the first sealing 17C to the second sealing 17D. As a result, the temperature increase in the second sealing 17D and the third sealing 17E in the primary coolant circulation pump 17 can be suppressed to improve safety and reliability.

As described above, in the shaft sealing structure in the ninth embodiment, the support member 4 supports the pressing member 2 at the retracted position by tensile force against the elastic force of the elastic member 3 in a manner that the fusible portion 4F that fuses at a predetermined temperature or higher is interposed. Thus, the fusible portion 4F is broken by the elastic force of the elastic member 3, and hence the mechanical strength for supporting the pressing member 2 can be decreased by the elastic force of the elastic member 3. Even when the support members 4 are provided at a plurality of positions in the circumferential direction, once a part of the support members 4 is broken, the other support members 4 can be broken like dominoes by the elastic force of the elastic member 3. As a result, the mechanical strength of the support member 4 can be reliably reduced such that the pressing member 2 can be uniformly moved to the pressing position in the circumferential direction and the sealing ring 1 can be uniformly brought into contact with the rotation shaft 17A in the circumferential direction. Consequently, the shaft sealing structure in the ninth embodiment can be reliably and smoothly operated.

Similarly to the elastic member 3 formed from a compression spring, the support member 4 is housed in the hole 2d in the pressing member 2 on the lower side of the pressing member 2 in the axial direction, and supports the pressing member 2 at the retracted position by tensile force against the elastic force between the bottom surface of the recess 17Ba of the sealing housing 17B and the pressing member 2. Thus, the support member 4 is not present on the side where the pressing member 2 moves to the pressing position, and hence the situation where the pressing behavior of the pressing member 2 to the sealing ring 1 at the predetermined temperature or higher is affected can be prevented.

It is desired that the shaft sealing structure in the ninth embodiment have the communicating portion 5 in the shaft sealing structure in the above-mentioned first embodiment, but may have the configuration of the above-mentioned support member 4 without having the communicating portion 5.

Tenth Embodiment

Figure 19:
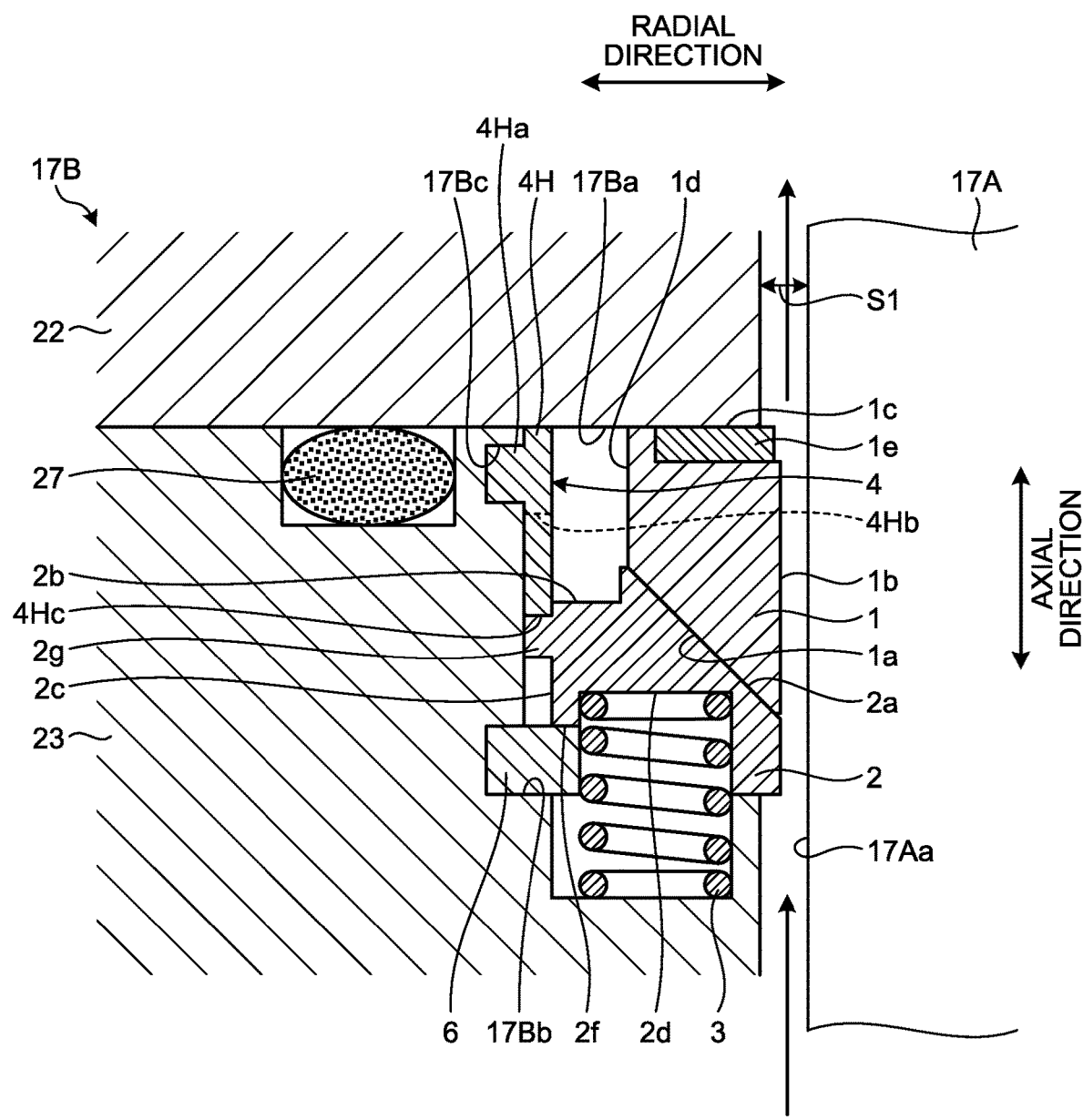
FIG. 19 is a partial enlarged cross-sectional view of a shaft sealing structure for a primary coolant circulation pump according to a tenth embodiment of the present invention.
Figure 20:
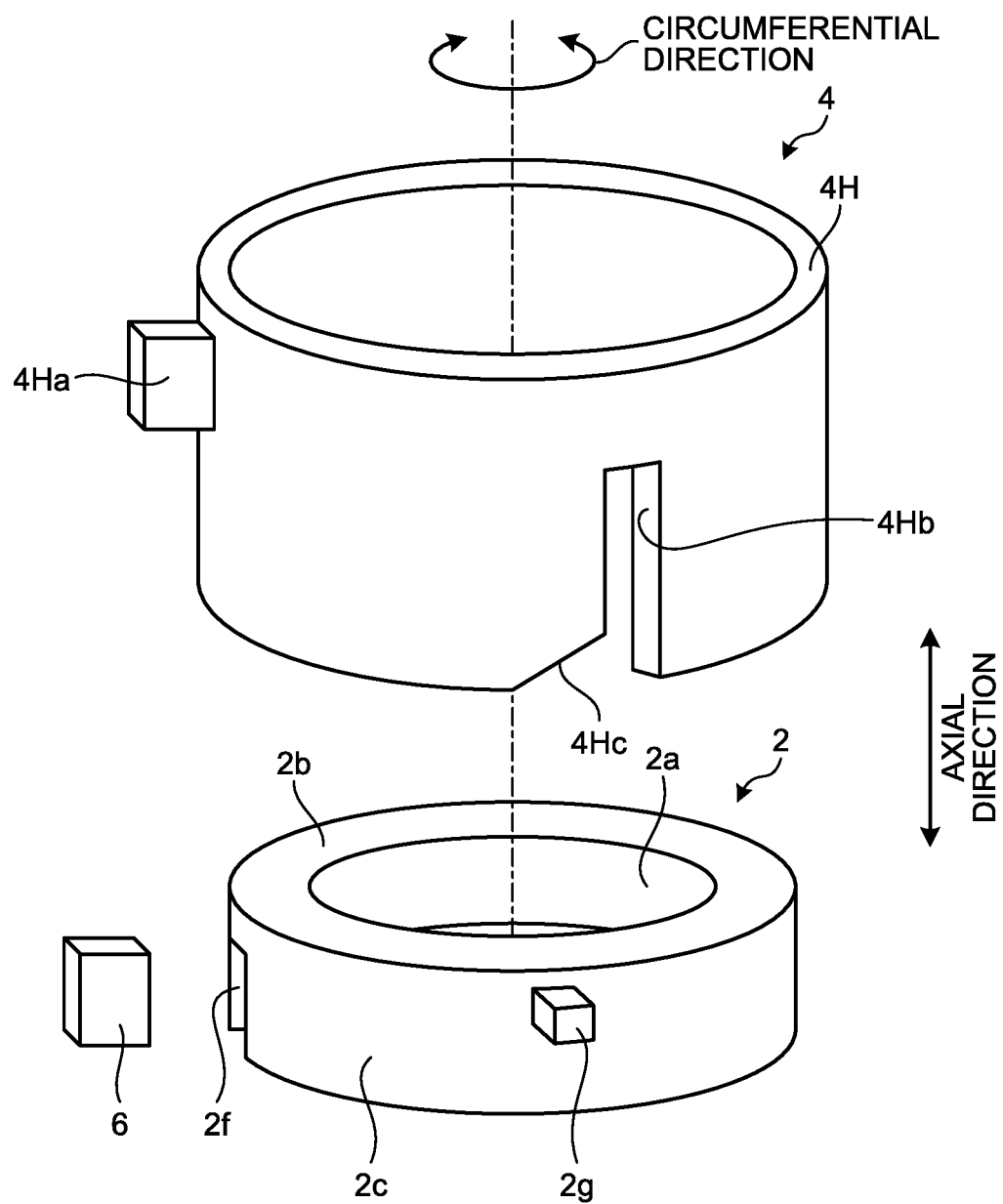
FIG. 20 is a partial enlarged perspective view of a shaft sealing structure for the primary coolant circulation pump according to the tenth embodiment of the present invention.
Figure 21:
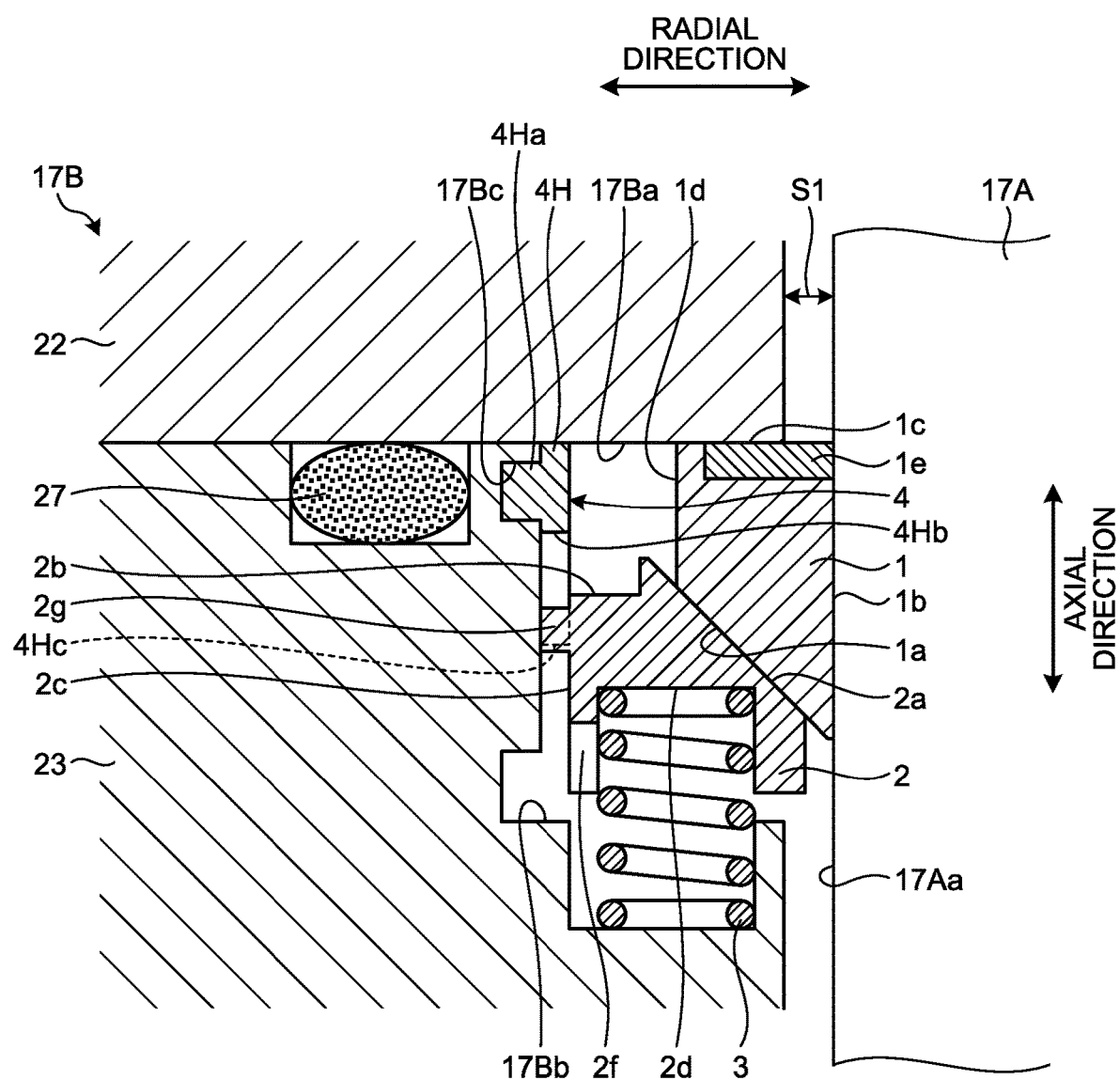
FIG. 21 is a partial enlarged cross-sectional view illustrating the operation of the shaft sealing structure for the primary coolant circulation pump according to the tenth embodiment of the present invention.

FIG. 19 is a partial enlarged cross-sectional view of a shaft sealing structure for a primary coolant circulation pump according to a tenth embodiment. FIG. 20 is a partial enlarged perspective view of the shaft sealing structure for the primary coolant circulation pump according to the tenth embodiment. FIG. 21 is partial enlarged cross-sectional view illustrating operation of the shaft sealing structure for the primary coolant circulation pump according to the tenth embodiment.

The shaft sealing structure in the tenth embodiment is different from the shaft sealing structure in the above-mentioned first embodiment in the configurations of the pressing member 2 and the support member 4.

As illustrated in FIG. 19 to FIG. 21, the pressing member 2 is formed into a ring shape along the circumferential direction so as to surround the outer peripheral surface 17Aa of the rotation shaft 17A. One notch 2f that opens in the radial direction is formed at an axially lower end of the pressing member 2. A protrusion 2g that protrudes in the radial direction from the outer surface 2c is formed on the pressing member 2. It is desired that the pressing member 2 have corrosion resistance, heat resistance when temperature increases, pressure resistance when pressure increases, and strength. For example, the pressing member 2 is made of metal material, such as stainless steel.

In the pressing member 2, one stopper (buckling member) 6 is fitted and mounted to one notch 2f. The stopper 6 is provided to protrude to the radially outer side of the pressing member 2. The stopper 6 is fitted into a fixation hole 17Bb that is formed in the inner circumferential surface 23a of the constituent member 23 (or inner circumferential surface 22a of constituent member 22) in the sealing housing 17B so as to be recessed to the radially outer side. At lower than a predetermined temperature set in advance, the stopper 6 can maintain its shape to secure mechanical strength. Thus, in the state in which the stopper 6 is fitted into the fixation hole 17Bb in the sealing housing 17B, the rotational movement of the pressing member 2 in the circumferential direction is prevented. At the predetermined temperature or higher, the stopper 6 buckles and loses its mechanical strength. The predetermined temperature is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. The material of the stopper 6 that buckles at about 150° C. or higher as the predetermined temperature is resin material, and, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.). The buckling as used herein refers to an operation that the stopper 6 is softened and deformed because the stopper 6 cannot bear the elastic force of the elastic member 3. The whole of the stopper 6 may be deformed or a part of the stopper 6 may be deformed. The stopper 6 may be deformed or melted at the predetermined temperature or higher. When losing the mechanical strength by buckling, the stopper 6 allows the rotational movement of the pressing member 2 in the circumferential direction.

As illustrated in FIG. 19 to FIG. 21, the support member 4 constitutes a tubular main body 4H formed into a ring shape along the circumferential direction so as to surround the outer peripheral surface 17Aa of the rotation shaft 17A. The support member 4 has a protrusion 4Ha formed thereon, which protrudes from the outer surface of the tubular main body 4H to the radially outer side. The support member 4 has a cutting groove 4Hb formed therein, which is cut out upward from the axially lower end of the tubular main body 4H. The cutting groove 4Hb has a gap through which the protrusion 2g of the pressing member 2 can be inserted. The support member 4 has an inclined surface 4Hc formed thereon, which communicates an axially lower end of the tubular main body 4H and the middle of the cutting groove 4Hb diagonally from the lower side to the upper side. It is desired that the support member 4 have corrosion resistance, heat resistance when temperature increases, pressure resistance when pressure increases, and strength, and, for example, the support member 4 is formed from metal material, such as stainless steel.

In the support member 4, the protrusion 4Ha is fitted into a fixation hole 17Bc that is formed in the inner circumferential surface 23a of the constituent member 23 (or inner circumferential surface 22a of constituent member 22) in the sealing housing 17B so as to be recessed to the radially outer side. Thus, in the state in which the protrusion 4Ha is fitted into the fixation hole 17Bc in the sealing housing 17B, the rotational movement of the support member 4 in the circumferential direction is prevented. The support member 4 is provided such that an axially upper end of the tubular main body 4H abuts on the top surface of the recess 17Ba in the sealing housing 17B, thereby preventing the movement of the support member 4 to the axially upper side.

In the shaft sealing structure in the tenth embodiment, during normal operation of the primary coolant circulation pump 17, the temperature of the primary coolant is lower than the predetermined temperature, and hence the stopper 6 secures its mechanical strength at lower than the predetermined temperature. In this case, the movement of the support member 4 in the axial direction and in the circumferential direction is restricted, and the protrusion 2g of the pressing member 2 abuts on the inclined surface 4Hc, and hence the support member 4 supports the pressing member 2 at the retracted position against the elastic force of the elastic member 3. The sealing ring 1 is disposed such that the contact surface 1b is separated away from the outer peripheral surface 17Aa of the rotation shaft 17A, and a predetermined clearance S1 is secured between the inner circumferential surface 23a of the sealing housing 17B (constituent member 23) and the outer peripheral surface 17Aa of the rotation shaft 17A. Thus, as illustrated by solid arrows in FIG. 19, the primary coolant can flow through the predetermined clearance S1 from the axially lower side to the axially upper side, and the first sealing 17C, the second sealing 17D, and the third sealing 17E of the primary coolant circulation pump 17 function such that the rotation shaft 17A can rotate smoothly.

In case of station blackout, on the other hand, the operation of the primary coolant circulation pump 17 is stopped and the primary coolant does not circulate for cooling, and hence the temperature of the primary coolant increases to be equal to or higher than the predetermined temperature. The stopper 6 is exposed to the primary coolant having the predetermined temperature or higher, and buckles. Then, the restriction of the rotational movement of the pressing member 2 by the stopper 6 is released, and the pressing member 2 is biased to the axially upper side by the elastic force of the elastic member 3. Accordingly, the pressing member 2 rotationally moves when the protrusion 2g is guided to the cutting groove 4Hb along the inclined surface 4Hc of the support member 4, and after the protrusion 2g is inserted to the cutting groove 4Hb, the pressing member 2 moves to the axially upper side along the cutting groove 4Hb as illustrated in FIG. 21. Specifically, the pressing member 2 moves to the pressing position, and the sealing ring 1 is reduced in diameter such that the contact surface 1b contacts the outer peripheral surface 17Aa of the rotation shaft 17A. Thus, the flow of the primary coolant in the clearance between the sealing ring 1 and the rotation shaft 17A can be suppressed to suppress the leakage of the primary coolant from the first sealing 17C to the second sealing 17D. As a result, the temperature increase in the second sealing 17D and the third sealing 17E in the primary coolant circulation pump 17 can be suppressed to improve safety and reliability.

In the tenth embodiment, although not specified in the figures, the pressing member 2 is not necessarily required to have the stopper 6, and may have a protrusion that protrudes to the radially outer side instead of the stopper 6, and the rotation of the pressing member 2 in the circumferential direction may be restricted by the protrusion, and the protrusion may be engaged with the sealing housing 17B so that the movement in the axial direction is guided. In this case, in the support member 4, the protrusion 4Ha is provided as the stopper 6, and at lower than the predetermined temperature, the rotational movement of the support member 4 in the circumferential direction is restricted by the stopper 6, and the support member 4 supports the pressing member 2 at the retracted position. Then, at the predetermined temperature or higher, the stopper 6 buckles to allow the rotational movement of the support member 4 in the circumferential direction. The support member 4 rotationally moves when the protrusion 2g of the pressing member 2 is guided to the cutting groove 4Hb along the inclined surface 4Hc of the support member 4. After the protrusion 2g is inserted to the cutting groove 4Hb, the pressing member 2 moves to the axially upper side along the cutting groove 4Hb. Specifically, the pressing member 2 moves to the pressing position.

As described above, in the shaft sealing structure in the tenth embodiment, the support member 4 is provided so as to allow the pressing member 2 to move to the pressing position by the relative movement of the support member 4 and the pressing member 2 in the circumferential direction. The relative movement of the support member 4 and the pressing member 2 in the circumferential direction is restricted by the stopper (buckling member) 6 when the pressing member 2 is located at the retracted position. At the predetermined temperature or higher, the stopper 6 buckles to allow the relative movement of the support member 4 and the pressing member 2 in the circumferential direction. As a result, the pressing member 2 can be moved to the pressing position uniformly in the circumferential direction, and the sealing ring 1 can be brought into contact with the rotation shaft 17A uniformly in the circumferential direction. Consequently, the shaft sealing structure in the sixth embodiment can be reliably and smoothly operated.

It is desired that the shaft sealing structure in the tenth embodiment have the communicating portion 5 in the shaft sealing structure in the above-mentioned first embodiment, but the shaft sealing structure in the tenth embodiment may have the configurations of the support member 4 and the pressing member 2 described above without the communicating portion 5.

Eleventh Embodiment

Figure 22:
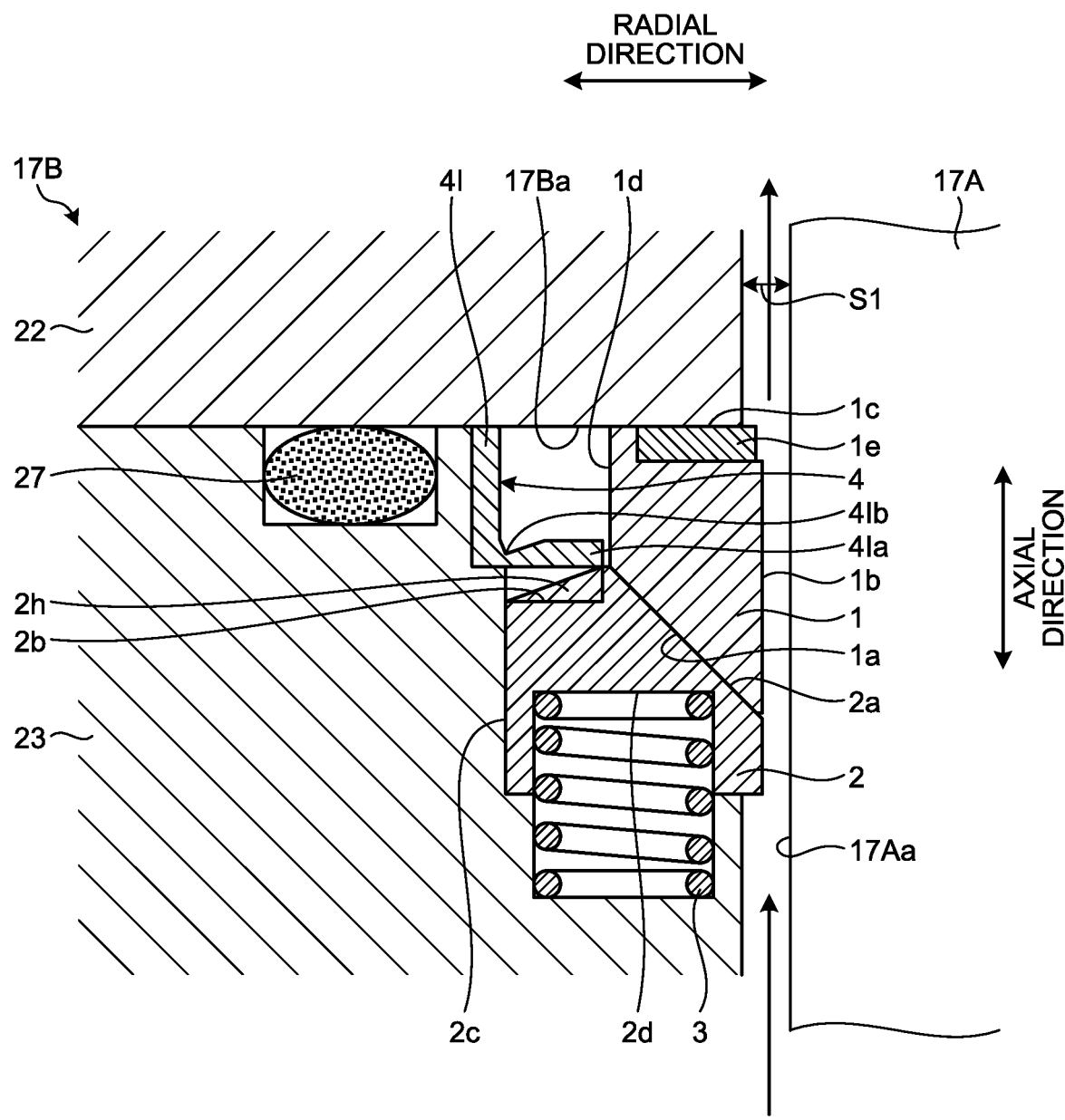
FIG. 22 is a partial enlarged cross-sectional view of a shaft sealing structure for a primary coolant circulation pump according to an eleventh embodiment of the present invention.
Figure 23:
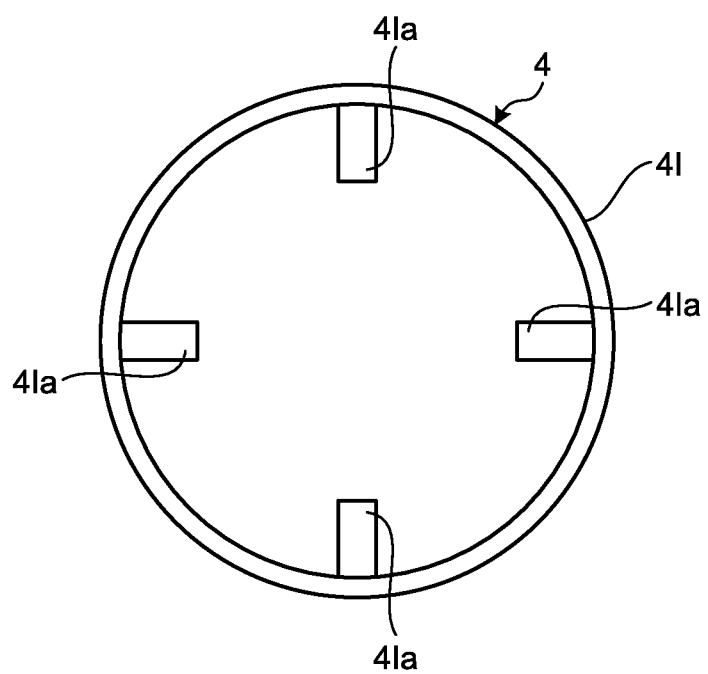
FIG. 23 is a partial enlarged plan view of the shaft sealing structure for the primary coolant circulation pump according to the eleventh embodiment of the present invention.
Figure 24:
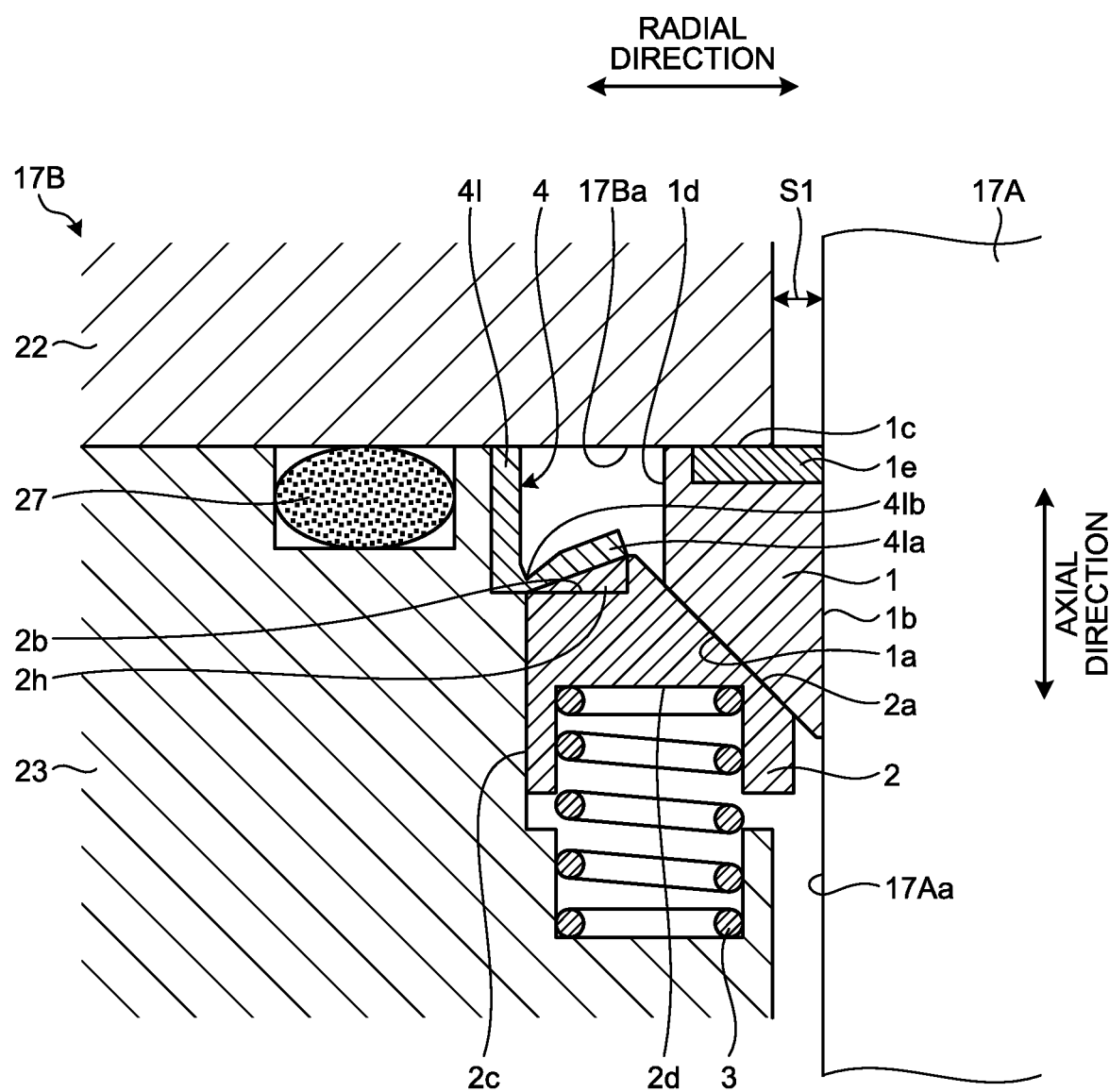
FIG. 24 is a partial enlarged cross-sectional view illustrating the operation of the shaft sealing structure for the primary coolant circulation pump according to the eleventh embodiment of the present invention.

FIG. 22 is a partial enlarged cross-sectional view of a shaft sealing structure for a primary coolant circulation pump according to an eleventh embodiment. FIG. 23 is a partial enlarged plan view of the shaft sealing structure for the primary coolant circulation pump according to the eleventh embodiment. FIG. 24 is a partial enlarged cross-sectional view illustrating operation of the shaft sealing structure for the primary coolant circulation pump according to the eleventh embodiment.

The shaft sealing structure in the eleventh embodiment is different from the shaft sealing structure in the above-mentioned first embodiment in the configuration of the support member 4.

As illustrated in FIG. 22 to FIG. 24, the support member 4 constitutes a tubular main body 4I formed into a ring shape along the circumferential direction so as to surround the outer peripheral surface 17Aa of the rotation shaft 17A. The support member 4 has claw-shaped members 4Ia formed thereon, which protrude from the inner surface of the tubular main body 4I to the radially inner side. The claw-shaped members 4Ia are equiangularly provided at at least three locations (four locations in FIG. 23) in the circumferential direction of the tubular main body 4I. The claw-shaped member 4Ia of the support member 4 secures its mechanical strength at lower than a predetermined temperature, but is softened at the predetermined temperature or higher. The support member 4 is formed from resin material that is softened at the predetermined temperature or higher. The predetermined temperature at which the support member 4 is softened is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material that is softened at about 150° C. or higher as the predetermined temperature, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.)

The support member 4 is provided such that an axially upper end of the tubular main body 4I abuts on the top surface of the recess 17Ba in the sealing housing 17B, thereby preventing the movement of the support member 4 to the axially upper side.

The support member 4 is provided with an initial irregularity 4Ib that causes each claw-shaped member 4Ia to buckle so as to allow the pressing member 2 to move to the pressing position. Specifically, as illustrated in FIG. 22, during normal operation of the primary coolant circulation pump 17, a notch is formed in advance at a portion to be buckled (in FIG. 22, portion protruding from tubular main body 4I) as the initial irregularity 4Ib so as to be thin. Alternatively, a bending portion is formed in advance at a portion to be buckled (in FIG. 22, portion protruding from tubular main body 4I) as the initial irregularity 4Ib.

In the shaft sealing structure in the eleventh embodiment, during normal operation of the primary coolant circulation pump 17, the temperature of the primary coolant is lower than the predetermined temperature, and hence the claw-shaped member 4Ia of the support member 4 secures its mechanical strength at lower than the predetermined temperature. In this case, each claw-shaped member 4Ia abuts on the top surface 2b of the pressing member 2, thereby preventing the pressing member 2 from moving to the axially upper side against the elastic force of the elastic member 3. Thus, the support member 4 supports the pressing member 2 at the retracted position by each claw-shaped member 4Ia. The sealing ring 1 is disposed such that the contact surface 1b is separated away from the outer peripheral surface 17Aa of the rotation shaft 17A, and a predetermined clearance S1 is secured between the inner circumferential surface 23a of the sealing housing 17B (constituent member 23) and the outer peripheral surface 17Aa of the rotation shaft 17A. Thus, as illustrated by solid arrows in FIG. 22, the primary coolant can flow through the predetermined clearance S1 from the axially lower side to the axially upper side, and the first sealing 17C, the second sealing 17D, and the third sealing 17E of the primary coolant circulation pump 17 function such that the rotation shaft 17A can rotate smoothly.

In case of station blackout, on the other hand, the operation of the primary coolant circulation pump 17 is stopped and the primary coolant does not circulate for cooling, and hence the temperature of the primary coolant increases to be equal to or higher than the predetermined temperature. The outer circumferential portion of the support member 4 is exposed to the primary coolant having the predetermined temperature or higher, and each claw-shaped member 4Ia is softened and deformed and cannot maintain its shape and buckles from the initial irregularity 4Ib as a start point. Then, as illustrated in FIG. 24, the pressing member 2 released from the support by each claw-shaped member 4Ia moves to the pressing position, and the sealing ring 1 is reduced in diameter such that the contact surface 1b contacts the outer peripheral surface 17Aa of the rotation shaft 17A. Thus, the flow of the primary coolant in the clearance between the sealing ring 1 and the rotation shaft 17A can be suppressed to suppress the leakage of the primary coolant from the first sealing 17C to the second sealing 17D. As a result, the temperature increase in the second sealing 17D and the third sealing 17E in the primary coolant circulation pump 17 can be suppressed to improve safety and reliability.

As described above, in the shaft sealing structure in the eleventh embodiment, the support member 4 has: the claw-shaped members 4Ia that support the pressing member 2 located at the retracted position against the movement direction and are softened at the predetermined temperature or higher; and the initial irregularity 4Ib that causes the claw-shaped members 4Ia to buckle so as to allow the pressing member 2 to move to the pressing position. As described above, because the support member 4 has the claw-shaped members 4Ia and the initial irregularity 4Ib, the claw-shaped members 4Ia can be reliably buckled from the initial irregularity 4Ib as a start point at the predetermined temperature or higher. Consequently, the shaft sealing structure in the eleventh embodiment can be reliably and smoothly operated.

In the shaft sealing structure in the eleventh embodiment, a pushout portion 2h that can contact the claw-shaped member 4Ia is provided on the top surface 2b of the pressing member 2. When the pressing member 2 is pressed to the axially upper side by the elastic force of the elastic member 3, the pushout portion 2h presses the claw-shaped member 4Ia to the axially upper side, and assists the buckling of the claw-shaped member 4Ia. The pushout portion 2h is provided to protrude upward like a wedge (triangular shape) so as to assist the bending of the claw-shaped member 4Ia.

As described above, the shaft sealing structure in the eleventh embodiment has the pushout portion 2h that assists the buckling of the claw-shaped member 4Ia along with the movement of the pressing member 2, and hence the shaft sealing structure in the eleventh embodiment can be more reliably and smoothly operated.

It is desired that the shaft sealing structure in the eleventh embodiment have the communicating portion 5 in the shaft sealing structure in the above-mentioned first embodiment, but the shaft sealing structure in the eleventh embodiment may have the configuration of the above-mentioned support member 4 without the communicating portion 5.

Twelfth Embodiment

Figure 25:
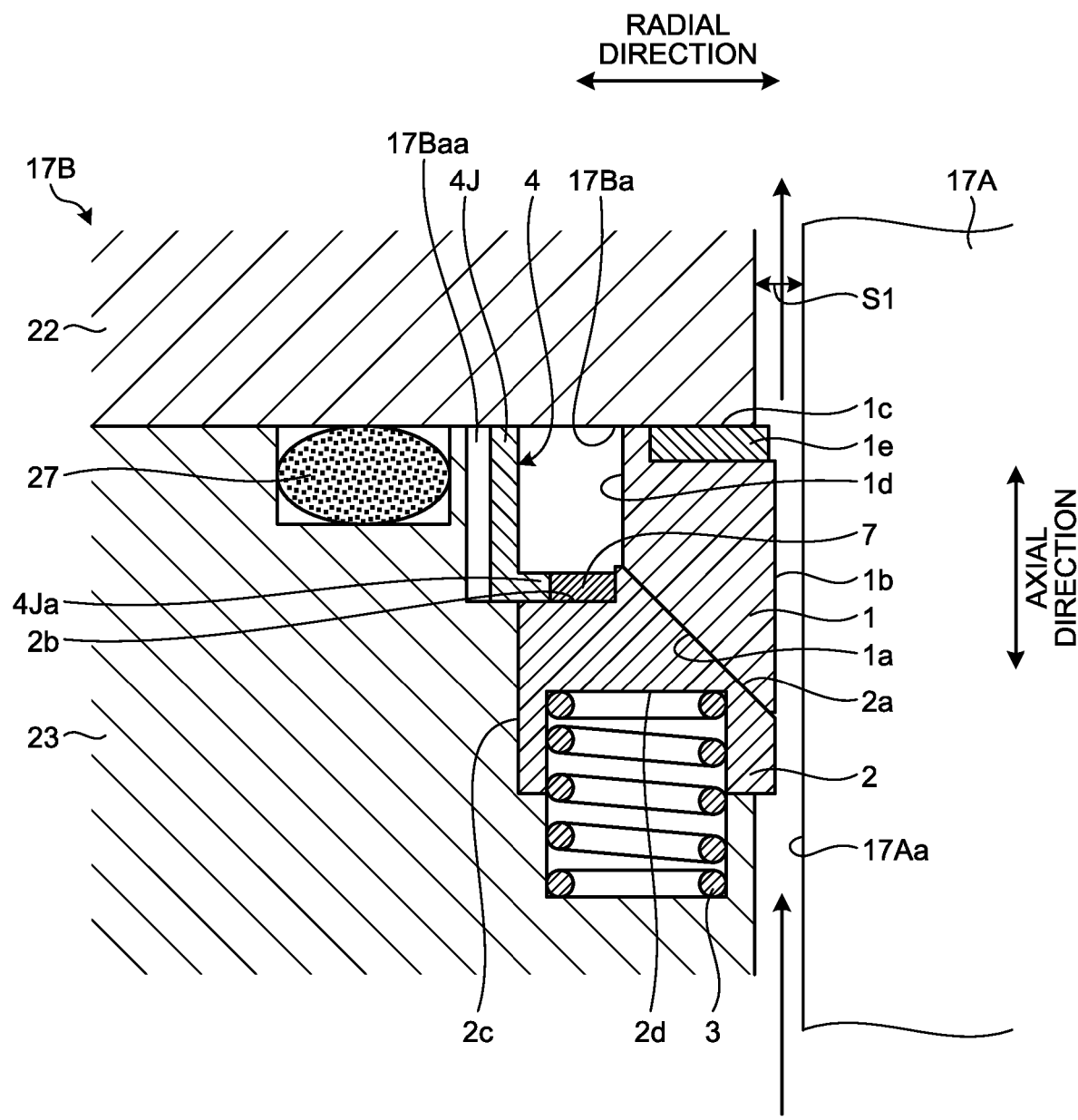
FIG. 25 is a partial enlarged cross-sectional view of a shaft sealing structure for a primary coolant circulation pump according to a twelfth embodiment of the present invention.
Figure 26:
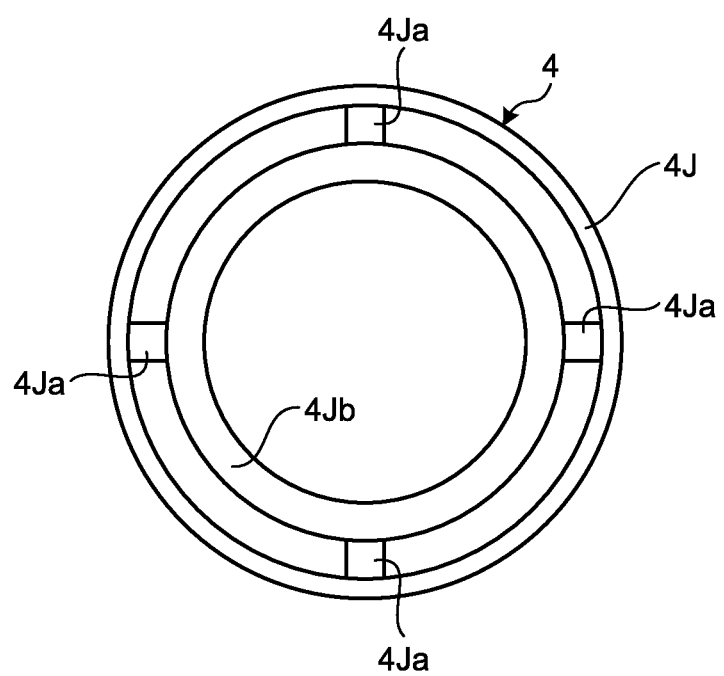
FIG. 26 is a partial enlarged plan view of the shaft sealing structure for the primary coolant circulation pump according to the twelfth embodiment of the present invention.
Figure 27:
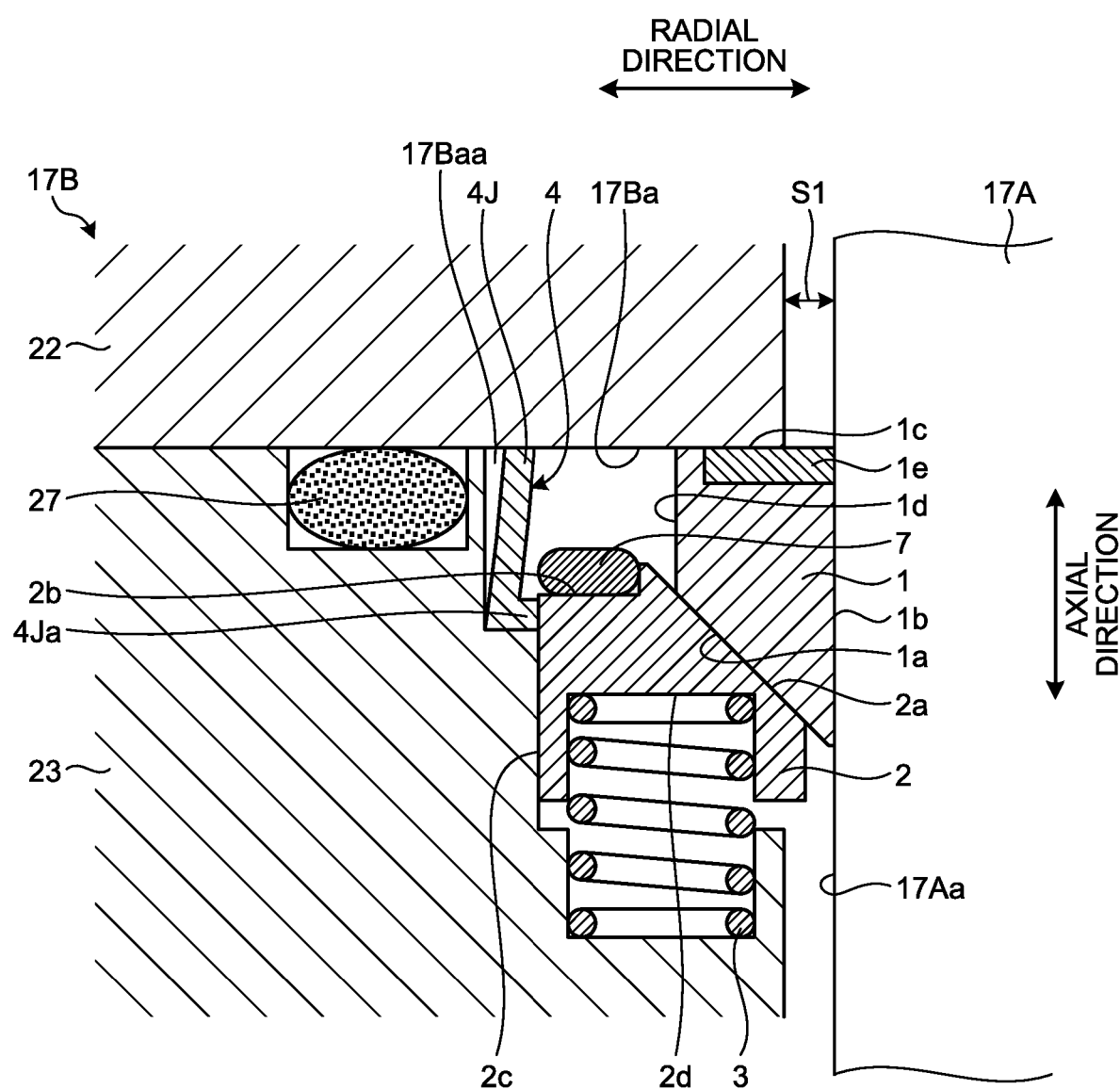
FIG. 27 is a partial enlarged cross-sectional view illustrating the operation of the shaft sealing structure for the primary coolant circulation pump according to the twelfth embodiment of the present invention.

FIG. 25 is a partial enlarged cross-sectional view of a shaft sealing structure for a primary coolant circulation pump according to a twelfth embodiment. FIG. 26 is a partial enlarged plan view of the shaft sealing structure for the primary coolant circulation pump according to the twelfth embodiment. FIG. 27 is a partial enlarged cross-sectional view illustrating operation of the shaft sealing structure for the primary coolant circulation pump according to the twelfth embodiment.

The shaft sealing structure in the twelfth embodiment is different from the shaft sealing structure in the above-mentioned first embodiment in the configuration of the support member 4.

As illustrated in FIG. 25 to FIG. 27, the support member 4 constitutes a tubular main body 4J formed into a ring shape along the circumferential direction so as to surround the outer peripheral surface 17Aa of the rotation shaft 17A. The support member 4 has claw-shaped members 4Ja formed thereon, which protrude from the inner surface of the tubular main body 4J to the radially inner side. The claw-shaped members 4Ja are equiangularly provided at at least three locations (four locations in FIG. 26) in the circumferential direction of the tubular main body 4J. The support member 4 secures its mechanical strength at lower than a predetermined temperature, but is softened at the predetermined temperature or higher. The support member 4 is formed from resin material that is softened at the predetermined temperature or higher. The predetermined temperature at which the support member 4 is softened is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material that is softened at about 150° C. or higher as the predetermined temperature, for example, it is desired to apply PEEK resin (glass-transition point: 140 to 170° C.), polycarbonate resin (glass-transition point: about 130° C. to 160° C.), polysulfone resins (glass-transition point: about 170° C. to 200° C.), or polyether sulfonic acid resins (glass-transition point: about 200° C. to 230° C.)

The support member 4 is provided such that an axially upper end of the tubular main body 4J abuts on the top surface of the recess 17Ba in the sealing housing 17B, thereby preventing the movement of the support member 4 to the axially upper side. The recess 17Ba in the sealing housing 17B in which the support member 4 is provided is provided with a clearance 17Baa serving as a movement margin that allows the support member 4 to move to the radially outer side.

An expanding member 7 is provided on the radially inner side of the claw-shaped members 4Ja in the support member 4. The expanding member 7 is formed into a ring shape so as to contact a radially inner end of each claw-shaped member 4Ja. The expanding member 7 thermally expands while securing its mechanical strength even at a predetermined temperature or higher. The support member 4 is formed from resin material that is softened at the predetermined temperature or higher. The predetermined temperature at which the support member 4 is softened is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C. As the resin material whose mechanical strength is secured even at the predetermined temperature, for example, it is desired to apply fiber-reinforced PEEK resin or polyimide resin.

In the shaft sealing structure in the twelfth embodiment, during normal operation of the primary coolant circulation pump 17, the temperature of the primary coolant is lower than the predetermined temperature, and hence the mechanical strength of the support member 4 and the expanding member 7 is secured at lower than the predetermined temperature. In this case, each claw-shaped member 4Ja of the support member 4 abuts on the top surface 2b of the pressing member 2, thereby preventing the pressing member 2 from moving to the axially upper side against the elastic force of the elastic member 3. Thus, the support member 4 supports the pressing member 2 at the retracted position by each claw-shaped member 4Ja. The expanding member 7 is provided on the top surface 2b of the pressing member 2 on the radially inner side of each claw-shaped member 4Ja. The sealing ring 1 is disposed such that the contact surface 1b is separated away from the outer peripheral surface 17Aa of the rotation shaft 17A, and a predetermined clearance S1 is secured between the inner circumferential surface 23a of the sealing housing 17B (constituent member 23) and the outer peripheral surface 17Aa of the rotation shaft 17A. Thus, as illustrated by solid arrows in FIG. 25, the primary coolant can flow through the predetermined clearance S1 from the axially lower side to the axially upper side, and the first sealing 17C, the second sealing 17D, and the third sealing 17E of the primary coolant circulation pump 17 function such that the rotation shaft 17A can rotate smoothly.

In case of station blackout, on the other hand, the operation of the primary coolant circulation pump 17 is stopped and the primary coolant does not circulate for cooling, and hence the temperature of the primary coolant increases to be equal to or higher than the predetermined temperature. The outer circumferential portion of the support member 4 is exposed to the primary coolant having the predetermined temperature or higher, and the support member 4 is softened and deformed and cannot maintain its shape and buckles. In addition, the outer circumferential portion of the expanding member 7 is exposed to the primary coolant having the predetermined temperature or higher, and the expanding member 7 thermally expands to be deformed. The expanding member 7 presses and enlarges each claw-shaped member 4Ja to the radially outer side, thereby increasing the diameter of the support member 4 to the radially outer side. Then, as illustrated in FIG. 27, the pressing member 2 released from the support by each claw-shaped member 4Ja moves to the pressing position, and the sealing ring 1 is reduced in diameter such that the contact surface 1b contacts the outer peripheral surface 17Aa of the rotation shaft 17A. Thus, the flow of the primary coolant in the clearance between the sealing ring 1 and the rotation shaft 17A can be suppressed to suppress the leakage of the primary coolant from the first sealing 17C to the second sealing 17D. As a result, the temperature increase in the second sealing 17D and the third sealing 17E in the primary coolant circulation pump 17 can be suppressed to improve safety and reliability.

As described above, in the shaft sealing structure in the twelfth embodiment, the support member 4 has: the claw-shaped members 4Ja that support the pressing member 2 located at the retracted position against the movement direction and are softened at the predetermined temperature or higher; and the expanding member 7 that thermally expands at the predetermined temperature or higher to deform the claw-shaped members 4Ja so as to allow the movement of the pressing member 2 to the pressing position. As described above, because the support member 4 has the claw-shaped member 4Ja that is softened at the predetermined temperature or higher and the expanding member 7 that thermally expands at the predetermined temperature or higher to deform the claw-shaped members 4Ja, the support member 4 can be reliably deformed at the predetermined temperature or higher. Consequently, the shaft sealing structure in the twelfth embodiment can be reliably and smoothly operated.

It is desired that the shaft sealing structure in the twelfth embodiment have the communicating portion 5 in the shaft sealing structure in the above-mentioned first embodiment, but the shaft sealing structure in the twelfth embodiment may have the configuration of the support member 4 described above without the communicating portion 5.

Thirteenth Embodiment

Figure 28:
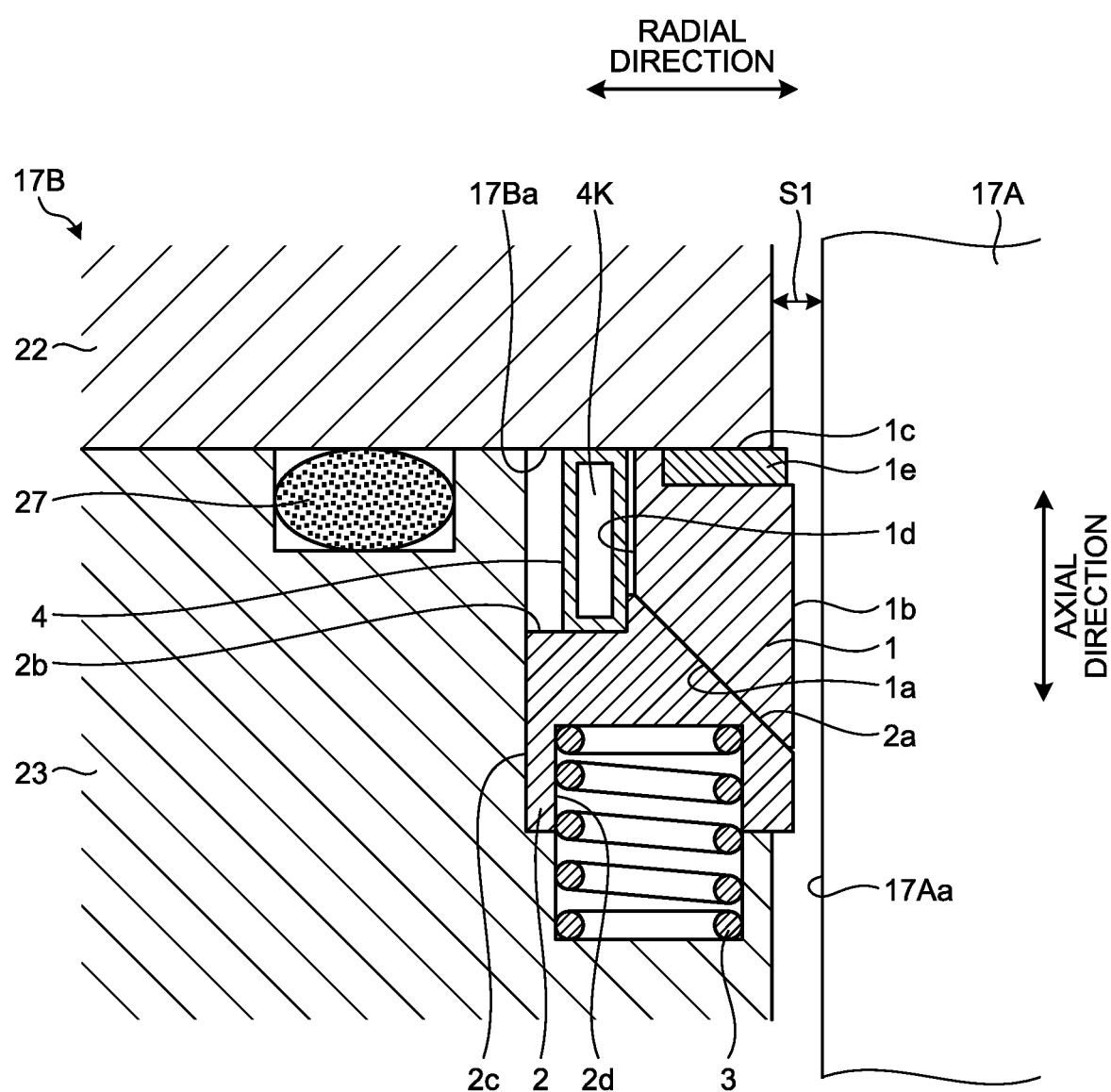
FIG. 28 is a partial enlarged cross-sectional view of a shaft sealing structure for a primary coolant circulation pump according to a thirteenth embodiment of the present invention.

FIG. 28 is a partial enlarged cross-sectional view of a shaft sealing structure for a primary coolant circulation pump according to a thirteenth embodiment.

The shaft sealing structure in the thirteenth embodiment is different from the shaft sealing structure in the above-mentioned first embodiment in the configuration of the support member 4.

As illustrated in FIG. 28, the support member 4 is formed into a ring shape along the circumferential direction so as to surround the outer peripheral surface 17Aa of the rotation shaft 17A. The support member 4 has a hollow 4K formed therein. It is desired that the hollow 4K be continuous in the circumferential direction. The support member 4 secures its mechanical strength at lower than a predetermined pressure, but plastically deforms at the predetermined pressure or higher. The predetermined pressure at which the support member 4 having the hollow 4K plastically deforms is determined in consideration of the pressure of the primary coolant in case of station blackout in the nuclear power plant. For example, in the pressurized water reactor (PWR) 12, it is supposed that the pressure around the support member 4, that is, the pressure of the primary coolant, which is about 0.3 MPa to about 1.0 MPa during pump normal operation, increases up to about 16 MPa in case of station blackout. Thus, it is desired to set the predetermined pressure to be equal to or higher than about 1.0 MPa corresponding to the pressure during normal operation such that the support member 4 does not plastically deform during normal operation, and be equal to or lower than 16 MPa corresponding to the pressure in case of station blackout. Applicable examples of material of the support member 4 having the hollow 4K that plastically deforms at the predetermined pressure include PEEK resin (glass-transition point: 140 to 170° C.), polycarbonate resin (glass-transition point: about 130° C. to 160° C.), polysulfone resins (glass-transition point: about 170° C. to 200° C.), and polyether sulfone resins (glass-transition point: about 200° C. to 230° C.). The thickness of the support member 4 in this case is set such that an initiation stress σ at the predetermined pressure becomes equal to or higher than a yield stress σa by using the Young's modulus E, the Poisson's ratio ν, and the yield stress σa of the material at the predetermined temperature through stress calculation or FEM analysis of a thin cylinder subjected to external pressure.

As described above, in the shaft sealing structure in the thirteenth embodiment, the hollow 4K is formed in the support member 4. Thus, the support member 4 plastically deforms at the predetermined pressure or higher, and hence the support member 4 can be deformed more uniformly than in the case where the transfer of heat is not uniform as in the configuration of the support member 4 that buckles depending on temperature. Consequently, the shaft sealing structure in the thirteenth embodiment can be reliably and smoothly operated.

It is desired that the shaft sealing structure in the thirteenth embodiment have the communicating portion 5 in the shaft sealing structure in the above-mentioned first embodiment, but the shaft sealing structure in the thirteenth embodiment may have the configuration of the above-mentioned support member 4 without the communicating portion 5.

Fourteenth Embodiment

In a shaft sealing structure in a fourteenth embodiment, unlike the shaft sealing structure in the above-mentioned first embodiment, the sealing ring 1 and the pressing member 2 are subjected to surface treatment for reducing friction resistance on the inclined surfaces (sliding-contact surface) 1a and 2a that contact and slide with each other when the pressing member 2 moving to the pressing position presses the sealing ring 1.

As the surface treatment, it is desired to apply DLC coating or PTFE coating having heat resistance of 150° C., which is the predetermined temperature at which the sealing ring 1 and the pressing member 2 slide with each other, and exhibiting a low friction coefficient.

The shaft sealing structure in the fourteenth embodiment can be reliably and smoothly operated owing to the surface treatment.

It is desired that the shaft sealing structure in the fourteenth embodiment have the communicating portion 5 in the shaft sealing structure in the above-mentioned first embodiment, but the shaft sealing structure in the fourteenth embodiment may have the above-mentioned surface treatment without the communicating portion 5.

Fifteenth Embodiment

Figure 29:
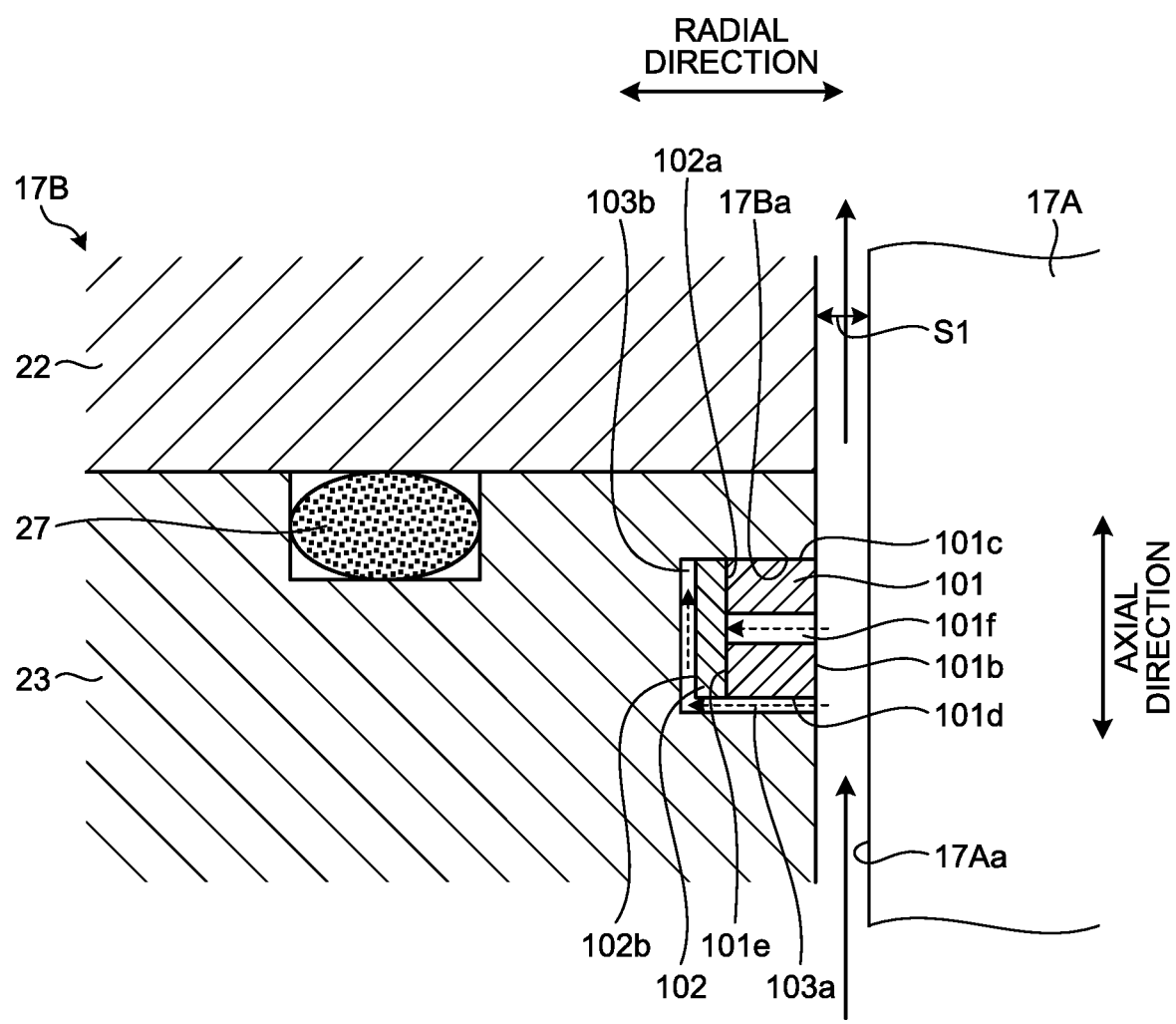
FIG. 29 is a partial enlarged cross-sectional view of a shaft sealing structure for a primary coolant circulation pump according to a fifteenth embodiment of the present invention.
Figure 30:
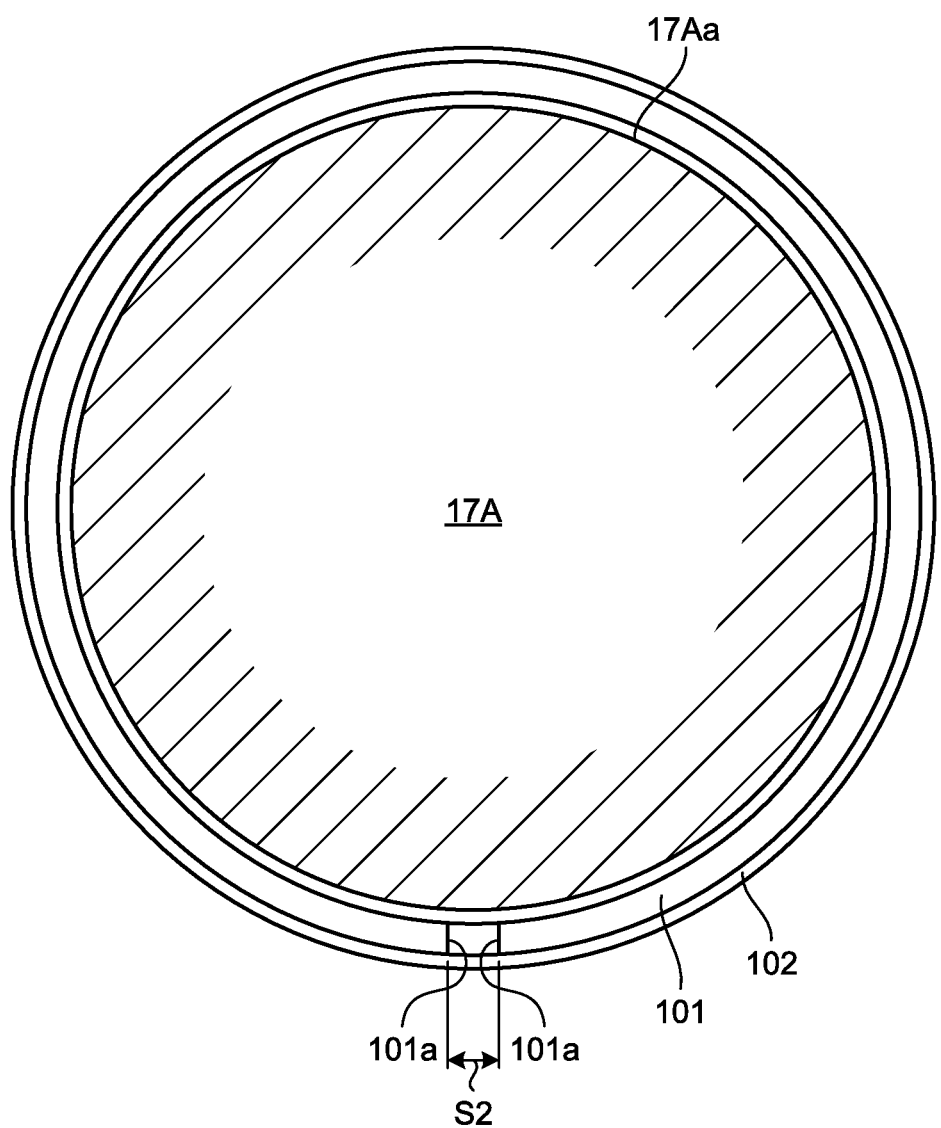
FIG. 30 is a partial enlarged cross-sectional view of the shaft sealing structure for the primary coolant circulation pump according to the fifteenth embodiment of the present invention.
Figure 31:
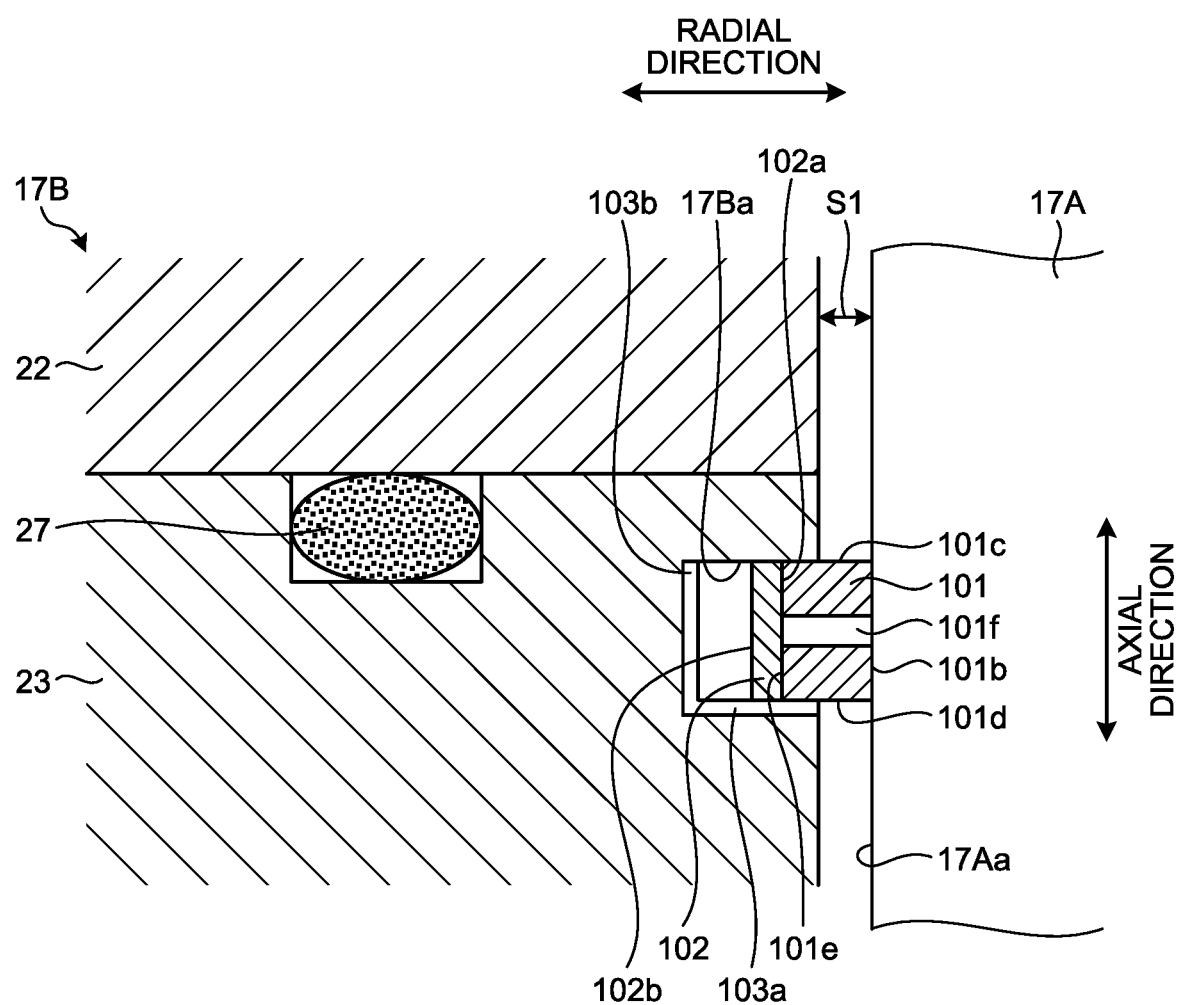
FIG. 31 is a partial enlarged cross-sectional view illustrating operation of the shaft sealing structure for the primary coolant circulation pump according to the fifteenth embodiment of the present invention.
Figure 32:
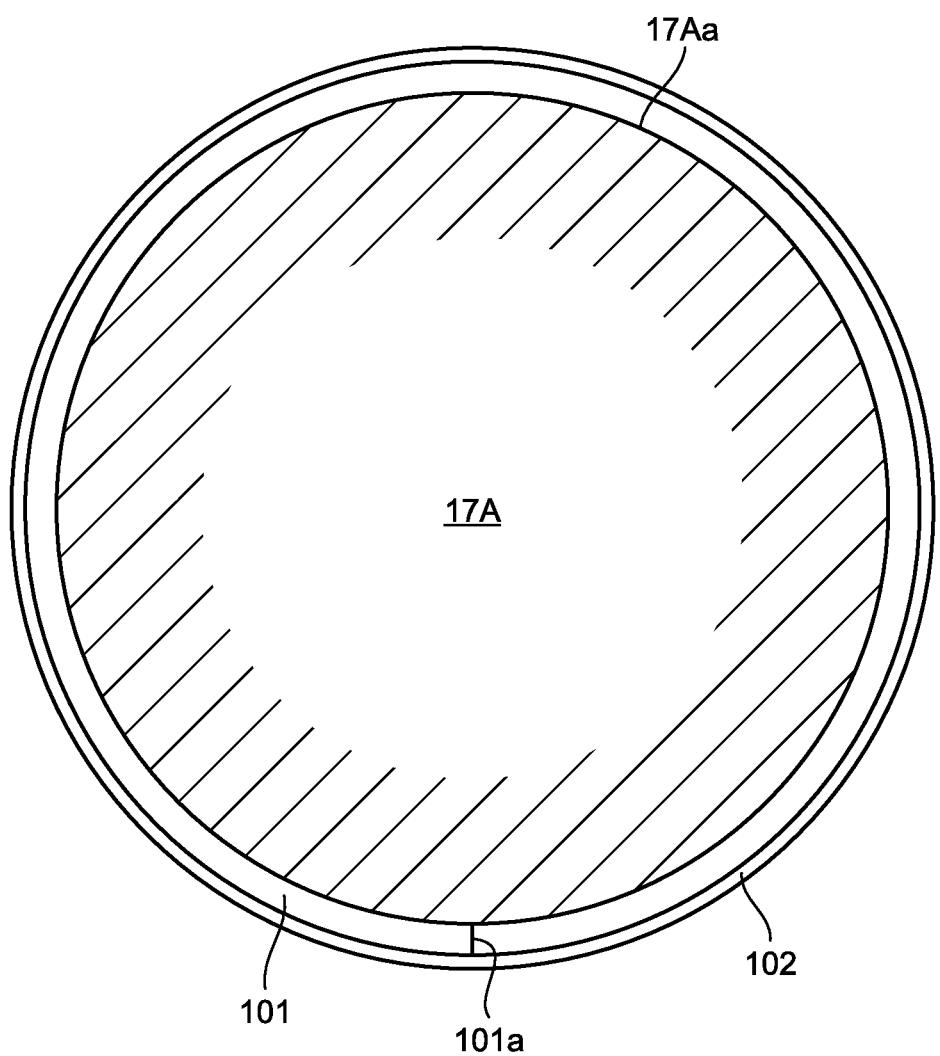
FIG. 32 is a partial enlarged cross-sectional view illustrating the operation of the shaft sealing structure for the primary coolant circulation pump according to the fifteenth embodiment of the present invention.
Figure 33:
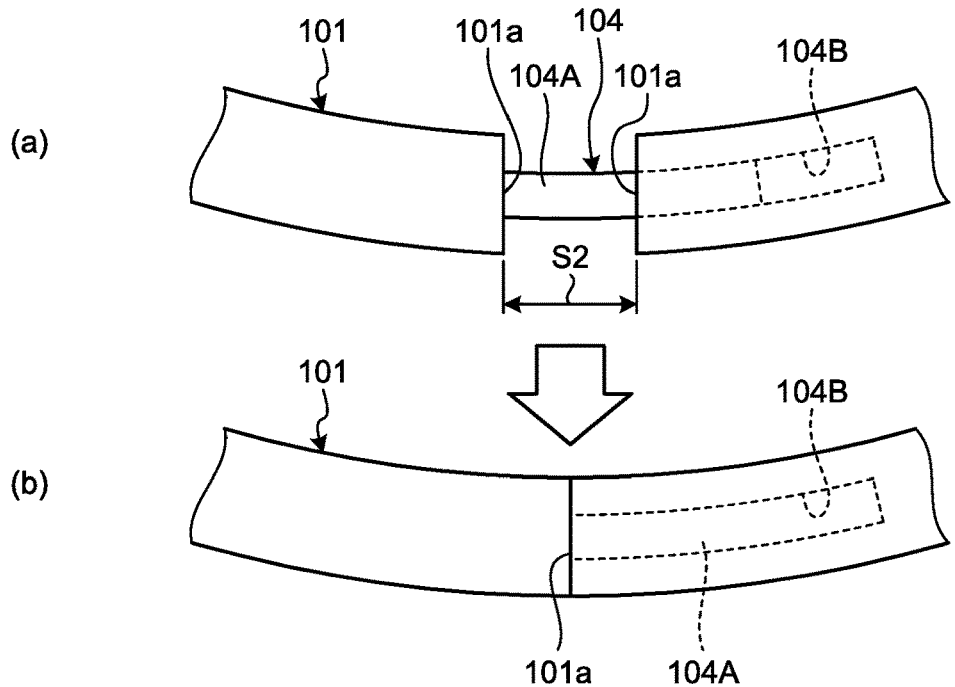
FIG. 33 is a partial enlarged plan view of the shaft sealing structure for the primary coolant circulation pump according to the fifteenth embodiment of the present invention.
Figure 34:
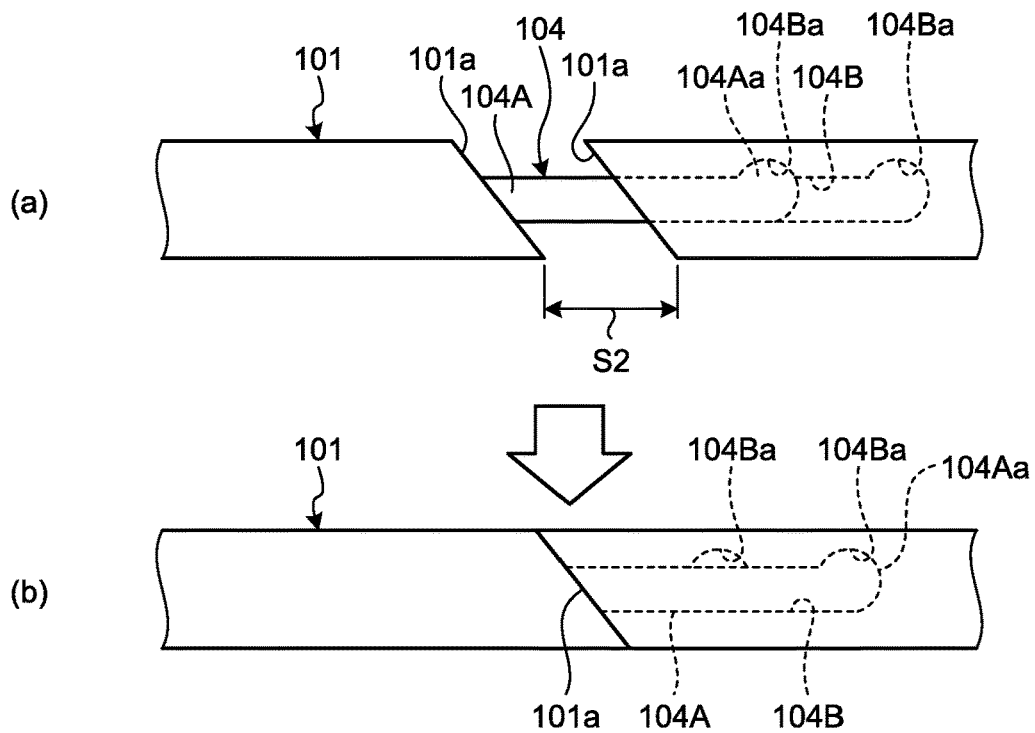
FIG. 34 is a partial enlarged side view of the shaft sealing structure for the primary coolant circulation pump according to the fifteenth embodiment of the present invention.
Figure 35:
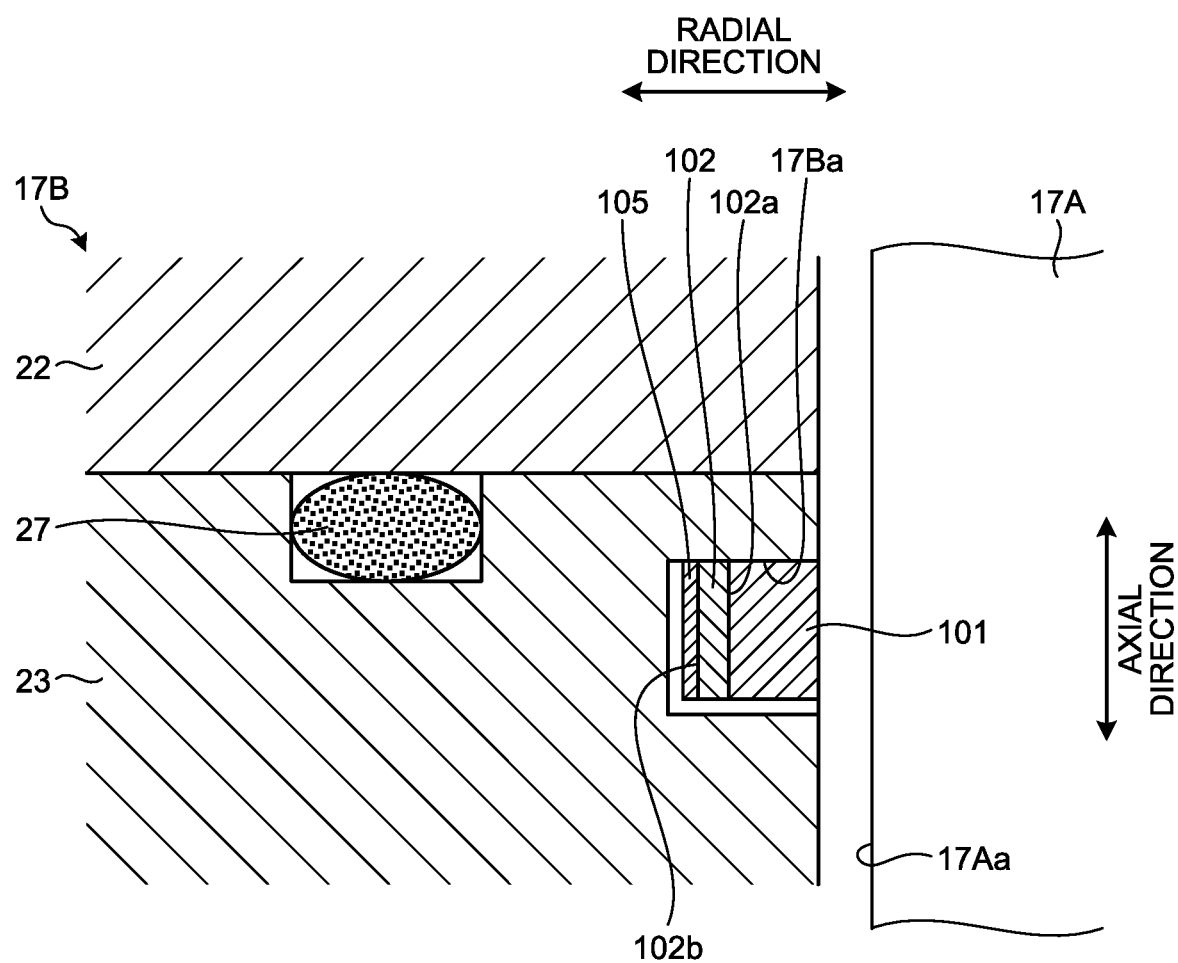
FIG. 35 is a partial enlarged cross-sectional view illustrating the operation of the shaft sealing structure for the primary coolant circulation pump according to the fifteenth embodiment of the present invention.

FIG. 29 is a partial enlarged cross-sectional view of a shaft sealing structure for a primary coolant circulation pump according to a fifteenth embodiment. FIG. 30 is a partial enlarged cross-sectional view of the shaft sealing structure for the primary coolant circulation pump according to the fifteenth embodiment. FIG. 31 is a partial enlarged cross-sectional view illustrating operation of the shaft sealing structure for the primary coolant circulation pump according to the fifteenth embodiment. FIG. 32 is a partial enlarged cross-sectional view illustrating the operation of the shaft sealing structure for the primary coolant circulation pump according to the fifteenth embodiment. FIG. 33 is a partial enlarged plan view of the shaft sealing structure for the primary coolant circulation pump according to the fifteenth embodiment of the present invention. FIG. 34 is a partial enlarged side view of the shaft sealing structure for the primary coolant circulation pump according to the fifteenth embodiment. FIG. 35 is a partial enlarged cross-sectional view illustrating the operation of the shaft sealing structure for the primary coolant circulation pump according to the fifteenth embodiment.

As illustrated in FIG. 29, the shaft sealing structure in the fifteenth embodiment is disposed so as to be opposed to an outer peripheral surface 17Aa of a rotation shaft 17A on the radially inner side of a constituent member 23 in a sealing housing 17B. Although not specified in FIG. 29, the shaft sealing structure in the first embodiment may be disposed so as to be opposed to the outer peripheral surface 17Aa of the rotation shaft 17A on the radially inner side of a constituent member 22 in the sealing housing 17B.

The shaft sealing structure in the fifteenth embodiment includes a sealing ring 101 and a heat-shrinkable ring 102. The shaft sealing structure having these configurations is disposed in a recess 17Ba that is formed in an inner circumferential surface 23a of the constituent member 23 (or inner circumferential surface 22a of constituent member 22) in the sealing housing 17B so as to be recessed to the radially outer side and that is formed continuously in the circumferential direction.

As illustrated in FIG. 30, the sealing ring 1 is formed into a ring shape along the circumferential direction so as to surround the outer peripheral surface 17Aa of the rotation shaft 17A. A part of the sealing ring 1 in the circumferential direction is divided at divided portions 101a, and the sealing ring 1 is formed into a C-shape when viewed from the axial direction. For example, as illustrated in FIG. 30, the divided portions 101a are provided with a gap S2 therebetween. As illustrated in FIG. 31 and FIG. 32, the sealing ring 1 is configured such that the divided portions 101a abut each other to be continuous in the circumferential direction when the sealing ring 1 is reduced in diameter to the radially inner side and that the sealing ring 1 can contact the outer peripheral surface 17Aa along the circumferential direction of the rotation shaft 17A.

As illustrated in FIG. 29, the sealing ring 101 is formed to have a rectangular cross-sectional shape. An inner surface of the sealing ring 101 that faces the radially inner side constitutes a contact surface 101b that is formed to have an arc shape along the axial direction and the circumferential direction and that is opposed to and can contact the outer peripheral surface 17Aa of the rotation shaft 17A. A surface of the sealing ring 101 that is adjacent to the contact surface 101b and faces the axially upper side constitutes a top surface 101c that is formed to have a flat shape along the radial direction and that is brought into contact with the top surface of the recess 17Ba in the sealing housing 17B. A surface of the sealing ring 101 that is adjacent to the contact surface 101b and faces the axially lower side constitutes a bottom surface 101d that is formed to have a flat shape along the radial direction and that is brought into contact with the bottom surface of the recess 17Ba in the sealing housing 17B. A surface of the sealing ring 101 that is opposite to the contact surface 101b and faces the radially outer side constitutes an outer surface 101e that is formed to have an arc shape along the axial direction and the circumferential direction and faces inward of the recess 17Ba in the sealing housing 17B.

It is desired that the sealing ring 101 have corrosion resistance, sealing performance on an intimate contact surface when contacting the rotation shaft 17A, heat resistance when temperature increases, pressure resistance when pressure increases, and strength. The sealing ring 101 can contact the outer peripheral surface 17Aa of the rotating rotation shaft 17A, and hence it is desired that the sealing ring 101 have a low friction coefficient. For example, the sealing ring 101 is formed from PEEK resin, PEEK composite material filled with glass or carbon fiber, or polymer material. For example, the sealing ring 101 is formed from metal material, such as stainless steel and silver. The sealing ring 101 may have a coating of soft material (for example, silver plating, synthetic resin coating, or rubber vulcanization) on the surface of metal material. Instead of the coating, the sealing ring 101 may be formed by inserting similar soft material into metal material. In this manner, the adhesion of the sealing ring 101 when contacting the rotation shaft 17A or the sealing housing 17B can be improved.

It is desired that the sealing ring 101 have a through hole (communicating portion) 101f formed therein, which passes therethrough from the contact surface 101b to the outer surface 101e in the radial direction.

It is desired that the sealing ring 101 have elastic force by itself and be configured such that when the sealing ring 101 is biased in a direction in which the divided portions 101a are away from each other, that is, so as to be increased in diameter to the radially outer side, the contact surface 101b is separated away from the outer peripheral surface 17Aa of the rotation shaft 17A.

The heat-shrinkable ring 102 is provided along the circumferential direction on the radially outer side of the sealing ring 101. The heat-shrinkable ring 102 is disposed in the recess 17Ba in the sealing housing 17B on the radially outer side of the sealing ring 101. The heat-shrinkable ring 102 is formed into a ring shape along the circumferential direction so as to surround the outer peripheral surface 17Aa of the rotation shaft 17A, and a part of the ring shape may be divided. The heat-shrinkable ring 102 in FIG. 29 has a rectangular cross-sectional shape, but the cross-sectional shape is not limited to this shape. The heat-shrinkable ring 102 has at least an inner surface 102a on the radially inner side, which is opposed to the outer surface 101e of the sealing ring 101 on the radially outer side, and an outer surface 102b on the radially outer side, which is opposed to the interior surface of the recess 17Ba in the sealing housing 17B.

The heat-shrinkable ring 102 shrinks at a predetermined temperature or higher. The predetermined temperature is determined in consideration of the temperature of the primary coolant in case of station blackout in the nuclear power plant. For example, in the pressurized water reactor (PWR) 12, it is supposed that the temperature of the primary coolant, which is 70° C. to 100° C. during pump normal operation, increases up to about 300° C. in case of station blackout. Thus, it is desired to set the predetermined temperature to about 150° C. or higher, preferably 150° C. to 200° C.

It is desired that the recess 17Ba in the sealing housing 17B in which the sealing ring 101 and the heat-shrinkable ring 102 are disposed have a groove (communicating portion) 103a formed in its bottom surface. The groove 103a is formed such that the bottom of the groove is separated away from the sealing ring 101 and the heat-shrinkable ring 102. The groove 103a is formed in the bottom surface of the recess 17Ba in the sealing housing 17B so as to be along the radial direction or be inclined or warped with respect to the radial direction, and formed from the opening of the recess 17Ba in the sealing housing 17B on the radially inner side to reach the interior surface of the recess 17Ba on the radially outer side. It is desired that the recess 17Ba in the sealing housing 17B have a groove (communicating portion) 103b in its interior surface. The groove 103b is formed such that the bottom of the groove is separated away from the heat-shrinkable ring 102. The groove 103b is formed in the interior surface of the recess 17Ba in the sealing housing 17B so as to be along the axial direction or be inclined or warped with respect to the axial direction. It is desired that the groove 103b communicate with the groove 103a.

In the shaft sealing structure in the fifteenth embodiment, during normal operation of the primary coolant circulation pump 17, the temperature of the primary coolant is lower than the predetermined temperature, and hence as illustrated in FIG. 29 and FIG. 30, the heat-shrinkable ring 102 does not shrink but is increased in diameter. In this case, the sealing ring 101 is disposed such that the contact surface 101b is separated away from the outer peripheral surface 17Aa of the rotation shaft 17A, and a predetermined clearance S1 is secured between the inner circumferential surface 23a of the sealing housing 17B (constituent member 23) and the outer peripheral surface 17Aa of the rotation shaft 17A. Thus, as illustrated by solid arrows in FIG. 29, the primary coolant can flow through the predetermined clearance S1 from the axially lower side to the axially upper side, and a first sealing 17C, a second sealing 17D, and a third sealing 17E of the primary coolant circulation pump 17 function such that the rotation shaft 17A can rotate smoothly.

In case of station blackout, on the other hand, the operation of the primary coolant circulation pump 17 is stopped and the primary coolant does not circulate for cooling, and hence the temperature of the primary coolant increases to be equal to or higher than the predetermined temperature. Then, as illustrated by broken-line arrows in FIG. 29, the primary coolant having the predetermined temperature or higher flows through the through hole 101f and the grooves 103a and 103b, which are communicating portions, from the outer circumferential portion of the rotation shaft 17A to the outer circumferential portion of the heat-shrinkable ring 102 located in the recess 17Ba in the sealing housing 17B. The outer circumferential portion of the heat-shrinkable ring 102 is exposed to the primary coolant having the predetermined temperature or higher, and the heat-shrinkable ring 102 shrinks to be reduced in diameter to the radially inner side. Then, the sealing ring 101 is pressed by the heat-shrinkable ring 102 and reduced in diameter to the radially inner side. The divided portions 101a abut each other such that the gap S2 is 0 as illustrated in FIG. 32, and the contact surface 101b contacts the outer peripheral surface 17Aa of the rotation shaft 17A as illustrated in FIG. 31. A part of the top surface 101c and the bottom surface 101d of the sealing ring 101 still contact the top surface and the bottom surface of the recess 17Ba in the sealing housing 17B. Thus, the flow of the primary coolant in the clearance between the sealing ring 1 and the rotation shaft 17A can be suppressed to suppress the leakage of the primary coolant from the first sealing 17C to the second sealing 17D. As a result, the temperature increase in the second sealing 17D and the third sealing 17E in the primary coolant circulation pump 17 can be suppressed to improve safety and reliability.

As described above, the shaft sealing structure in the fifteenth embodiment includes: the sealing ring 101 that is formed into a ring shape in which a part thereof in the circumferential direction is divided such that when the sealing ring 101 is reduced in diameter to the radially inner side, the divided portions 101a abut each other to be continuous in the circumferential direction, and the sealing ring 101 is contactable with the outer peripheral surface 17Aa along the circumferential direction of the rotation shaft 17A; and the heat-shrinkable ring 102 that is provided along the circumferential direction on the radially outer side of the sealing ring 101 and that shrinks to the radially inner side at a predetermined temperature or higher. Thus, the heat-shrinkable ring 102 can press the sealing ring 101 to the radially inner side toward the outer peripheral surface 17Aa of the rotation shaft 17A, and can reduce the diameter of the sealing ring 101 in the circumferential direction, thereby enabling the sealing ring 101 to be brought into contact with the rotation shaft 17A uniformly in the circumferential direction. Thus, the shaft sealing structure in the fifteenth embodiment can be reliably and smoothly operated.

The shaft sealing structure in the fifteenth embodiment further includes the through hole 101f and the grooves 103a and 103b as communicating portions that communicate between the outer circumferential portion of the rotation shaft 17A and the outer circumferential portion of the heat-shrinkable ring 102. Thus, the primary coolant having the predetermined temperature or higher can be caused to flow to the outer circumferential portion of the heat-shrinkable ring 102 through the communicating portion, and temperature can be uniformly transferred to the heat-shrinkable ring 102. As a result, the heat-shrinkable ring 102 can be shrunk uniformly in the circumferential direction, and the sealing ring 101 can be pressed uniformly in the circumferential direction and brought into contact with the rotation shaft 17A uniformly in the circumferential direction. Consequently, the shaft sealing structure in the fifteenth embodiment can be more reliably and smoothly operated.

In the shaft sealing structure in the fifteenth embodiment, as illustrated in FIG. 33 and FIG. 34, the sealing ring 101 further includes a fitting portion 104.

The fitting portion 104 has a fitting rod 104A extending in the circumferential direction from one of the opposed divided portions 101a, and a fitting hole 104B opened to extend in the circumferential direction in the other of the opposed divided portions 101a. The fitting rod 104A of the fitting portion 104 is inserted into the fitting hole 104B. As illustrated in FIG. 34, a hemispherical or semi-cylindrical fitting protrusion 104Aa is formed at the distal end of the fitting rod 104A. Fitting recesses 104Ba to which the fitting protrusion 104Aa is fitted are formed in the fitting hole 104B at the middle and the deep part.

As illustrated in FIG. 33(a) and FIG. 34(a), when the fitting rod 104A of the fitting portion 104 is inserted to the middle of the fitting hole 104B, the fitting protrusion 104Aa of the fitting rod 104A is fitted to the fitting recess 104Ba at the middle of the fitting hole 104B, thereby maintaining this state. In this state, the divided portions 101a are provided with a gap S2 therebetween, and the sealing ring 101 is disposed such that the contact surface 101b is separated away from the outer peripheral surface 17Aa of the rotation shaft 17A.

As illustrated in FIG. 33(b) and FIG. 34(b), on the other hand, when the fitting rod 104A of the fitting portion 104 is inserted deep to the fitting hole 104B, the fitting protrusion 104Aa of the fitting rod 104A is fitted to the fitting recess 104Ba at the deep side in the fitting hole 104B, and this state is maintained. In this state, the gap S2 between the divided portions 101a becomes 0, and the contact surface 101b of the sealing ring 101 contacts the outer peripheral surface 17Aa of the rotation shaft 17A.

As described above, the sealing ring 101 further includes the fitting portion 104 that maintains the state of being away from the rotation shaft 17A and the state of contacting the rotation shaft 17A. Thus, the states can be maintained also by the sealing ring 101. Consequently, the shaft sealing structure in the fifteenth embodiment can be more reliably operated.

As illustrated in FIG. 35, it is desired that the shaft sealing structure in the fifteenth embodiment further include a heat transfer ring 105 along the circumferential direction on the radially outer side of the heat-shrinkable ring 102.

The heat transfer ring 105 is disposed inside the recess 17Ba in the sealing housing 17B on the radially outer side of the heat-shrinkable ring 102. The heat transfer ring 105 is formed into a ring shape along the circumferential direction so as to surround the outer peripheral surface 17Aa of the rotation shaft 17A, and the heat transfer ring 105 may be formed such that a part of the ring shape is divided. It is desired that the heat transfer ring 105 be provided so as to contact the outer surface 102b of the heat-shrinkable ring 102 in the state in which the heat-shrinkable ring 102 does not shrink.

The heat transfer ring 105 is made of metal material, such as copper and an aluminum alloy. The heat transfer portion 4B is made of composite material, such as carbon fiber reinforced plastic (CFRP) or glass fiber reinforced plastic (GFRP).

This shaft sealing structure, which includes the heat transfer ring 105, can improve the transfer of heat to the heat-shrinkable ring 102. As a result, the heat-shrinkable ring 102 can be shrunk uniformly in the circumferential direction, and the sealing ring 101 can be brought into contact with the rotation shaft 17A uniformly in the circumferential direction. Consequently, the shaft sealing structure in the fifteenth embodiment can be reliably and smoothly operated.

In the shaft sealing structure in the fifteenth embodiment, it is desired that the sealing ring 101 contain heat conductive material having heat conductivity.

Examples of the heat conductive material include composite material and filler. As composite material, for example, it is desired to apply carbon fiber reinforced plastic (CFRP) or glass fiber reinforced plastic (GFRP). As filler, it is desired to apply aluminum nitride (AlN), boron nitride (BN), or aluminum oxide ($Al_2O_3$).

This shaft sealing structure, in which the sealing ring 101 contains heat conductive material having heat conductivity, can improve the transfer of heat to the heat-shrinkable ring 102. As a result, the heat-shrinkable ring 102 can be shrunk uniformly in the circumferential direction, and the sealing ring 101 can be brought into contact with the rotation shaft 17A uniformly in the circumferential direction. Consequently, the shaft sealing structure in the fifteenth embodiment can be reliably and smoothly operated.

It is desired that the primary coolant circulation pump 17 include the shaft sealing structure in each of the above-mentioned embodiment.

Thus, the sealing ring 1 does not hinder the rotation of the rotation shaft 17A during normal operation of the primary coolant circulation pump 17, and when the temperature of the primary coolant circulation pump increases, the sealing ring 1 contacts the rotation shaft 17A, and hence the flow of fluid between the sealing ring 1 and the rotation shaft 17A can be suppressed to prevent the leakage of fluid. As a result, the safety and the reliability of the primary coolant circulation pump 17 can be improved.

REFERENCE SIGNS LIST 1 sealing ring
1a inclined surface
1b contact surface
1c top surface
1d outer surface
1e split ring
1f recess and protrusion
2 pressing member
2a inclined surface
2b top surface
2c outer surface
2d hole
2e recess and protrusion
2f notch
2g protrusion
2h pushout portion
3 elastic member
4 support member
4a recess and protrusion
4b recess and protrusion
4c recess and protrusion
4A softened portion
4B heat transfer portion
4C plate-shaped member
4Ca cutting groove
4Cb plate piece
4Cc ring piece
4Cd initial irregularity
4D through hole
4E wire
4F fusible portion
4H tubular main body
4Ha protrusion
4Hb cutting groove
4Hc inclined surface
4I tubular main body
4Ia claw-shaped member
4Ib initial irregularity
4J tubular main body
4Ja claw-shaped member
4K hollow
5 communicating portion
6 stopper
7 expanding member
11 containment
12 pressurized water reactor
13 steam generator
14, 15 pipe
16 pressurizer
17 primary coolant circulation pump
17A rotation shaft
17Aa outer peripheral surface
17B sealing housing
17Ba recess
17Baa clearance
17Bb fixation hole
17Bc fixation hole
17C first sealing
17Ca rotating ring
17Cb stationary ring
17D second sealing
17Da rotating ring
17Db stationary ring
17E third sealing
17Ea rotating ring
17Eb stationary ring
18 steam pipe
19 condensate pipe
22, 23 constituent member
22a, 23a inner circumferential surface
25 coupling member
27, 28 O-ring 101 sealing ring
101a divided portion
101b contact surface
101c top surface
101d bottom surface
101e outer surface
101f through hole
102 heat-shrinkable ring
102a inner surface
102b outer surface
103a, 103b groove
104 fitting portion
104A fitting rod
104Aa fitting protrusion
104B fitting hole
104Ba fitting recess
105 heat transfer ring
S1 clearance
S2 gap

The invention claimed is:

1. A shaft sealing structure for a rotation shaft, comprising:
a sealing ring having a ring shape in which a part is removed in a circumferential direction so that the sealing ring has ends formed by removal of the part, wherein the ends abutting each other are continuous in the circumferential direction when the sealing ring is reduced in diameter to a radially inner side, and the sealing ring is provided along the circumferential direction of the rotation shaft so as to be contactable with an outer peripheral surface of the rotation shaft;
a pressing member configured to be movable between a pressing position at which the pressing member presses the sealing ring to the radially inner side and a retracted position at which the pressing member is retracted from the pressing position;
an elastic member configured to bias the pressing member toward the pressing position by elastic force;
a support member configured to support the pressing member at the retracted position against the elastic force of the elastic member, and to allow the pressing member to move to the pressing position at a predetermined temperature or higher; and
a communicating portion configured to communicate between an outer circumferential portion of the rotation shaft and a surface of the support member so that a fluid flows from the outer circumferential portion of the rotation shaft to the surface of the support member,
wherein the support member is disposed in a space defined by a top surface of the pressing member and an outer surface of the sealing ring,
wherein the communicating portion terminates at the surface of the support member,
and wherein the support member has recesses and protrusions formed on a surface thereof.

2. The shaft sealing structure according to claim 1, wherein the communicating portion is provided to pass through the pressing member.

3. The shaft sealing structure according to claim 1, wherein the communicating portion is provided to pass through the sealing ring in a radial direction.

4. A shaft sealing structure for a rotation shaft, comprising:
a sealing ring having a ring shape in which a part is removed in a circumferential direction so that the sealing ring has ends formed by removal of the part, wherein the ends abutting each other are continuous in the circumferential direction when the sealing ring is reduced in diameter to a radially inner side, and the sealing ring is provided along the circumferential direction of the rotation shaft so as to be contactable with an outer peripheral surface of the rotation shaft;
a pressing member configured to be movable between a pressing position at which the pressing member presses the sealing ring to the radially inner side and a retracted position at which the pressing member is retracted from the pressing position;
an elastic member configured to bias the pressing member toward the pressing position by elastic force;
a support member configured to support the pressing member at the retracted position against the elastic force of the elastic member, and to allow the pressing member to move to the pressing position at a predetermined temperature or higher; and
a communicating portion configured to communicate between an outer circumferential portion of the rotation shaft and a surface of the support member so that a fluid flows from the outer circumferential portion of the rotation shaft to the surface of the support member,
wherein the support member is disposed in a space defined by a top surface of the pressing member and an outer surface of the sealing ring,
wherein the communicating portion terminates at the surface of the support member,
wherein the support member has recesses and protrusions formed on a surface thereof, and
at least one of the sealing ring and the pressing member has recesses and protrusions formed on a surface thereof and engaged with the recesses and protrusions formed on the support member.

5. The shaft sealing structure according to claim 1, wherein the support member is formed by mixing a resin material that is softened at a predetermined temperature or higher and a heat conductive material having heat conductivity.

6. The shaft sealing structure according to claim 1, wherein
the support member is formed by being divided into a softened portion to be softened at a predetermined temperature or higher and a heat transfer portion having heat conductivity, and
the softened portion and the heat transfer portion are provided along a movement direction of the pressing member.

7. The shaft sealing structure according to claim 1, wherein
the support member is formed by being divided into a softened portion to be softened at a predetermined temperature or higher and a heat transfer portion having heat conductivity, and
the softened portion and the heat transfer portion are provided in a row in a direction intersecting with a movement direction of the pressing member.

8. A shaft sealing structure for a rotation shaft, comprising:
a sealing ring having a ring shape in which a part is removed in a circumferential direction so that the sealing ring has ends formed by removal of the part, wherein the ends abutting each other are continuous in the circumferential direction when the sealing ring is reduced in diameter to a radially inner side, and the sealing ring is provided along the circumferential direction of the rotation shaft so as to be contactable with an outer peripheral surface of the rotation shaft;

a pressing member configured to be movable between a pressing position at which the pressing member presses the sealing ring to the radially inner side and a retracted position at which the pressing member is retracted from the pressing position;

an elastic member configured to bias the pressing member toward the pressing position by elastic force;

a support member configured to support the pressing member at the retracted position against the elastic force of the elastic member, and to allow the pressing member to move to the pressing position at a predetermined temperature or higher; and a communicating portion configured to communicate between an outer circumferential portion of the rotation shaft and a surface of the support member so that a fluid flows from the outer circumferential portion of the rotation shaft to the surface of the support member, wherein the support member is disposed in a space defined by a top surface of the pressing member and an outer surface of the sealing ring, wherein the communicating portion terminates at the surface of the support member, wherein the support member includes a plate-shaped member configured to support the pressing member located at the retracted position against a movement direction and to be softened at a predetermined temperature or higher, and the plate-shaped member is formed by being divided in the circumferential direction by a plurality of cutting grooves extending in the movement direction of the pressing member.

9. The shaft sealing structure according to claim 1, wherein the support member has a through hole formed therein.

10. A shaft sealing structure for a rotation shaft, comprising:

a sealing ring having a ring shape in which a part is removed in a circumferential direction so that the sealing ring has ends formed by removal of the part, wherein the ends abutting each other are continuous in the circumferential direction when the sealing ring is reduced in diameter to a radially inner side, and the sealing ring is provided along the circumferential direction of the rotation shaft so as to be contactable with an outer peripheral surface of the rotation shaft;

a pressing member configured to be movable between a pressing position at which the pressing member presses the sealing ring to the radially inner side and a retracted position at which the pressing member is retracted from the pressing position;

an elastic member configured to bias the pressing member toward the pressing position by elastic force;

a support member configured to support the pressing member at the retracted position against the elastic force of the elastic member, and to allow the pressing member to move to the pressing position at a predetermined temperature or higher; and a communicating portion configured to communicate between an outer circumferential portion of the rotation shaft and a surface of the support member so that a fluid flows from the outer circumferential portion of the rotation shaft to the surface of the support member, wherein the support member is disposed in a space defined by a top surface of the pressing member and an outer surface of the sealing ring, wherein the communicating portion terminates at the surface of the support member, and wherein the support member is configured to support the pressing member at the retracted position by tensile force against the elastic force of the elastic member in a manner that a fusible portion that fuses at a predetermined temperature or higher is interposed.

11. A shaft sealing structure for a rotation shaft, comprising:

a sealing ring having a ring shape in which a part is removed in a circumferential direction so that the sealing ring has ends formed by removal of the part, wherein the ends abutting each other are continuous in the circumferential direction when the sealing ring is reduced in diameter to a radially inner side, and the sealing ring is provided along the circumferential direction of the rotation shaft so as to be contactable with an outer peripheral surface of the rotation shaft;

a pressing member configured to be movable between a pressing position at which the pressing member presses the sealing ring to the radially inner side and a retracted position at which the pressing member is retracted from the pressing position;

an elastic member configured to bias the pressing member toward the pressing position by elastic force;

a support member configured to support the pressing member at the retracted position against the elastic force of the elastic member, and to allow the pressing member to move to the pressing position at a predetermined temperature or higher; and a communicating portion configured to communicate between an outer circumferential portion of the rotation shaft and a surface of the support member so that a fluid flows from the outer circumferential portion of the rotation shaft to the surface of the support member, wherein the support member is disposed in a space defined by a top surface of the pressing member and an outer surface of the sealing ring, wherein the communicating portion terminates at the surface of the support member, and wherein the support member includes a buckling member provided so as to allow the pressing member to move to the pressing position by relative movement of the support member and the pressing member in the circumferential direction, the buckling member being configured to restrict the relative movement of the support member and the pressing member in the circumferential direction at the retracted position of the pressing member and to buckle at a predetermined temperature or higher to allow the relative movement of the support member and the pressing member in the circumferential direction.

12. A shaft sealing structure for a rotation shaft, comprising:

a sealing ring having a ring shape in which a part is removed in a circumferential direction so that the sealing ring has ends formed by removal of the part, wherein the ends abutting each other are continuous in the circumferential direction when the sealing ring is reduced in diameter to a radially inner side, and the sealing ring is provided along the circumferential direction of the rotation shaft so as to be contactable with an outer peripheral surface of the rotation shaft;

a pressing member configured to be movable between a pressing position at which the pressing member presses the sealing ring to the radially inner side and a retracted position at which the pressing member is retracted from the pressing position;

an elastic member configured to bias the pressing member toward the pressing position by elastic force;

a support member configured to support the pressing member at the retracted position against the elastic force of the elastic member, and to allow the pressing member to move to the pressing position at a predetermined temperature or higher; and a communicating portion configured to communicate between an outer circumferential portion of the rotation shaft and a surface of the support member so that a fluid flows from the outer circumferential portion of the rotation shaft to the surface of the support member, wherein the support member is disposed in a space defined by a top surface of the pressing member and an outer surface of the sealing ring, wherein the communicating portion terminates at the surface of the support member, and wherein the support member includes:
 a claw-shaped member configured to support the pressing member located at the retracted position and to be softened at a predetermined temperature or higher; and
 an initial irregularity configured to cause the claw-shaped member to buckle so as to allow the pressing member to move to the pressing position.

13. A shaft sealing structure for a rotation shaft, comprising:

a sealing ring having a ring shape in which a part is removed in a circumferential direction so that the sealing ring has ends formed by removal of the part, wherein the ends abutting each other are continuous in the circumferential direction when the sealing ring is reduced in diameter to a radially inner side, and the sealing ring is provided along the circumferential direction of the rotation shaft so as to be contactable with an outer peripheral surface of the rotation shaft;

a pressing member configured to be movable between a pressing position at which the pressing member presses the sealing ring to the radially inner side and a retracted position at which the pressing member is retracted from the pressing position;

an elastic member configured to bias the pressing member toward the pressing position by elastic force;

a support member configured to support the pressing member at the retracted position against the elastic force of the elastic member, and to allow the pressing member to move to the pressing position at a predetermined temperature or higher; and a communicating portion configured to communicate between an outer circumferential portion of the rotation shaft and a surface of the support member so that a fluid flows from the outer circumferential portion of the rotation shaft to the surface of the support member, wherein the support member is disposed in a space defined by a top surface of the pressing member and an outer surface of the sealing ring, wherein the communicating portion terminates at the surface of the support member, and wherein the support member includes:
 a claw-shaped member configured to support the pressing member located at the retracted position and to be softened at a predetermined temperature or higher; and
 an expanding member configured to thermally expand at a predetermined temperature or higher to deform the claw-shaped member and allow the pressing member to move to the pressing position.

14. The shaft sealing structure according to claim 1, wherein the sealing ring and the pressing member have sliding-contact surfaces that contact and slide on each other when the pressing member moving to the pressing position presses the sealing ring, and each of the sliding-contact surfaces is subjected to surface treatment for reducing friction resistance.

15. A primary coolant circulation pump, comprising the shaft sealing structure according to claim 1.

* * * * *